(12) United States Patent
Schultz et al.

(10) Patent No.: US 11,592,974 B2
(45) Date of Patent: *Feb. 28, 2023

(54) LASER FINISHING DESIGN TOOL WITH IMAGE PREVIEW

(71) Applicant: Levi Strauss & Co., San Francisco, CA (US)

(72) Inventors: Jennifer Schultz, Boston, MA (US); Debdulal Mahanty, Fremont, CA (US); Ozgur Taylan Kuzucu, Walnut Creek, CA (US); James Barton Sights, San Francisco, CA (US); Benjamin Bell, San Francisco, CA (US); Christopher Schultz, Boston, MA (US)

(73) Assignee: Levi Strauss & Co., San Francisco, CA (US)

(*) Notice: Subject to any disclaimer, the term of this patent is extended or adjusted under 35 U.S.C. 154(b) by 123 days.

This patent is subject to a terminal disclaimer.

(21) Appl. No.: 17/177,093

(22) Filed: Feb. 16, 2021

(65) Prior Publication Data
US 2021/0165563 A1 Jun. 3, 2021

Related U.S. Application Data

(63) Continuation of application No. 16/177,407, filed on Oct. 31, 2018, now Pat. No. 10,921,968.
(Continued)

(51) Int. Cl.
*D06C 23/00* (2006.01)
*A41H 3/00* (2006.01)
(Continued)

(52) U.S. Cl.
CPC ........ *G06F 3/04845* (2013.01); *G06F 3/0482* (2013.01); *G06F 3/04817* (2013.01);
(Continued)

(58) Field of Classification Search
CPC .... D06C 23/00; D06C 2700/31; B44C 1/228; A41H 3/007; A41H 3/08; G06F 3/04845; G06T 11/001; G06T 11/60; G06T 2210/16

See application file for complete search history.

(56) References Cited

U.S. PATENT DOCUMENTS 3,883,298 A 5/1975 Platt
3,983,132 A 9/1976 Strobel
(Continued)

FOREIGN PATENT DOCUMENTS

CA 2066978 A1 6/1993
CN 101187640 A 5/2008
(Continued)

OTHER PUBLICATIONS

US 6,360,323 B1, 01/2013, Widzinski, Jr. et al. (withdrawn)
(Continued)

*Primary Examiner* — Nathan E Durham
(74) *Attorney, Agent, or Firm* — Aka Chan LLP

(57) ABSTRACT

A tool allows a user to create new designs for apparel and preview these designs before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

32 Claims, 54 Drawing Sheets

Related U.S. Application Data

(60) Provisional application No. 62/579,863, filed on Oct. 31, 2017.

(51) Int. Cl.

| | | |
|---|---|---|
| *G06F 3/04845* | (2022.01) | |
| *G06T 11/60* | (2006.01) | |
| *G06F 3/0482* | (2013.01) | |
| *G06T 11/00* | (2006.01) | |
| *G06Q 30/00* | (2023.01) | |
| *G06F 3/04817* | (2022.01) | |
| *G06F 3/04883* | (2022.01) | |
| *G06F 3/04847* | (2022.01) | |

(52) U.S. Cl.
CPC ...... *G06F 3/04847* (2013.01); *G06F 3/04883* (2013.01); *G06Q 30/00* (2013.01); *G06T 11/001* (2013.01); *G06T 11/60* (2013.01); *G06T 2210/16* (2013.01)

(56) References Cited

U.S. PATENT DOCUMENTS

| | | |
|---|---|---|
| 4,527,383 A | 7/1985 | Bingham |
| 5,015,849 A | 5/1991 | Gilpatrick |
| 5,185,511 A | 2/1993 | Yabu |
| 5,201,027 A | 4/1993 | Casini |
| 5,367,141 A | 11/1994 | Piltch |
| 5,537,939 A | 7/1996 | Horton |
| 5,567,207 A | 10/1996 | Lockman et al. |
| 5,573,851 A | 11/1996 | Lengers et al. |
| 5,605,641 A | 2/1997 | Chiba et al. |
| 5,839,380 A | 11/1998 | Muto |
| 5,880,430 A | 3/1999 | Wein |
| 5,916,461 A | 6/1999 | Costin et al. |
| 5,990,444 A | 11/1999 | Costin |
| 6,002,099 A | 12/1999 | Martin et al. |
| 6,004,018 A | 12/1999 | Kawasato et al. |
| 6,086,966 A | 7/2000 | Gundjian et al. |
| 6,140,602 A | 10/2000 | Costin |
| 6,192,292 B1 | 2/2001 | Taguchi |
| 6,252,196 B1 | 6/2001 | Costin et al. |
| 6,315,202 B2 | 11/2001 | Costin et al. |
| 6,356,648 B1 | 3/2002 | Taguchi |
| 6,407,361 B1 | 6/2002 | Williams |
| 6,465,046 B1 | 10/2002 | Hansson et al. |
| 6,495,237 B1 | 12/2002 | Costin |
| 6,548,428 B1 | 4/2003 | Lanitz et al. |
| 6,576,862 B1 | 6/2003 | Costin et al. |
| 6,616,710 B1 | 9/2003 | Costin et al. |
| 6,664,505 B2 | 12/2003 | Martin |
| 6,685,868 B2 | 2/2004 | Costin |
| 6,689,517 B1 | 2/2004 | Kaminsky et al. |
| 6,706,785 B1 | 3/2004 | Fu |
| 6,726,317 B2 | 4/2004 | Codos |
| 6,734,679 B2 | 5/2004 | Simonsson et al. |
| 6,753,501 B1 | 6/2004 | Costin, Sr. et al. |
| 6,765,608 B1 | 7/2004 | Himeda et al. |
| 6,807,456 B1 | 10/2004 | Costin, Jr. et al. |
| 6,819,972 B1 | 11/2004 | Martin et al. |
| 6,832,125 B2 | 12/2004 | Sonnenberg et al. |
| 6,836,694 B1 | 12/2004 | Podubrin |
| 6,836,695 B1 | 12/2004 | Goldman |
| 6,858,815 B1 | 2/2005 | Costin |
| 6,956,596 B2 | 10/2005 | Kataoka et al. |
| 6,962,609 B2 | 11/2005 | Rogers et al. |
| 6,974,366 B1 | 12/2005 | Johnson |
| 7,005,603 B2 | 2/2006 | Addington et al. |
| 7,054,043 B2 | 5/2006 | Mengel et al. |
| 7,057,756 B2 | 6/2006 | Ogasahara et al. |
| 7,072,733 B2 | 7/2006 | Magee et al. |
| 7,100,341 B2 | 9/2006 | McIlvaine |
| 7,240,408 B2 | 7/2007 | Latos et al. |
| 7,260,445 B2 | 8/2007 | Weiser et al. |
| 7,324,867 B2 | 1/2008 | Dinauer et al. |
| 7,699,896 B1 | 4/2010 | Colwell |
| 7,708,483 B2 | 5/2010 | Samii et al. |
| 7,728,931 B2 | 6/2010 | Hoffmuller |
| 7,863,584 B2 | 1/2011 | Tardif et al. |
| 7,937,173 B2 | 5/2011 | Weill et al. |
| 8,048,608 B2 | 11/2011 | Jarvis et al. |
| 8,278,244 B2 | 10/2012 | Stubbs et al. |
| 8,405,885 B2 | 3/2013 | Shah et al. |
| 8,460,566 B2 | 6/2013 | Costin, Jr. |
| 8,529,775 B2 | 9/2013 | Costin et al. |
| 8,556,319 B2 | 10/2013 | Petouhoff et al. |
| 8,581,142 B2 | 11/2013 | Colico et al. |
| 8,585,956 B1 | 11/2013 | Pagryzinski et al. |
| 8,794,724 B2 | 8/2014 | Costin, Sr. et al. |
| 8,849,444 B2 | 9/2014 | George |
| 8,883,293 B2 | 11/2014 | Weedlun et al. |
| 8,921,732 B2 | 12/2014 | Costin et al. |
| 8,974,016 B2 | 3/2015 | Costin, Sr. et al. |
| 9,034,089 B2 | 5/2015 | Jarvis et al. |
| 9,050,686 B2 | 6/2015 | Costin, Sr. et al. |
| 9,126,423 B2 | 9/2015 | Costin, Sr. et al. |
| 9,213,929 B2 | 12/2015 | Tazaki et al. |
| 9,213,991 B2 | 12/2015 | Bhardwaj et al. |
| 9,333,787 B2 | 5/2016 | Cape et al. |
| 9,364,920 B2 | 6/2016 | Costin et al. |
| 2001/0037999 A1* | 11/2001 | Martin ................ D06P 5/158 219/121.85 |
| 2002/0137417 A1 | 9/2002 | Tebbe |
| 2002/0179580 A1 | 12/2002 | Costin |
| 2003/0089782 A1 | 5/2003 | Reed |
| 2004/0067706 A1 | 4/2004 | Woods |
| 2005/0131571 A1 | 6/2005 | Costin |
| 2006/0014099 A1 | 1/2006 | Faler et al. |
| 2006/0090868 A1 | 5/2006 | Brownfield et al. |
| 2007/0161304 A1 | 7/2007 | Wangbunyen |
| 2007/0205541 A1 | 9/2007 | Allen et al. |
| 2008/0023169 A1 | 1/2008 | Fernandes et al. |
| 2008/0138543 A1 | 6/2008 | Hoshino et al. |
| 2008/0153374 A1 | 6/2008 | Thiriot |
| 2008/0280107 A1 | 11/2008 | Katschorek et al. |
| 2009/0112353 A1 | 4/2009 | Kirefu et al. |
| 2009/0162621 A1 | 6/2009 | Craamer et al. |
| 2009/0266804 A1 | 10/2009 | Costin et al. |
| 2010/0183822 A1 | 7/2010 | Ruggie et al. |
| 2010/0279079 A1 | 11/2010 | Campbell et al. |
| 2011/0101088 A1 | 5/2011 | Marguerettaz et al. |
| 2011/0187025 A1 | 8/2011 | Costin, Sr. |
| 2011/0261141 A1 | 10/2011 | Costin, Sr. et al. |
| 2011/0295410 A1 | 12/2011 | Yamada et al. |
| 2012/0061470 A1 | 3/2012 | Marguerettaz et al. |
| 2012/0182375 A1 | 7/2012 | Shourvarzi et al. |
| 2012/0197429 A1 | 8/2012 | Nykyforov |
| 2014/0165265 A1 | 6/2014 | Tulin et al. |
| 2014/0342903 A1 | 11/2014 | Jarvis et al. |
| 2015/0030821 A1 | 1/2015 | Costin, Sr. et al. |
| 2015/0079359 A1 | 3/2015 | Costin, Jr. |
| 2015/0106993 A1 | 4/2015 | Hoffman et al. |
| 2015/0119238 A1 | 4/2015 | Pretsch et al. |
| 2015/0121965 A1 | 5/2015 | Costin et al. |
| 2015/0153278 A1 | 6/2015 | Erkelenz et al. |
| 2015/0183231 A1 | 7/2015 | Costin, Sr. et al. |
| 2015/0298253 A1 | 10/2015 | Constin, Jr. et al. |
| 2015/0343568 A1 | 12/2015 | Constin, Jr. et al. |
| 2015/0361597 A1 | 12/2015 | Candrian |
| 2016/0016879 A1 | 1/2016 | Bertin et al. |
| 2016/0060807 A1 | 3/2016 | Tharpe et al. |
| 2016/0251782 A1 | 9/2016 | Liao et al. |
| 2016/0263928 A1 | 9/2016 | Costin |
| 2016/0361937 A1 | 12/2016 | Costin, Sr. et al. |
| 2016/0362820 A1 | 12/2016 | Livecchi |

FOREIGN PATENT DOCUMENTS

| | | |
|---|---|---|
| CN | 102371830 A | 3/2012 |
| CN | 102704215 A | 10/2012 |
| CN | 104687695 A | 6/2015 |
| CN | 204398442 U | 6/2015 |
| CN | 204653890 U | 9/2015 |

(56) References Cited

FOREIGN PATENT DOCUMENTS

| | | |
|---|---|---|
| CN | 104983103 A | 10/2015 |
| DE | 1965103 A1 | 7/1971 |
| DE | 3916126 A1 | 11/1990 |
| EP | 0328320 A1 | 8/1989 |
| EP | 1279460 A1 | 1/2003 |
| EP | 1459836 A2 | 9/2004 |
| ES | 2147473 A1 | 9/2000 |
| GB | 1259530 A | 1/1972 |
| GB | 1294116 A | 10/1972 |
| GB | 2199462 A | 7/1988 |
| GB | 2294656 A | 5/1996 |
| GB | 2448763 A | 10/2008 |
| JP | 11291368 A | 10/1999 |
| TW | M276842 U | 5/1994 |
| WO | 8202689 A1 | 8/1982 |
| WO | 01/25824 A2 | 4/2001 |
| WO | WO/2001/025824 | 4/2001 |
| WO | 0214077 A1 | 2/2002 |
| WO | 2004045857 A2 | 6/2004 |
| WO | 2008072853 A1 | 6/2008 |
| WO | 2010017648 A1 | 2/2010 |
| WO | 2011143471 A1 | 11/2011 |
| WO | 2012016316 A1 | 2/2012 |
| WO | 2013137836 A1 | 9/2013 |
| WO | WO/2015/042441 | 3/2015 |
| WO | 2016065134 A1 | 4/2016 |
| WO | WO/2018/035538 | 2/2018 |
| WO | WO/2018/112110 | 6/2018 |
| WO | WO/2018/112113 | 6/2018 |

OTHER PUBLICATIONS

International Search Report, PCT Application PCT/US2018/058595, dated Jan. 30, 2019, 4 pages.
2009 Jeanologia S.L., Jeanologia The Science of Finishing Design Manual English Version, GFK Laser System, 73 pages, 2009, 1st Edition.
2015 Jeanologia, Jeanologia e-Mark Laser Software Manual, 88 pages, EMark, 2.0 Software Manual Rev. A.22, 2015.
2008 Jeanologia S.L., Gfk Laser System, Easy Mar. 2011, 72 pages, EL Rev 2.1, 2011 Easy-Laser, S.L., 2011.
Technical Document: "Jeanologia The Science of Finishing Design Manual English Version," 73 pages, 2009, published by the Spanish company Jeanologia.
Video (screen shots/captures): "e-Mark 3.0", uploaded on Apr. 7, 2016 by user Jeanologia, captured from URL: https://www.youtube.com/watch?v=2y260qu5fiA&feature=youtu.be (24 pages).
Technical Document: "Jeanologia e-Mark Laser" Software Manual, 2015, 88 pages.
Video (screen shots/captures): "Lightelier", uploaded on Oct. 1, 2013 by user Jose Cados Rodriguez, captured from URL: https://www.youtube.com/watch?v=FkyVvFx9X6Y.
Video (screen shots/captures): "Lasers! Gas! Water-Proof Pants! How Levi Strauss & Co. Keeps Improving Jeans", uploaded on Mar. 1, 2015 by user Fast Company, captured from URL: https://www.youtube.com/watch?v=nkMwmf57APU&t=151 s.
Technical Document: "GFK Laser System Easy Mar. 2012, Software Manual," Jeanologia, S.L., 2012, 41 pages.
Technical Document: "GFK Laser System Easy Mar. 2011" Manual, Jeanologia, The Science of Finishing, 2008, Jeanologia S.L., 72 pages.
Concise Description of Relevance for US 2005/0131571 A1, U.S. Appl. No. 16/177,407 File History, Nov. 26, 2019.
Concise Description of Relevance for US 2016/0263928 A1, 3 pages, U.S. Appl. No. 16/177,407 File History, Nov. 26, 2019.
Concise Description of Relevance for WO 01/25824 A2, 10 pages, U.S. Appl. No. 16/177,407 File History, Nov. 26, 2019.
Concise Description of Relevance for Technical Document Titled "Design Manual" published by the Spanish company Jeanologia in 2009 in relation to its them commercially available GFK laser machinery, 6 pages, U.S. Appl. No. 16/177,407 File History, Nov. 26, 2019.
Concise Description of Relevance for US US 2005/0131571 Al, 9 pages, U.S. Appl. No. 16/177,407 File History, Nov. 26, 2019.
Concise Description of Relevance for Screen Captures from YouTube Video Clip Entitled "Lightelier" Uploaded on Oct. 1, 2013 by user "Jose Carlos Rodriguez," uploaded from https://www.youtube.com/watch?v=FkyVvFx9X6Y, 8 pages, U.S. Appl. No. 16/177,407 File History, Nov. 26, 2019.
Concise Description of Relevance for "Jeanologia Emark Software Manual," 7 pages, U.S. Appl. No. 16/177,407 File History, Nov. 26, 2019.
Concise Description of Relevance for "GFK Laser System Easy Mar. 2012 Software Manual," 6 pages, U.S. Appl. No. 16/177,407 File History, Nov. 26, 2019.
Concise Description of Relevance for "GFK Laser System Easy Mar. 2011 Manual," 5 pages, U.S. Appl. No. 16/177,407 File History, Nov. 26, 2019.
Concise Description of Relevance for Screen Captures from YouTube Video Clip entitled "Lasers! Gas! Water-proof Pants! How Levi Strauss & Co. Keeps Improving Jeans" uploaded on Mar. 1, 2015 by user "Fast Company", https://www.youtube.com/watch?v=nkmwmf57apu&t=151s, 3 pages, U.S. Appl. No. 16/177,407 File History, Nov. 26, 2019.

* cited by examiner

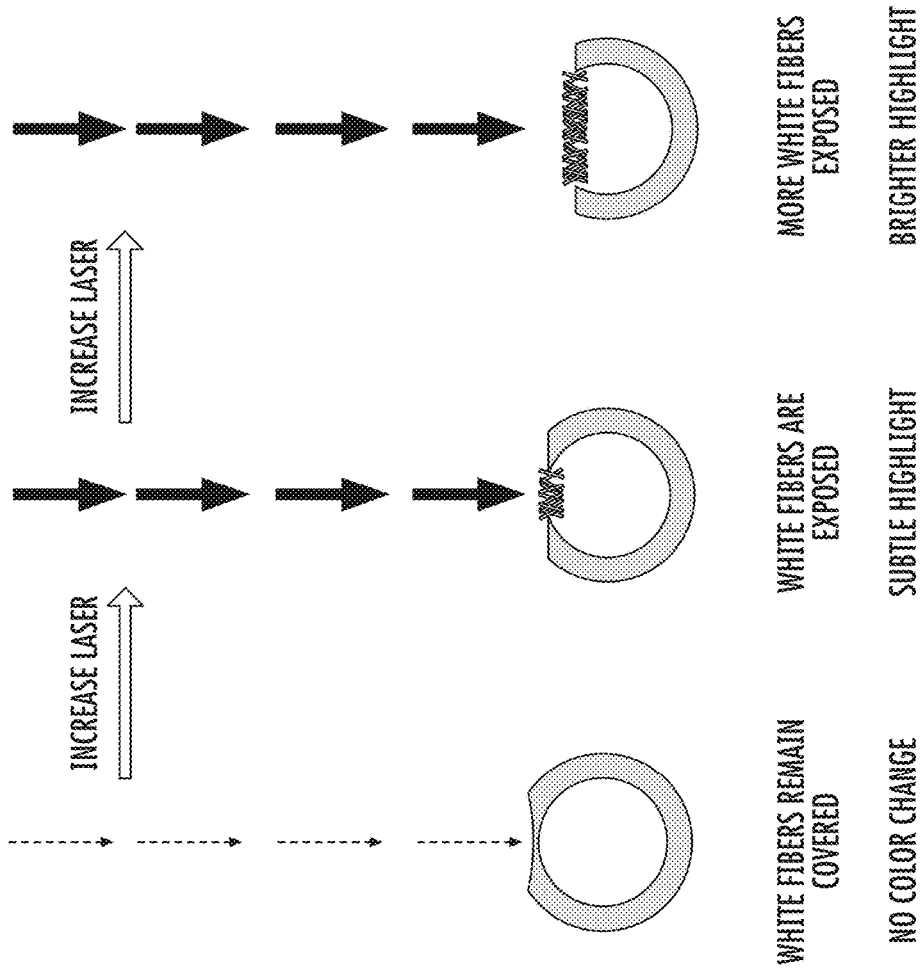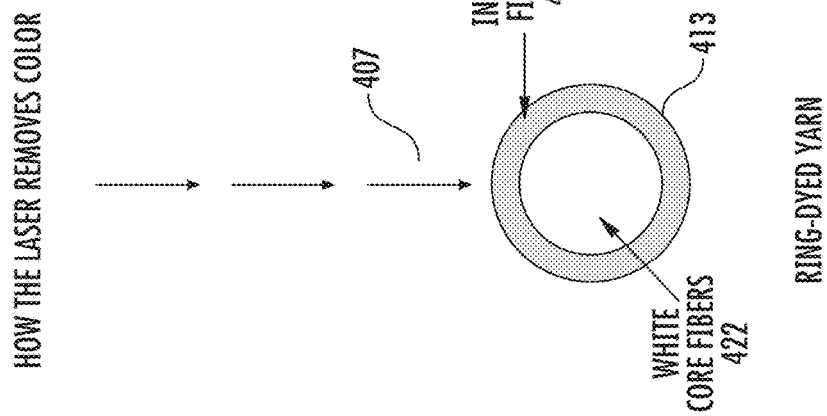

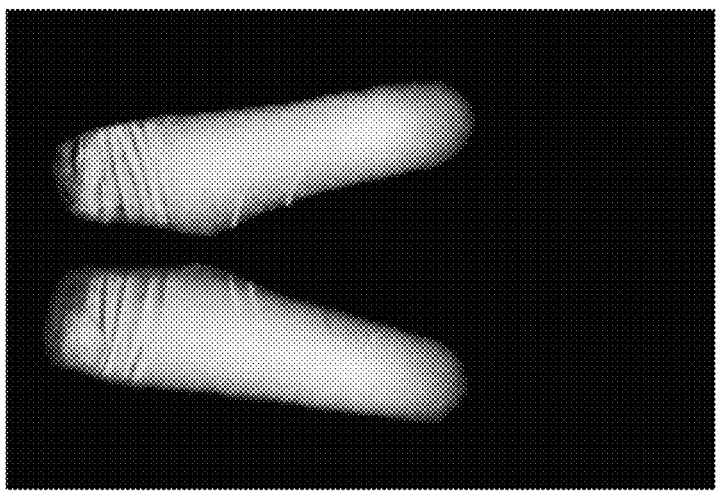
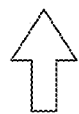
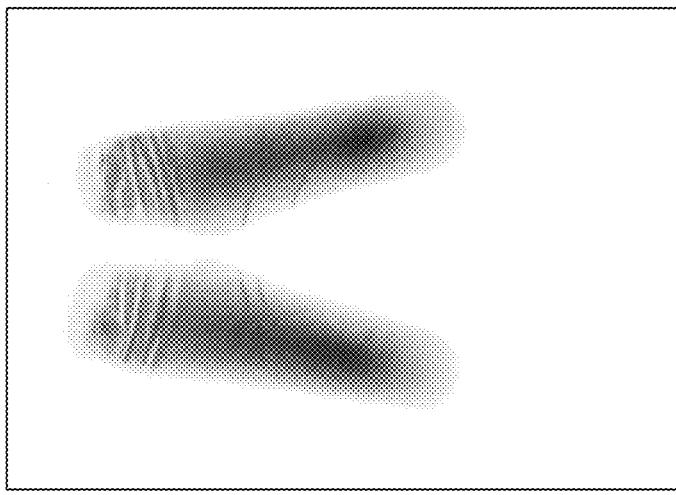
FIG. 20

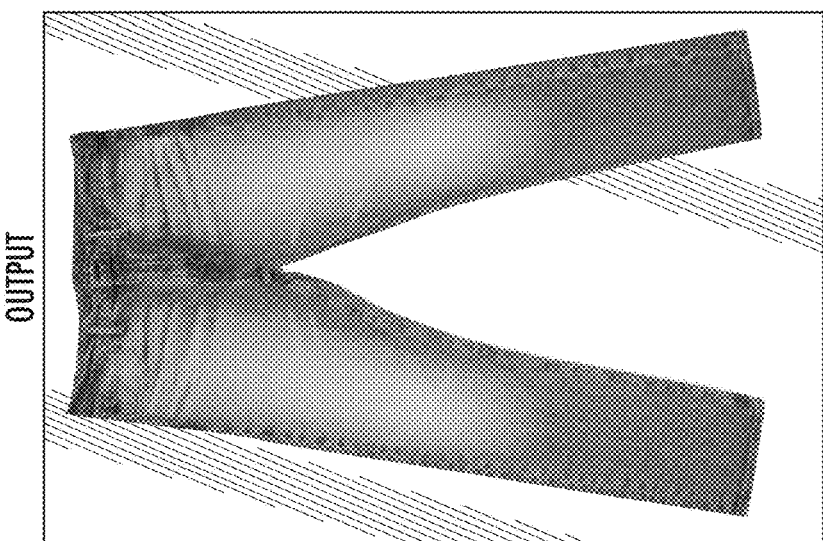
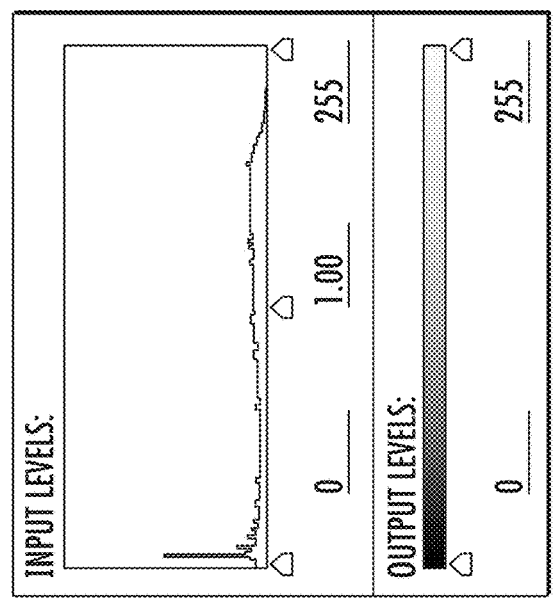
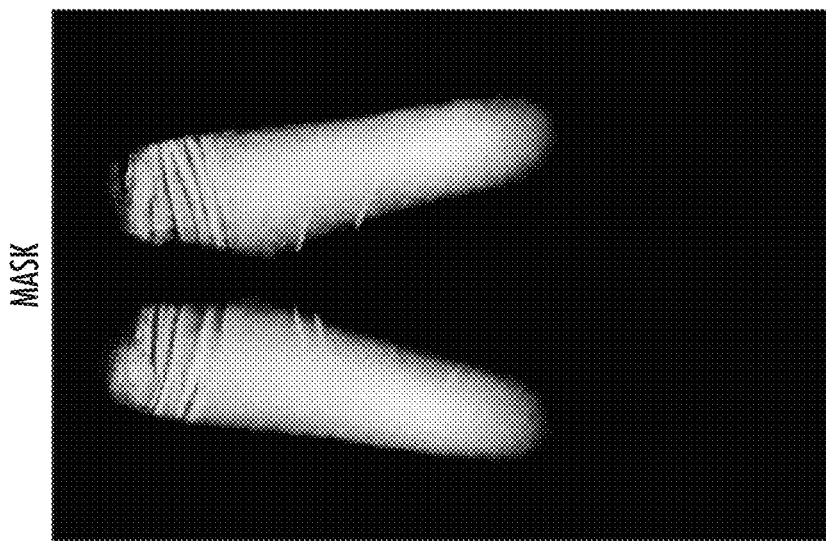
FIG. 23

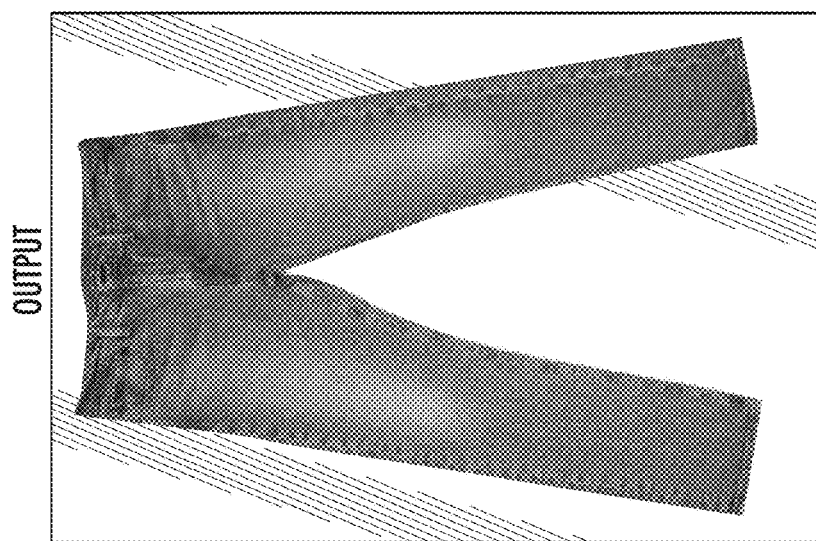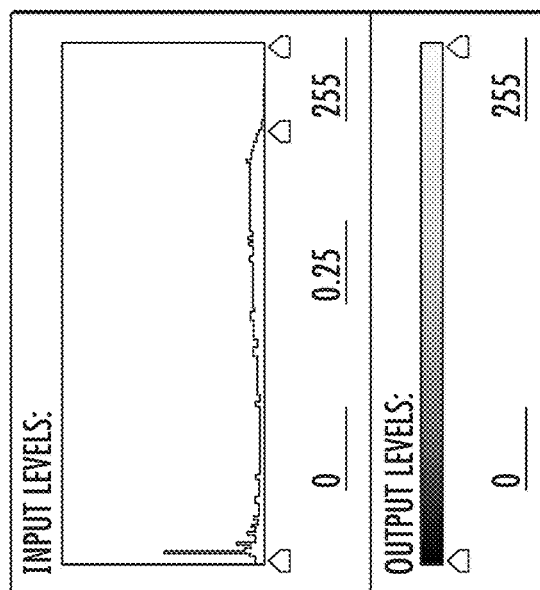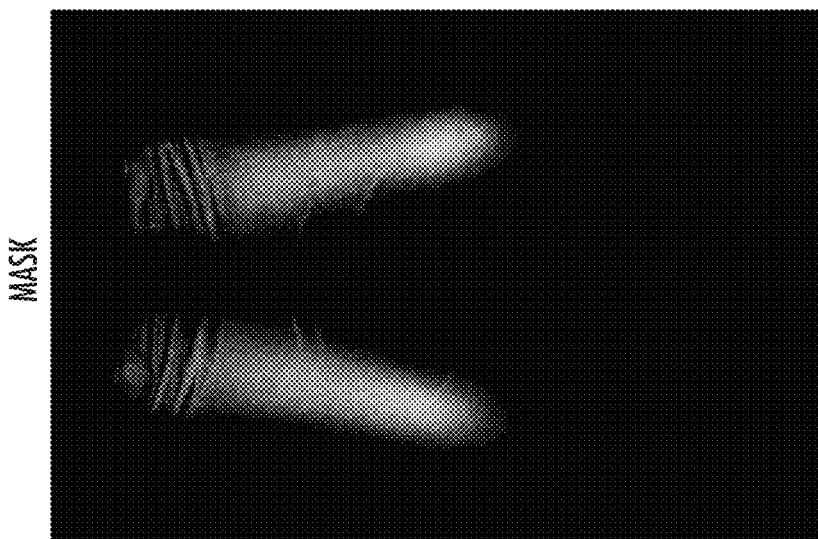
FIG. 24

MEN'S        WOMEN'S
SERIES
500
FIT
511   519   501   501 SHORTS   541
FABRIC
TD-D3S518   NAVEENA-NDL-4190-01   USDENIM-1722AN-RS01

FIG. 31

LASER FINISHING DESIGN TOOL WITH IMAGE PREVIEW

CROSS-REFERENCE TO RELATED APPLICATIONS

This patent application claims is a continuation of U.S. patent application Ser. No. 16/177,407, filed Oct. 31, 2018, issued as U.S. Pat. No. 10,921,968 on Feb. 16, 2021, which claims the benefit of U.S. patent application 62/579,863, filed Oct. 31, 2017. These applications are incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to apparel finishing and, more specifically, the use of a laser in the finishing of garments, especially denim including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for an improved process for finishing jeans that reduces environmental impact, processing time, and processing costs, while maintaining the look and style of traditional finishing techniques. There is a need for tool to creating and previewing patterns on jeans before laser finishing.

BRIEF SUMMARY OF THE INVENTION

A tool allows a user to create new designs for apparel and preview these designs before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

In an implementation, a method includes providing a garment previewing tool that allows previewing on a computer screen of a jeans garment customized by the user with a finishing pattern created using a laser input file by a laser. The garment previewing tool includes: providing an option for the user to select a jeans garment base and upon the user's selection, showing a first garment preview image on the computer screen including a jeans base image for the selected garment base; providing an option for the user to select a wear pattern from a menu of wear patterns, where each wear pattern is associated with a laser input file to be used by a laser to produce that wear pattern onto a jeans garment; after the wear pattern is selected, showing a second garment preview image on the computer screen including the selected wear pattern in combination with the jeans base image, where the second garment preview image replaces the first garment preview image; in the second garment preview image, allowing the user to select the wear pattern and modify a sizing of the wear pattern relative to the jeans base image, where as the user makes changes, the modified sizing of the wear pattern is displayed to the user in real time; in the second garment preview image, allowing the user to select the wear pattern and modify a position of the wear pattern relative to the jeans base image, where as the user makes changes, the modified positioning of the wear pattern is displayed to the user in real time; and showing a third garment preview image on the computer screen including the jeans base image and selected wear pattern, with modified sizing or modified positioning, or a combination.

The method can further include: providing a target pair of jeans corresponding to the jeans garment base selected by the user; and based on laser input file associated with the third garment preview image including the selected wear pattern with modified sizing or modified positioning, or a combination, using a laser to create a finishing pattern on an outer surface of the target jeans.

In an implementation, a method includes providing a garment previewing tool that allows previewing on a computer screen of a garment customized by the user with a finishing pattern created using a laser input file by a laser. The garment previewing tool includes: providing an option for the user to select a garment base and upon the user's selection, showing a first garment preview image on the computer screen including a base image for the selected garment base; providing an option for the user to select a pattern from a menu of patterns, where each pattern is associated with a laser input file; after the pattern is selected, showing a second garment preview image on the computer screen including the selected pattern in combination with the base image, where the second garment preview image replaces the first garment preview image; in the second garment preview image, allowing the user to select the pattern and alter a sizing of the pattern relative to the base image, where as the user makes changes, the altered sizing of the pattern is displayed to the user in real time; in the second garment preview image, allowing the user to select the pattern and alter a position of the pattern relative to the base image, where as the user makes changes, the altered positioning of the pattern is displayed to the user in real time; and showing a third garment preview image on the computer screen including the base image and selected pattern, with altered sizing or altered positioning, or a combination.

In an implementation, a method includes providing a garment previewing tool that allows previewing on a computer screen of a jeans garment customized by the user with a finishing pattern created using a laser input file by a laser. The garment previewing tool includes: providing an option for the user to select a jeans garment base and upon the user's selection, showing a first garment preview image on the computer screen including a jeans base image for the selected garment base; providing an option for the user to select a wear pattern from a menu of wear patterns, where each wear pattern is associated with a laser input file to be used by a laser to produce that wear pattern onto a jeans garment; after the wear pattern is selected, showing a second garment preview image on the computer screen including the selected wear pattern in combination with the jeans base image, where the second garment preview image replaces the first garment preview image; in the second garment preview image, allowing the user to select the wear pattern and modify a sizing of the wear pattern relative to the jeans base image, where as the user makes changes, the modified sizing of the wear pattern is displayed to the user in real time; in the second garment preview image, allowing the user to select the wear pattern and modify a position of the wear pattern relative to the jeans base image, where as the user makes changes, the modified positioning of the wear pattern is displayed to the user in real time; and showing a third garment preview image on the computer screen including the jeans base image and selected wear pattern, with modified sizing or modified positioning, or a combination.

The method can further include: providing a target pair of jeans corresponding to the jeans garment base selected by the user; and based on laser input file associated with the third garment preview image including the selected wear pattern with modified sizing or modified positioning, or a combination, using a laser to create a finishing pattern on an outer surface of the target jeans. The second garment preview image can be generated by: generating an adjusted base image from the jean base image without the selected wear pattern; generating a pattern mask based on the laser input file associated with the selected wear pattern; for a pixel at a pixel location of the second preview image, obtaining a first contribution for the pixel location of the second preview image by combining a first value for a pixel corresponding to the pixel location for the pattern mask and a pixel corresponding to the pixel location for the jeans base image; for the pixel at the pixel location of the second preview image, obtaining a second contribution at the pixel location for the second preview image by combining a second value for a pixel corresponding to the pixel location for the pattern mask and a pixel corresponding to the pixel location for the adjusted base image; combining the first contribution and second contribution to obtain a color value for a pixel at the pixel location for the second preview image, and displaying the color value for the pixel at the pixel location in the second preview image.

In an implementation, a method includes generating a preview image on a computer screen of a garment with a finishing pattern created using a laser input file by a laser. The generating the preview includes: providing a base image of the assembled garment without the finishing pattern; generating an adjusted base image from the base image of the assembled garment without the finishing pattern; generating a pattern mask based on the laser input file; for a pixel at a pixel location of the preview image, obtaining a first contribution for the pixel location of the preview image by combining a first value for a pixel corresponding to the pixel location for the pattern mask and a pixel corresponding to the pixel location for the base image; for the pixel at the pixel location of the preview image, obtaining a second contribution at the pixel location for the preview image by combining a second value for a pixel corresponding to the pixel location for the pattern mask and a pixel corresponding to the pixel location for the adjusted base image; combining the first contribution and second contribution to obtain a color value for a pixel at the pixel location for the preview image; and displaying the generated preview image on the computer screen including the color value for the pixel at the pixel location.

In an implementation, a method includes providing a garment previewing tool that allows previewing on a computer screen of a garment customized by the user with a finishing pattern including a damage asset created using a damage asset laser input file by a laser, where the garment previewing tool includes: providing an option for the user to select a garment base and upon the user's selection, showing a first garment preview image on the computer screen including a base image for the selected garment base; providing an option for the user to select a damage asset from a menu of damage assets, where each damage asset is associated with a damage asset laser input file; after the damage asset is selected, showing a second garment preview image on the computer screen including the selected damage asset in combination with the base image, where the second garment preview image replaces the first garment preview image; in the second garment preview image, allowing the user to select the damage asset and alter a sizing of the damage asset relative to the base image, where as the user makes changes, the altered sizing of the damage asset is displayed to the user in real time; in the second garment preview image, allowing the user to select the damage asset and alter a position of the damage asset relative to the base image, where as the user makes changes, the altered positioning of the damage asset is displayed to the user in real time; and showing a third garment preview image on the computer screen including the base image and selected damage asset, with altered sizing or altered positioning, or a combination.

The damage asset can be created by: creating a damage shape in a black color and storing in a damage asset laser input file, where the damage shape is associated with the damage asset; based on the damage asset laser input file, using a laser to form the digital asset on a fabric; capturing an image of the damage asset on the fabric, and using the image of the damage asset in the second garment preview image.

In an implementation, a method includes: creating a first damage shape in a black color; creating a second damage shape in a black color, where the second damage shape is different from the first damage shape; storing the first damage shape and second damage shape in a damage asset laser input file; based on the damage asset laser input file, using a laser to form holes in a fabric based on the first and second damage shapes; washing the fabric with the holes; capturing a first image of a first hole in the fabric that corresponds to the first shape; capturing a second image of a second hole in the fabric that corresponds to the second shape; using the first image as a first damage asset; using the second image as a second damage asset; providing a garment previewing tool that allows previewing on a computer screen of a garment customized by the user with a finishing pattern including one or more damage assets to be created using a laser; in the garment previewing tool, providing an option for the user to select a damage asset from a menu of damage assets including the first damage asset and the second damage asset; when the user selects the first damage asset, showing the first image as part of a preview image of a garment being customized by the user; and when the user selects the second damage asset, showing the second image as part of the preview image of a garment being customized by the user.

In an implementation, a method includes: assembling a garment made from fabric panels of a woven first material including a warp including indigo ring-dyed cotton yarn, where the fabric panels are sewn together using thread; creating an image of a damage shape in a single color; storing the damage shape a damage asset laser file; based on the damage asset laser file, using a laser to form a hole in a second material based on the damage shape; washing the second material with the hole; capturing an image of the hole in the second material that corresponds to the damage shape; using the image of the hole in the second material as a preview image of damage asset; allowing a user to select the damage asset using the preview image for use on the garment; using a laser to create the damage asset on an outer surface of the garment based on a laser input file including the damage shape, where based on the laser input file, at a location specified for damage asset, the laser forms a hole in the first material in a shape corresponding the damage shape.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-7 show how the laser alters the color of ring-dyed yarn.

FIG. 20 shows a laser pattern mask that is created from a laser input file.

FIGS. 23-24 show examples of two different adjustments for bright point.

FIG. 31 shows a screen of a series selection feature of the digital brief tool.

DETAILED DESCRIPTION OF THE INVENTION

Figure 1:
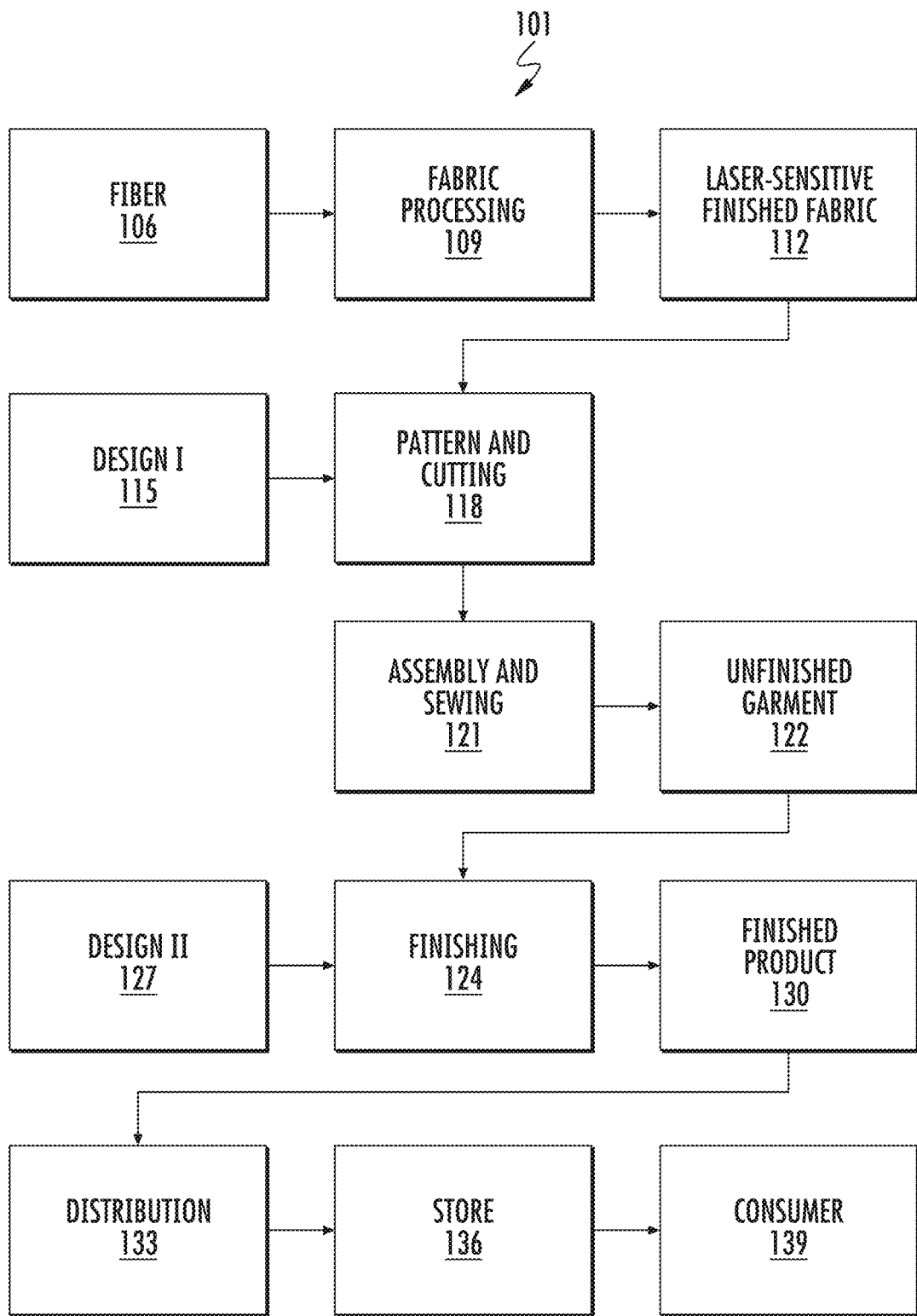
FIG. 1 shows a block diagram of a system for creating, designing, producing apparel products with laser finishing.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandax), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and have additional finishing 124, which includes laser finishing. The finishing may include tinting, washing, softening, and fixing. For distressed denim products, the finishing can include using a laser to produce a wear pattern according to a design 127 (design II). Some additional details of laser finishing are described in U.S. patent application 62/377,447, filed Aug. 19, 2016, and Ser. No. 15/682,507, filed Aug. 21, 2017, issued as U.S. Pat. No. 10,051,905 on Aug. 21, 2018, are incorporated by reference along with all other references cited in this application. U.S. patent applications 62/636,108, filed Feb. 27, 2018, and 62/715,788, filed Aug. 7, 2018, describe some specific implementations of a brief builder application and are incorporated by reference.

Design 127 is for postassembly aspects of a garment while design 115 is for preassembly aspects of a garment. After finishing, a finished product 130 (e.g., a pair of jeans) is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
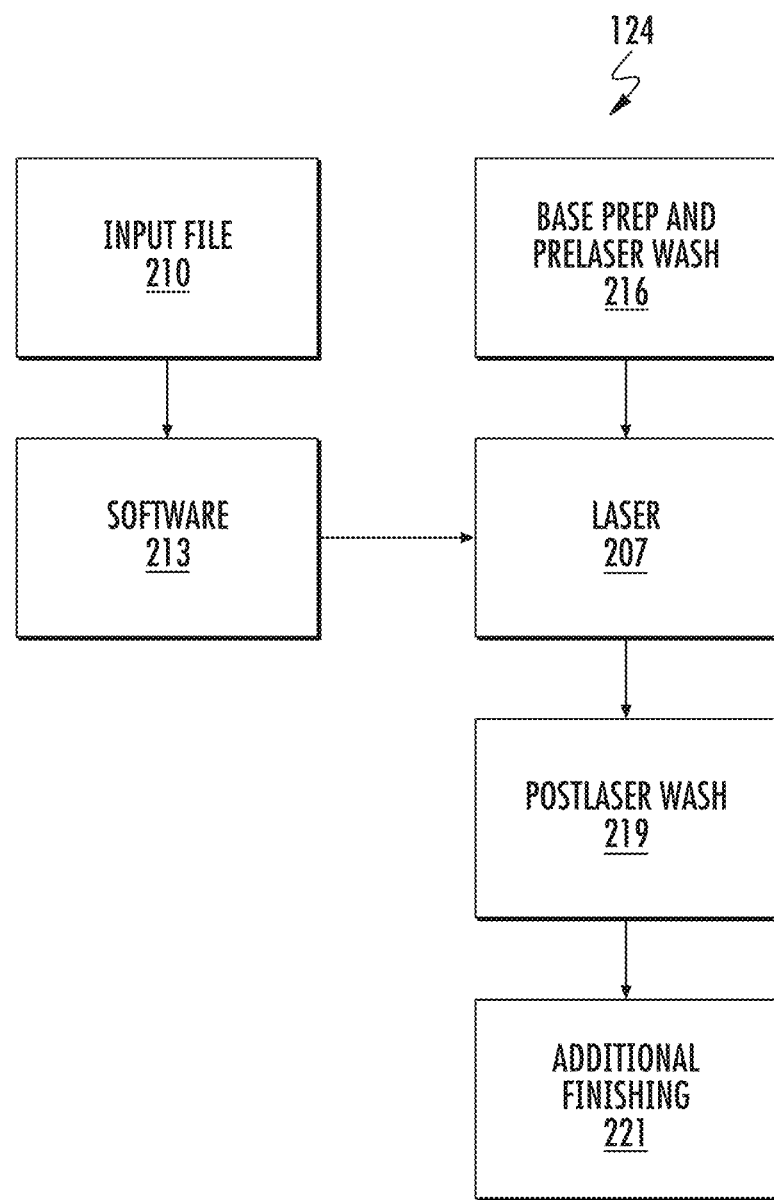
FIG. 2 shows a flow for a finishing technique that includes the use of a laser.

FIG. 2 shows a finishing technique that includes the use of a laser 207. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 210) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue colored fabric. The blue color is caused by chromophores trapped in the fabric which reflect light as a blue color. U.S. patent application 62/433,739, filed Dec. 13, 2016, which is incorporated by reference, describes a denim material with enhanced response characteristics to laser finishing. Using a denim material made from indigo ring-dyed yarn, variations in highs and lows in indigo color shading is achieved by using a laser.

Figure 3:
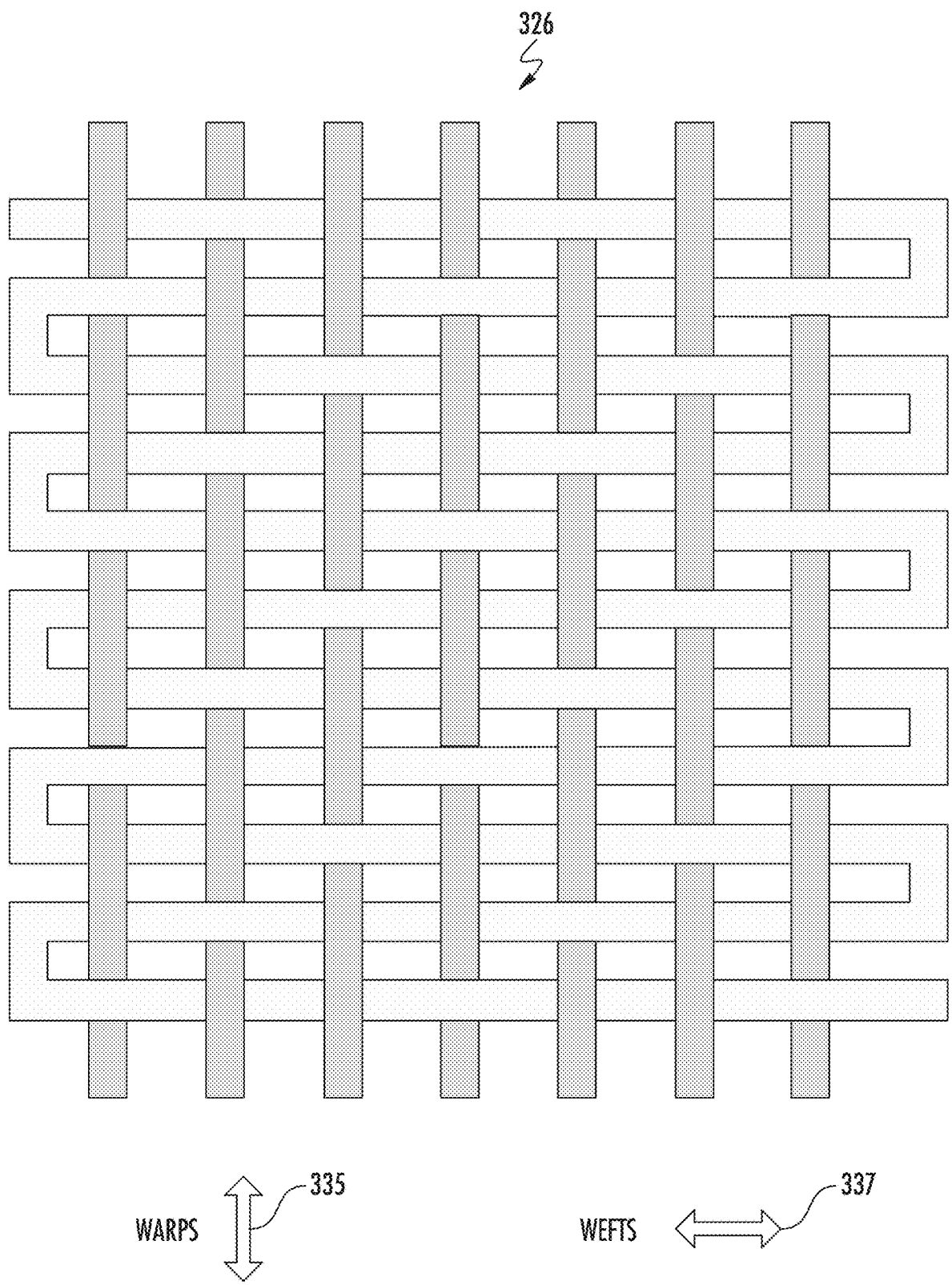
FIG. 3 shows a weave pattern for a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from an lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes.

FIG. 5 shows the laser using a first power level setting or first exposure time setting, or a combination of these, to remove some of the dyed fibers, but not revealing any of the white core fibers. The undyed fibers remain covered. There is no color change.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a postlaser wash 219. This wash can clean or remove any residue caused by the laser, such as removing any charring (which would appear as brown or slightly burning). There can be additional finish 221, which may be including tinting, softening, or fixing, to complete finishing.

Figure 8:
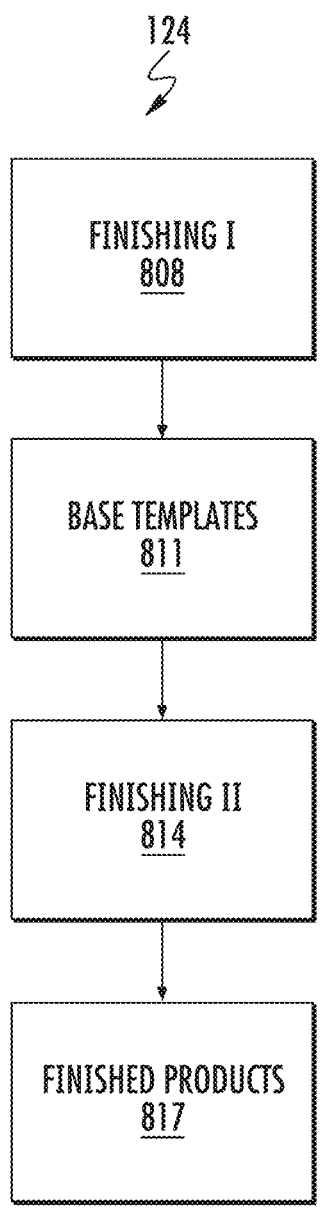
FIG. 8 shows a flow for finishing in two finishing steps and using base templates.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
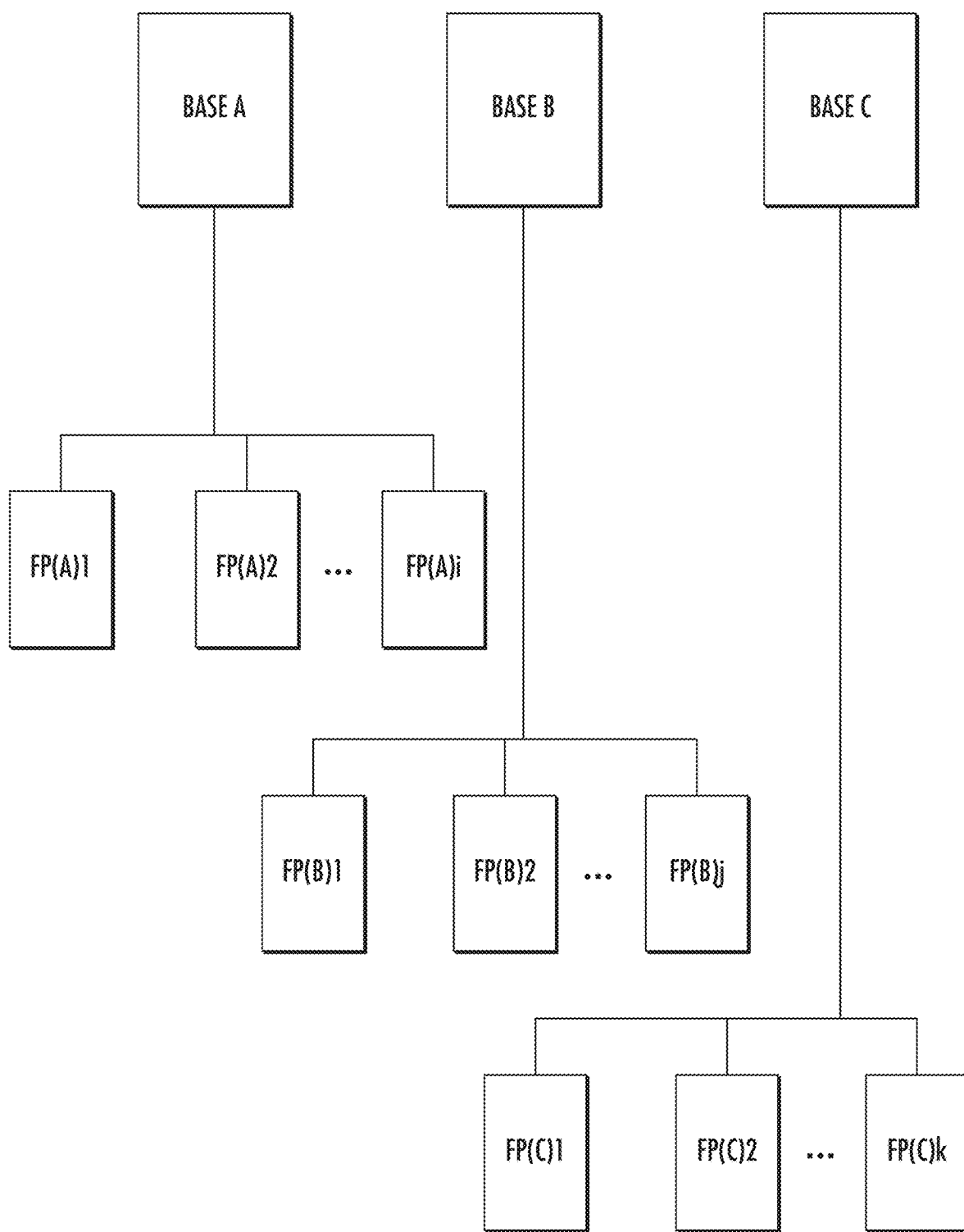
FIG. 9 shows multiple base templates and multiple resulting finished products from each of these templates.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during post laser wash 219 and additional finishing 221. For example, during the postlaser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different postlaser wash (e.g., postlaser wash recipe 1, postlaser wash recipe 2, postlaser wash recipe 3, or others), or any combination of these. A first product would be base fit fabric FP(B)1 lasered using laser file 1 and washed using postlaser wash recipe 1. A second product would be base fit fabric FP(B)1 lasered using laser file 2 and washed using postlaser wash recipe 1. A third product would be base fit fabric FP(B)1 lasered using laser file 2 and washed using postlaser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 10:
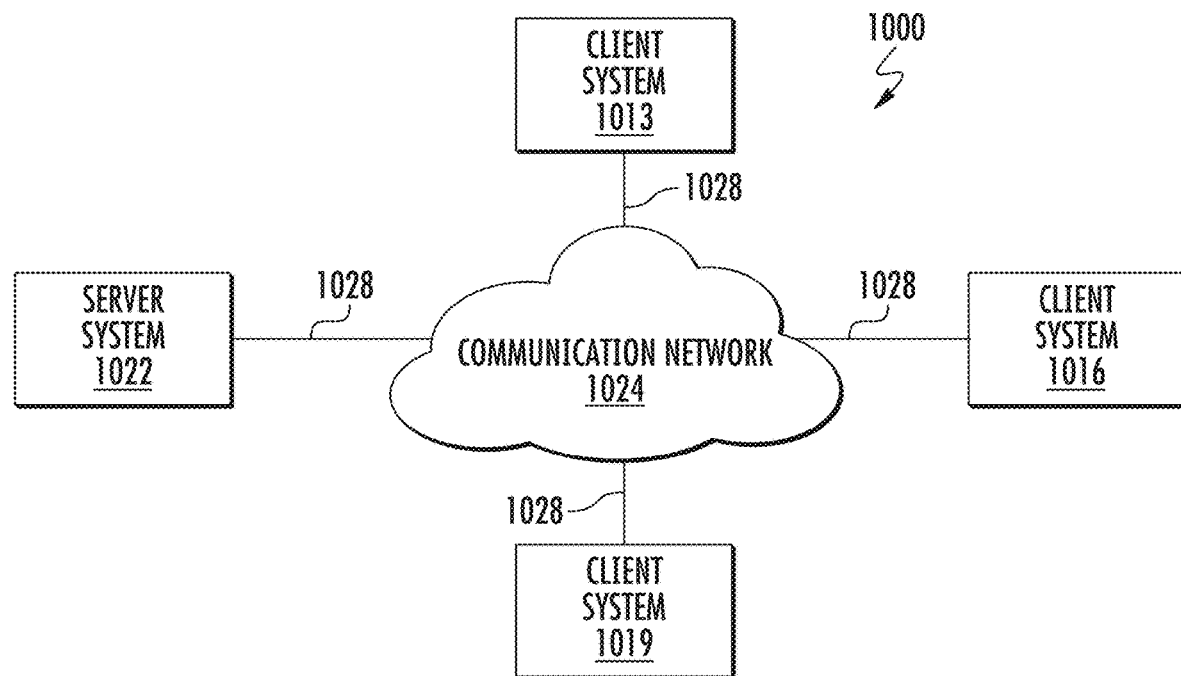
FIG. 10 shows a distributed computer network.

A system incorporating laser finishing can include a computer to control or monitor operation, or both. FIG. 10 shows an example of a computer that is component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
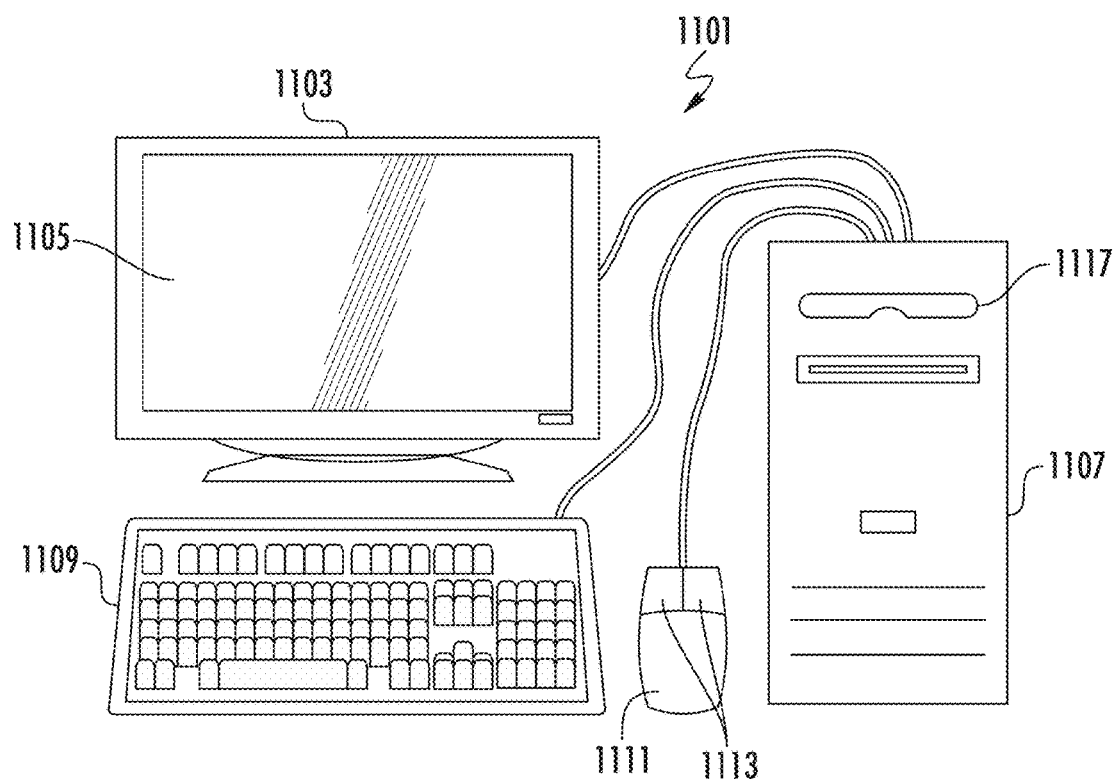
FIG. 11 shows a computer system that can be used in laser finishing.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), keyboard or other human input device 1109, and mouse or other pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad, Apple iPad Pro, or Apple iPad mini), Apple iPod (e.g., Apple iPod Touch), Samsung Galaxy product (e.g., Galaxy S series product or Galaxy Note series product), Google Nexus and Pixel devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
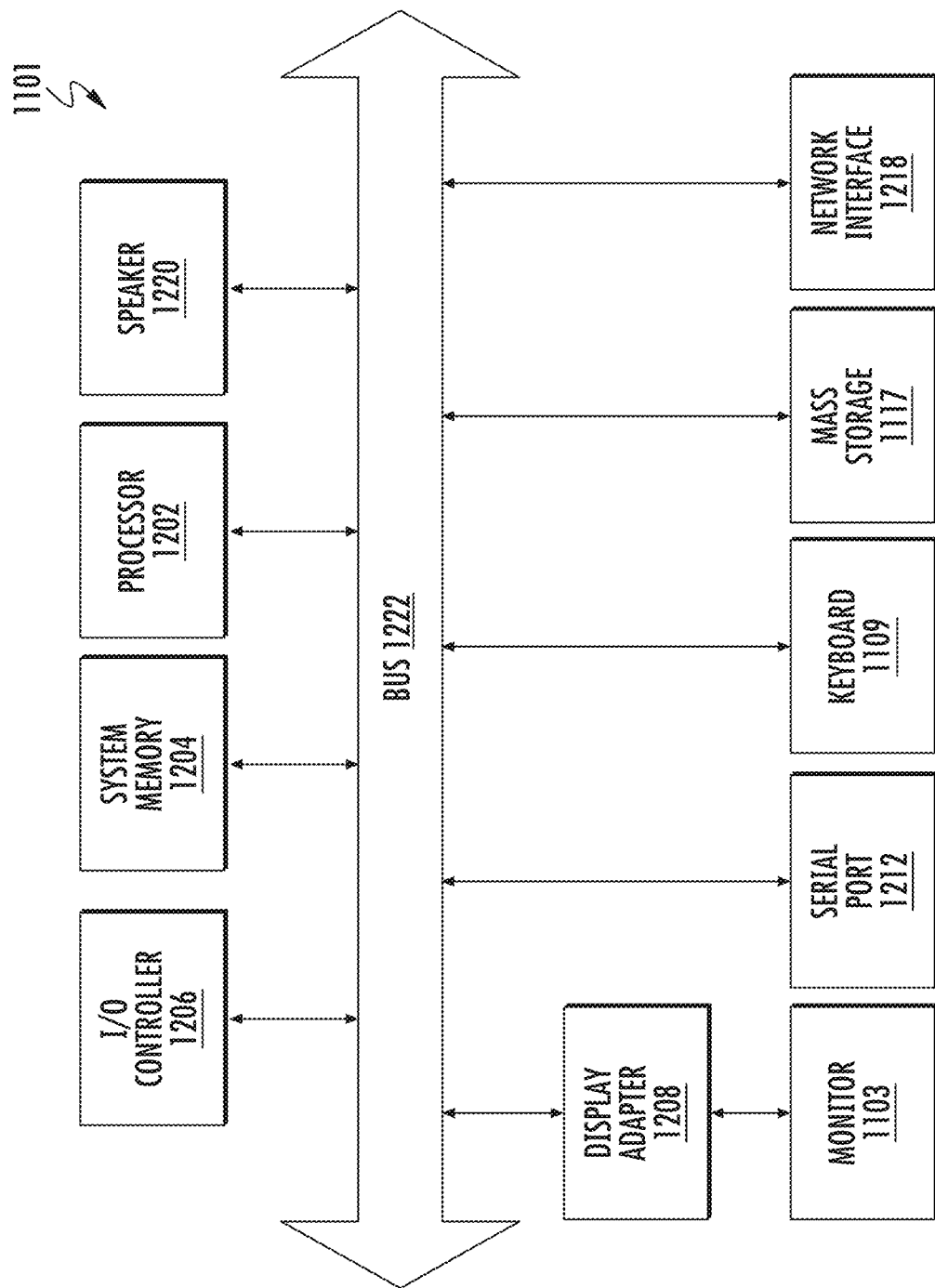
FIG. 12 shows a system block diagram of the computer system.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor 1202, system memory 1204, input/output (I/O) controller 1206, display adapter 1208, serial or universal serial bus (USB) port 1212, network interface 1218, and speaker 1220. The invention may also be used with computer systems with additional or fewer subsystems. For example, a computer system could include more than one processor 1202 (i.e., a multiprocessor system) or a system may include a cache memory.

Arrows such as 1222 represent the system bus architecture of computer system 1101. However, these arrows are illustrative of any interconnection scheme serving to link the subsystems. For example, speaker 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 13:
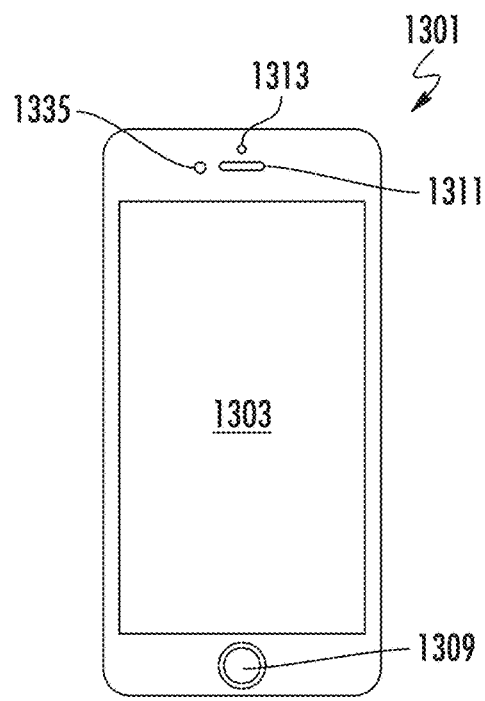
FIGS. 13-14 show examples of mobile devices.
Figure 14:
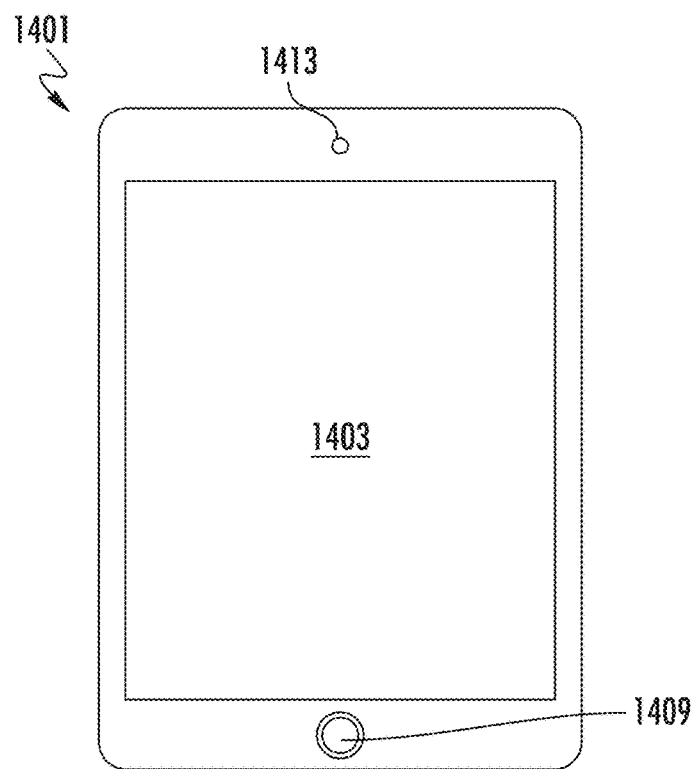

FIGS. 13-14 show examples of mobile devices, which can be mobile clients. Mobile devices are specific implementations of a computer, such as described above. FIG. 13 shows a smartphone device 1301, and FIG. 14 shows a tablet device 1401. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 1301 has an enclosure that includes a screen 1303, button 1309, speaker 1311, camera 1313, and proximity sensor 1335. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 1309 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 1401 is similar to a smartphone. Tablet 1401 has an enclosure that includes a screen 1403, button 1409, and camera 1413. Typically the screen (e.g., touch screen) of a tablet is larger than a smartphone, usually 7, 8, 9, 10, 12, 13, or more inches (measured diagonally).

Figure 15:
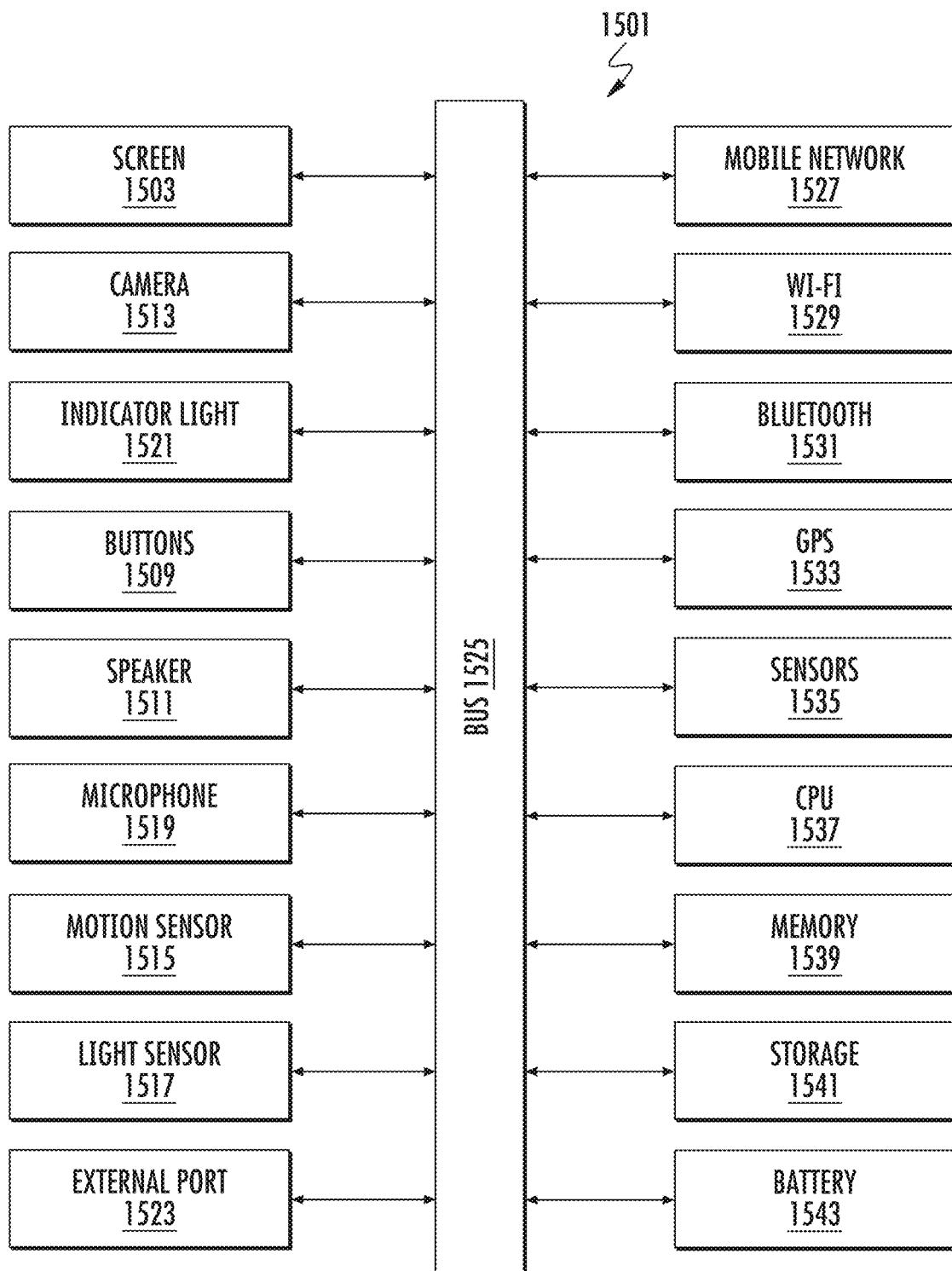
FIG. 15 shows a system block diagram of a mobile device.

FIG. 15 shows a system block diagram of mobile device 1501 used to execute the software of the present invention. This block diagram is representative of the components of smartphone or tablet device. The mobile device system includes a screen 1503 (e.g., touch screen), buttons 1509, speaker 1511, camera 1513, motion sensor 1515, light sensor 1517, microphone 1519, indicator light 1521, and external port 1523 (e.g., USB port or Apple Lightning port). These components can communicate with each other via a bus 1525.

The system includes wireless components such as a mobile network connection 1527 (e.g., mobile telephone or mobile data), Wi-Fi 1529, Bluetooth 1531, GPS 1533 (e.g., detect GPS positioning), other sensors 1535 such as a proximity sensor, CPU 1537, RAM memory 1539, storage 1541 (e.g. nonvolatile memory), and battery 1543 (lithium ion or lithium polymer cell). The battery supplies power to the electronic components and is rechargeable, which allows the system to be mobile.

Figure 16:
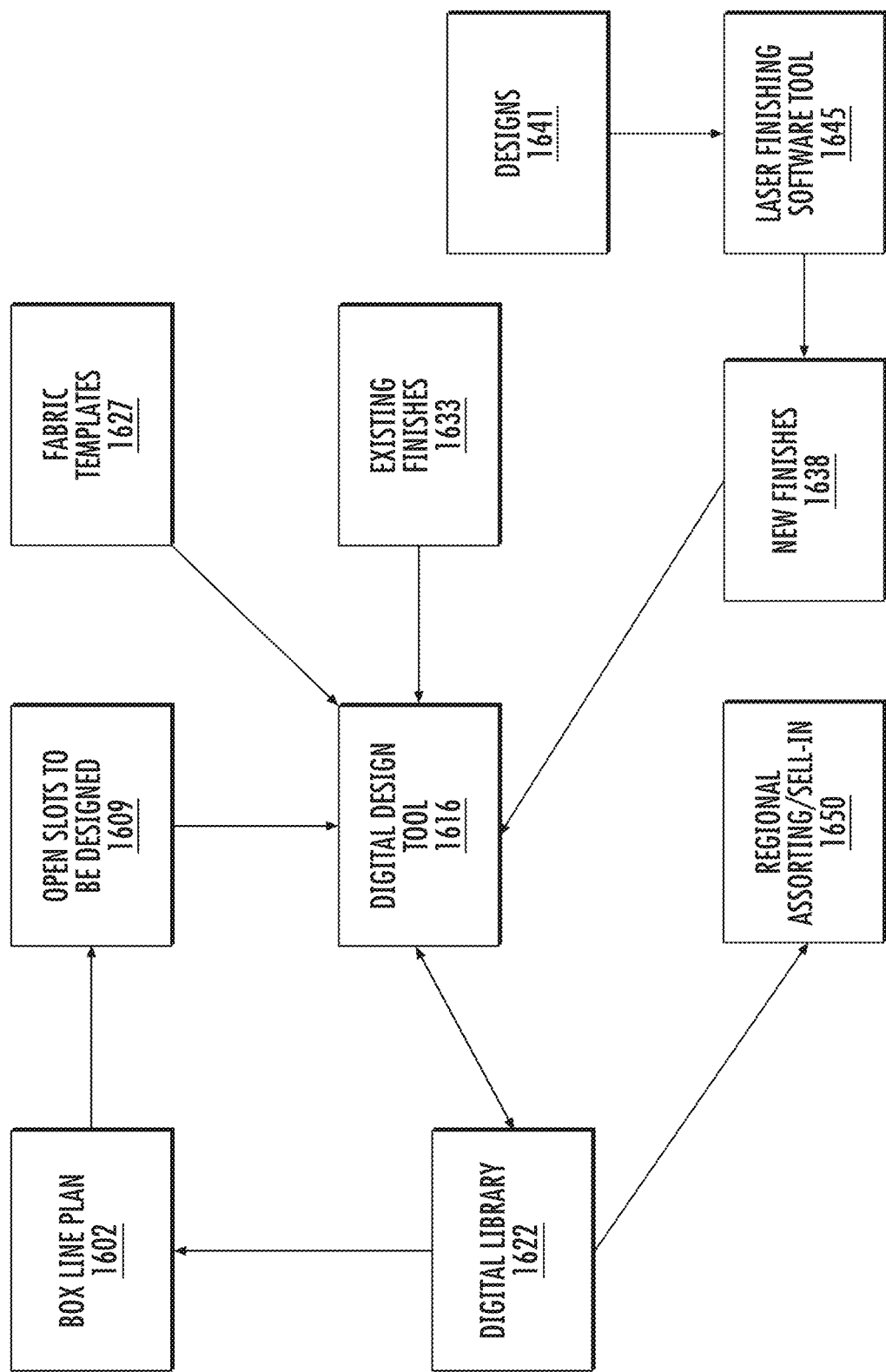
FIG. 16 shows a block diagram of a system for creating, designing, producing apparel products with laser finishing.

FIG. 16 shows a block diagram of a system for creating, designing, producing apparel products with laser finishing. A box line plan 1602 is an internal and interim tool for communication between a merchandising group and design group. Through the box line plan, merchandising can communicate what needs to be designed by the design group. The box line plan can have open slots to be designed 1609.

There is a digital design tool 1616 merchants and design can use to click and drag finish effects (e.g., laser files) and tint casts over images of base washes in order to visualize possible combinations and build the line visually before the garment finish is actually finished by the laser. The visualizations can be by rendering on a computer system, such as using three-dimensional (3D) graphics.

U.S. patent application 62/433,746, filed Dec. 13, 2016, which is incorporated by reference, describes a system and operating model of apparel manufacture with laser finishing. Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used be produce a multitude of laser finishes. Operational efficiency is improved.

Designers can use the digital design tool to design products that are used to satisfy the requests in open slots 1609. Designs created using the digital design tool can be stored in a digital library 1622. Input to the digital design tool include fabric templates or blanks 1627 (e.g., base fit fabrics or BFFs), existing finishes 1633 (e.g., can be further modified by the tool 1616), and new finishes 1638. New finishes can be from designs 1641 (e.g., vintage design) captured using a laser finish software tool 1645, examples of which are described in U.S. patent applications 62/377,447, filed Aug. 19, 2016, and Ser. No. 15/682,507, filed Aug. 21, 2017. Digital library 1622 can be accessible by the region assorting and sell-in 1650. And the digital library can be used populate or satisfy the box line plan.

Figure 17:
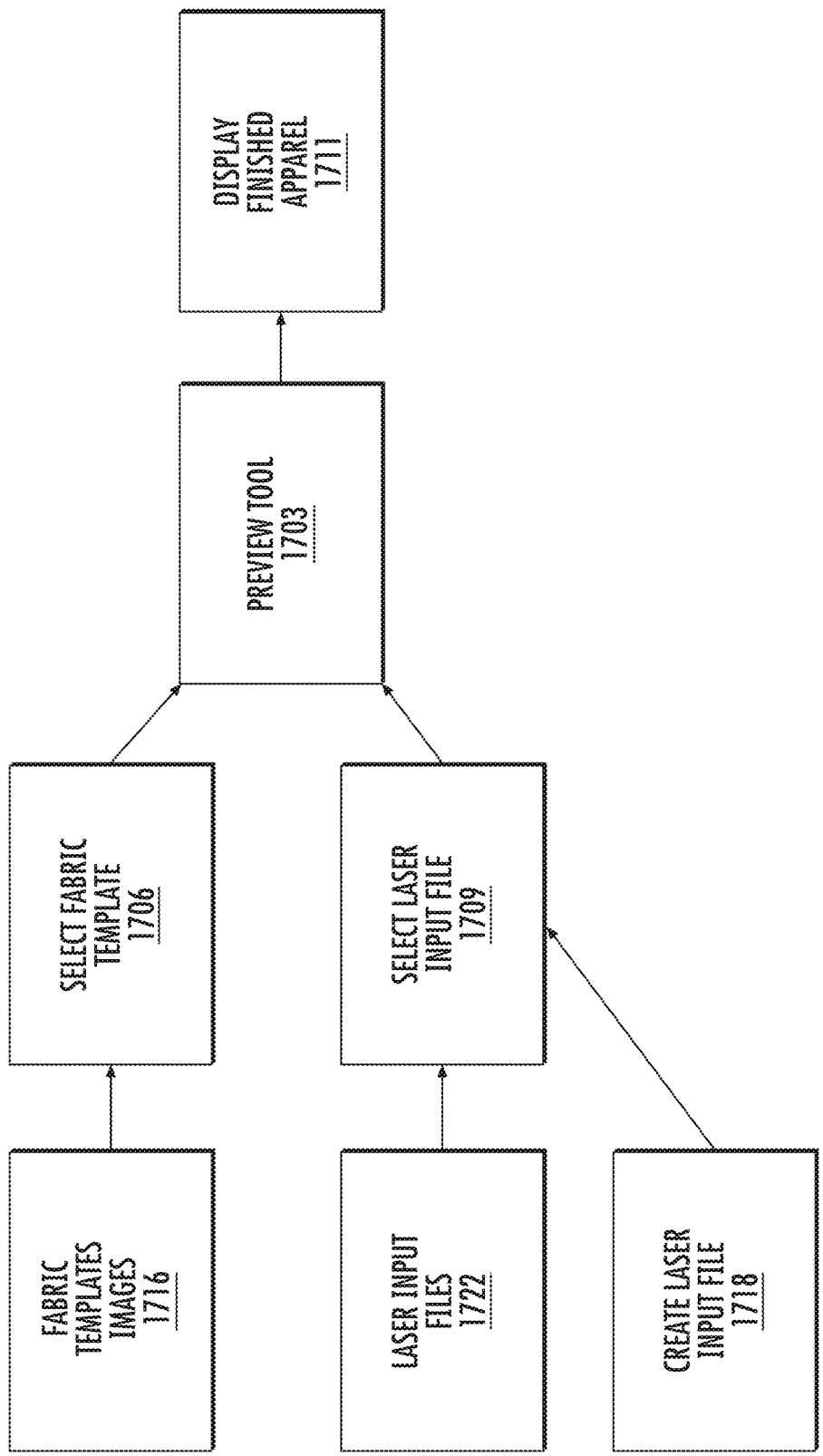
FIG. 17 shows a block diagram of a specific implementation of a preview tool.

FIG. 17 shows a block diagram of a specific implementation of a digital design tool, a preview tool 1703. Digital design tool 1616 can be representative of a collection of tools, such as an application suite, including desktop or mobile apps, or a combination.

Preview tool 1703 can be a single tool in a toolbox or toolkit used for laser finishing of garments, or the tool can be incorporated as a feature of another tool. The preview tool allows a user such as a clothing designer to preview on a computer screen or to generate a digital representation (e.g., image file, JPEG file, BMP file, TIFF file, GIF file, PNG file, PSD file, or others) of jeans in a selected base fit fabric or fabric template 1706 with a selected laser pattern 1709 (e.g., from a laser input file). With the digital representation, the user will be able to see or preview the jeans in the selected base fit fabric as if it had been burned with the selected laser input file, without needing to actually laser or burn the jeans.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The fabric template can be selected from a library of fabric template images 1716 or may be a new image uploaded or provided by the user. Each fabric template images is an image file of a jeans in a base fit fabric or other material. For each jeans model or fit (e.g., models or fits 311, 501, 505, 511, 515, 541, 569, 721, and others), there would be one image in each different material or base fit fabric.

The laser input file can be selected from a library of laser input files 1722 (e.g., files created from vintage jeans or from a group of designers), may be a file 1718 created by the user, or may be a file uploaded or provided by the user. For example, the user may have created the laser pattern (contained within a laser input file) manually using a graphical or image editing tool (e.g., Adobe Photoshop and similar photo editing programs). Or the laser pattern may have been created by another, such as selected from a library of laser files. The laser pattern may be generated by a computer or automated process, such as may be used to obtain a laser pattern from vintage jeans. The user will be able to see the results of a burn, make any manual changes or alterations to the pattern (such as additional changes to a vintage jean pattern in a digital image file) and preview the results again. The preview tool allows a user to make and see changes, to the user can obtain feedback faster than having to laser jeans to see the results and also avoiding unneeded waste (e.g., preliminary versions of burned jeans).

Each digital representation can be saved in a separate images, and a group or set of the images can be a called brief of collection of jeans. The preview tool can be used for merchandising, such as generating images of a proposed line of products for a particular season, and these images can be shared among members of a team to discuss any additions, changes, or deletions to a collection.

A table below presents a pseudocode computer program listing of sample software code for a specific implementation of a preview tool 1703 for displaying finished apparel 1711 for a given fabric template input (e.g., base fit fabric image) and laser input file. A specific implementation of the source code may be written in a programming language such as Python. Other programming languages can be used.

TABLE

| PREVIEW PATTERN TOOL |
| --- |
| SETUP: file selection object |
| GET: input file from user selection |
| ASSIGN: default blur options for high and low settings |
| ASSIGN: input and conversion dpi settings |
| FUNCTION: Import File (File List, File Index): |
| IMPORT: file being previewed |
| COMPUTE AND SET: resolution conversion factor |
| CALCULATE: optional resized image for use during preview |
| RETURN: input file and resized input file |
| RUN: Import File (File List, File Index) |

TABLE-continued

PREVIEW PATTERN TOOL

CREATE: plotting object to display results to user
SETUP: custom colors for preview options
ASSIGN: color and color separation variables
SETUP: graphical user interface interactions buttons, sliders, etc.
FUNCTION: Update (Value):
READ: current display settings
CHECK: which user interactions are being changed
ASSIGN: operation variable value
PERFORM: user specified operation
REDRAW: plot of image preview to user
FUNCTION: Reset (Event):
RESET: all default settings for image preview
FUNCTION: Change Color (color):
SET: color of base color for preview
REDRAW: plot of image preview to user
PLOT: current state of file object A specific version of the preview tool overlays a fabric template input file and a laser input file, and then generates an image to display them together as a representation of the laser-finished apparel. The laser input file is aligned to the garment in the fabric template input file, so that the positioning of features in the laser input file and at appropriate positions or places on the garment. The alignment may be by using alignment marks that are in the input files. The alignment may be an automated alignment or scaling, or a combination.

Brightness, intensity, opacity, blending, transparency, or other adjustable parameters for an image layer, or any combination of these, are selected or adjusted for the laser input file, so that when the laser input file is overlaid above the fabric template image, the look of the garment will appear of simulate the look of a garment had been burned by a laser using that laser input file.

Adjustable parameters such as opacity can be used to blend two or more image layers together. For example, a layer's overall opacity determines to what degree it obscures or reveals the layer beneath it. For example, a layer with 1 percent opacity appears nearly transparent, while one with 100 percent opacity appears completely opaque.

Further, a dots per inch (dpi) of the combined image can be adjusted to also more properly simulate the look of a garment more closely with a burned garment. Dots per inch refers to the number of dots in a printed inch. The more dots, the higher the quality of the print (e.g., more sharpness and detail). By reducing the dpi of the image, this will reduce the image quality, resulting a blurring of the image. In an implementation, the preview tool reduces a dpi of the combined image, to be of less dpi than the fabric template input file or the laser input file. By blurring the preview image, this results in improved simulation that corresponds better to a burned laser garment. When burning a garment, the garment material or fabric typically limits the resolution of the result to less than that of the input file.

In an implementation, the dpi of the laser input file is about 72 dpi, while the dpi of the preview image is about 34 dpi. In an implementation, the dpi of the fabric template input file and laser input file are about 36 dpi or above, while the dpi of the preview image is about 36 dpi or lower.

Figure 18:
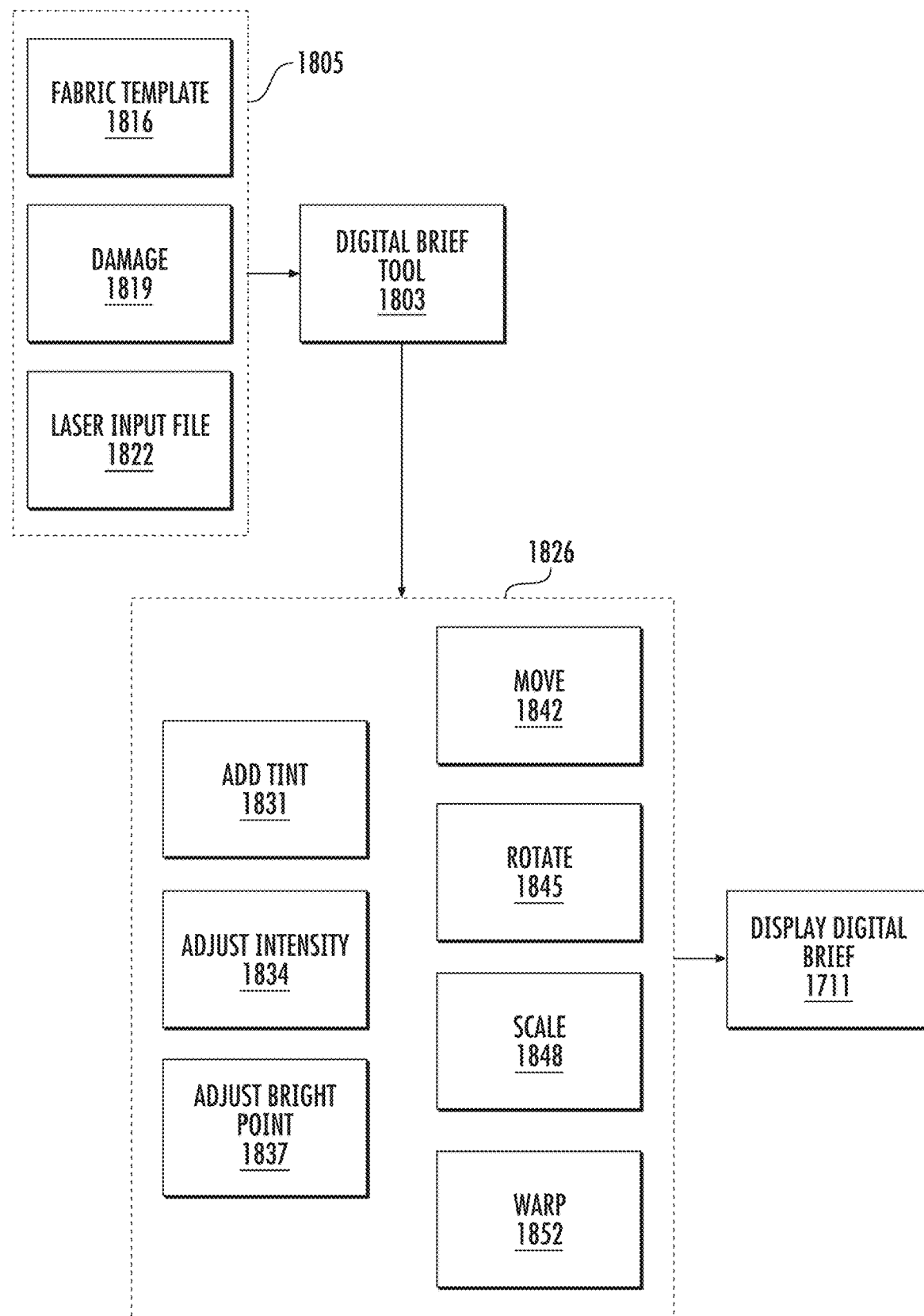
FIG. 18 shows a block diagram of a brief tool.

FIG. 18 shows a block diagram of a digital brief tool 1803, which also like preview tool 1703, provides a real-time preview of an appearance of pair of jeans when a finishing pattern is applied by burning using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

The digital brief tool takes as input three types of digital assets 1805, fabric template input 1816, damage input 1819, and laser input file 1822. Fabric template input 1816 and laser input file 1822 are similar to the inputs for the preview tool. Damage input 1819 is an image of damage (e.g., holes, rips, shredded regions, or openings of various shapes and sizes) that can be burned by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 1826 on the inputs using the digital brief tool. These operations including adding tint 1831, adjusting intensity 1834, adjusting bright point 1837, move digital asset 1842, rotate digital asset 1845, scale digital asset 1848, and warp digital asset 1852. As the user selects and performs one or more operations, the user will be able to see in real time the changes or updates in the preview image or brief.

After the fabric template input, the user can add tinting 1831. Tinting will adjust the hue of the color of the fabric template input. Tinting is representative of the tinting which can be added during the postlaser wash or finishing II, described above. The user will be able to select a tint color, and this tint color will be blended with the existing color of the fabric template input. The amount or intensity of the tinting can be increased or decreased, such as by using a slider bar.

The user can adjust intensity 1834. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust bright point 1837. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 1842 or reposition a selected digital asset. For example, a damage input (or fabric template or laser file) may be moved to a position desired by the user. The user can rotate 1845 a selected digital asset. For example, a damage input (or fabric template or laser file) may be rotated to any angle relative to the other layers as desired by the user.

The user can scale 1848 a selected digital asset. This scaling can be locked, maintaining the original aspect ratio of the digital asset, or can be unlocked, such that the user can change the aspect ratio. The user can warp 1852 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 1826, the digital brief tool shows an image of the jeans with the laser finishing pattern, including any tinting, damage, or other adjustments, as created by the user. This image can be saved and viewed again later. A user can create multiple designs, and these can be saved together as part of a collection.

Figure 19:
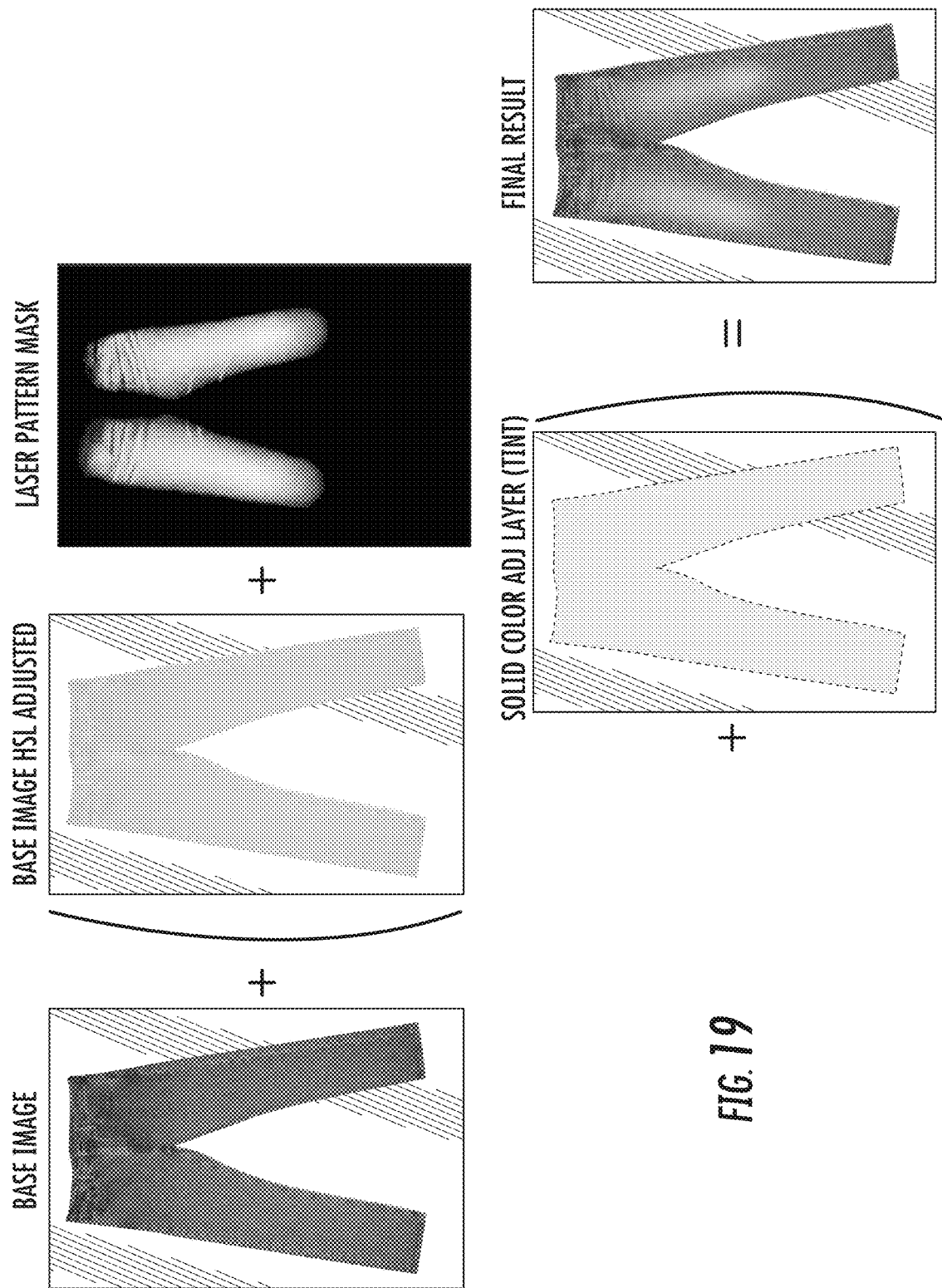
FIG. 19 shows a technique of generating a preview of a finished image using a brief tool.

FIG. 19 shows a technique of generating a preview of a finished image using a digital brief tool. A base image (or fabric template input) is selected. A hue saturation lightness (HSL) adjustment layer is created or generated for the selected base image. The HSL adjustment layer can be the base layer with an adjustment for hue saturation lightness. When tinting is selected, a solid color adjustment layer is created or generated. The solid color adjustment layer has a solid color (e.g., yellow, green, red, blue, or other color that is used for tinting the garment) that is in the same form or outline as the garment (e.g., pants), as indicated by the dotted lines in the figure.

To obtain a final result, which is the final image of the jeans with laser finishing pattern, a laser pattern mask is combined with the base image and HSL adjustment layer. A resulting combination will be based on intensity and bright point settings.

The laser pattern mask is a negative image or reverse image of the laser input file. For the laser input file, during laser burning, a white pixel means the pixel is not lasered (which results in the original indigo color of the fabric), and a black pixel means the pixel will be lasered at highest level (which results in the whitest color that can be achieved on the fabric). In an implementation, the laser input file has 256 levels of gray, and for levels between 0 (e.g., black) and 255 (e.g., white), then the amount of laser burning will be proportionally somewhere in between.

FIG. 20 shows a laser pattern mask that is created from a laser input file. The digital brief tool creates the laser pattern mask from the laser input file by reversing or inversing the laser input file. So, for the laser pattern mask, a black pixel means the pixel is not lasered (which results in the original indigo color of the fabric), and a white pixel means the pixel will be lasered at highest level (which results in the whitest color that can be achieved on the fabric).

In an implementation, the laser pattern mask is obtained by inverting the laser pattern in the laser input file and also normalizing, which allows easier use. The laser image has values in a range from 0-255. For normalization, the range is changed to a value between 0 and 1, where 255 is a 1 and 0 is a 0. This becomes a "filter value" or pattern mask value. A reason for this it makes it easier to apply the filter. An equation to find the final pixel value can be simply:

$$\text{Final Pixel Value} = (\text{BrightenedPHOTO} * \text{filter value}) + (\text{BasePHOTO} * (1 - \text{filter value})).$$

Using this approach, the resulting pixels value with be a value between 0 and 255 with actual values corresponding to an appropriate mix of the two photos based on the laser pattern. Note that this does make a linear assumption about the transition be 0 and max change. But for a higher accuracy method, the technique can query the filter unnormalized and apply the transition on a pixel-by-pixel basis.

To determine a final pixel value for a pixel of a preview image (see equation above), a first contribution for the pixel location is obtained by combining (e.g., multiplying) a color value for pixel corresponding to the pixel location for the pattern mask and a color value of a pixel corresponding to the pixel location for a base image (e.g., filter value or pattern mask value). A second contribution is obtained by combining (e.g., multiplying) a color value for a pixel corresponding to the pixel location for the pattern mask and a color value for a pixel corresponding to the pixel location for the adjusted base image (e.g., 1 minus the filter value or 100 minus the filter value, if percentages are used). The first and second contributions are combined or added together to obtain the final pixel value for the preview image.

The first contribution contributes a first percentage of the base image that passes to the preview image. The second contribution contributes a second percentage of the base image that passes to the preview image. The first and second percentages sums to 100.

Figure 21:
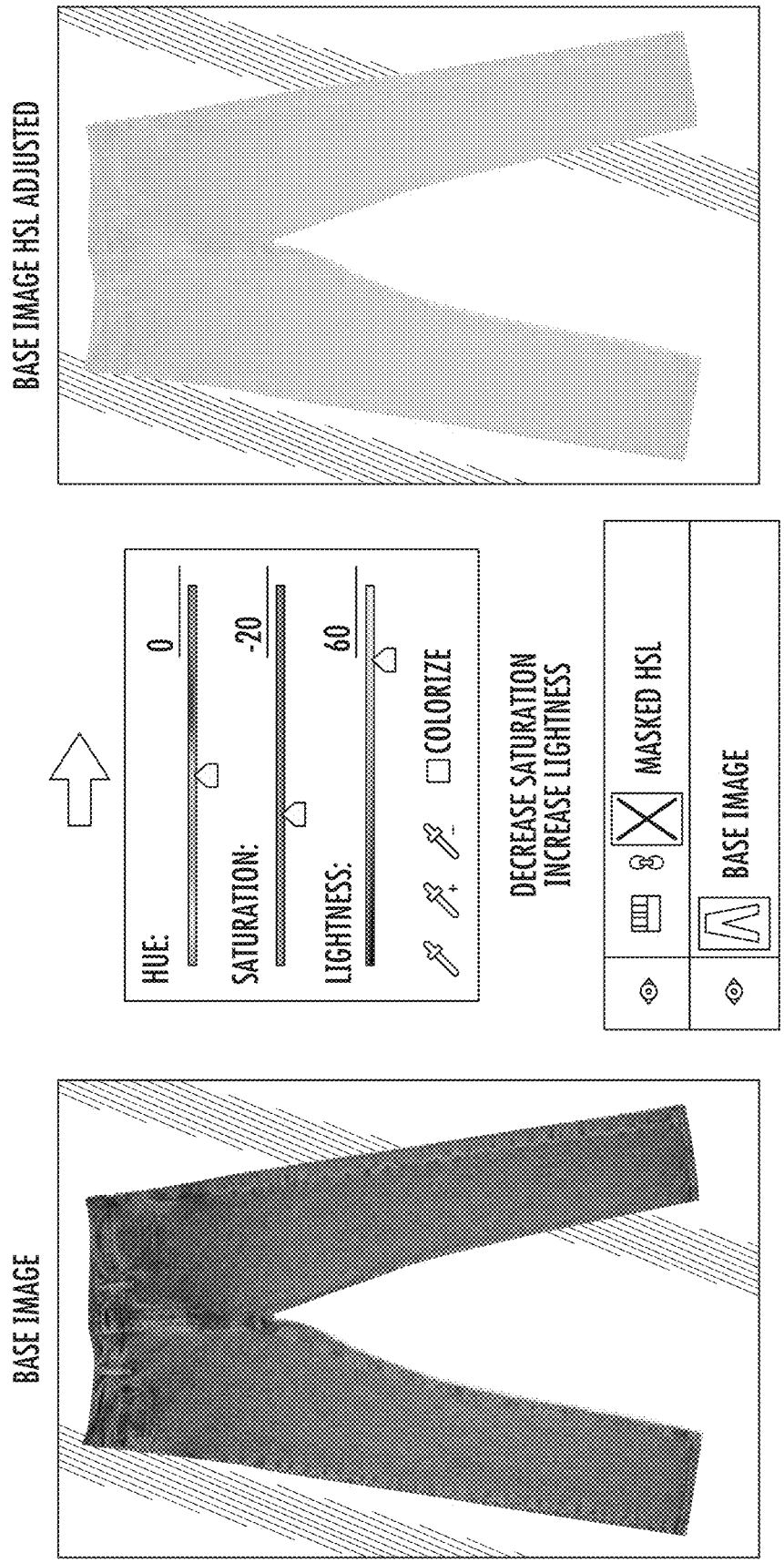
FIG. 21 shows a base image hue saturation lightness adjustment (HSL) layer that is created from the base image.

FIG. 21 shows a HLS adjustment layer that is created from the base image. The HLS adjustment layer (or adjustment layer) is like a bleaching layer, which is an image of what the jeans would appear like if the jeans were fully bleached or lasered. This layer is created by taking the base image and adjusting its hue, saturation, and lightness. In an implementation, for this layer, the saturation is reduced compared to the base layer, and the lightness is increased compared to the base layer. And the hue is not adjusted compared to the base layer. Adjusting all values, hue, saturation, and lightness, can ensure that the technique gets as close to reality as possible. However, often times the lightness value dominates, but any minor shifts in hue and saturation can help improve simulating or replicating reality.

In an implementation, the HLS adjustment layer it obtained by modifying the base image by the maximum change in lightness and saturation that available. In another implementation, for possibly higher accuracy, the guide comes from a laser mapping. For example, when you laser this garment with gray value 42 the lightness or L value changes by x, the hue or H value changes by y, and the saturation or S value changes by z. A technique uses whatever the mapping says and adheres to that mapping when converting the image. If direct access to that value is not available, interpolation can be used. For example, if there is a change for a gray value 40 and a gray value 50, a technique changes for gray value 42, taking 20 percent of the change from 40 to 50 and use that value for 42. Similar logic can apply in a simplified max change approach except in that case, a technique only needs to consider the change at 0 gray value.

The HLS adjustment layer can be generated by using an image manipulation package such as OpenCV for changing color spaces. But in other implementations, a technique can convert manually using a RGB to HSL conversion algorithm.

A technique of the digital brief tool is to combine the base image and adjustment layer based on the laser pattern mask. For a black pixel in the laser pattern mask, the base layer will fully pass (and none of the adjustment layer) through to the final result image. For a white pixel in the laser pattern mask, the adjustment layer (and none of the base layer) will fully pass through to the final result image. For gray pixel values, then a percentage of the base layer and adjustment layer will pass through to the final result image. For example, for a value in the layer pattern mask, 90 percent of the base layer and 10 percent of the adjustment layer pass through to the final result image.

Figure 22:
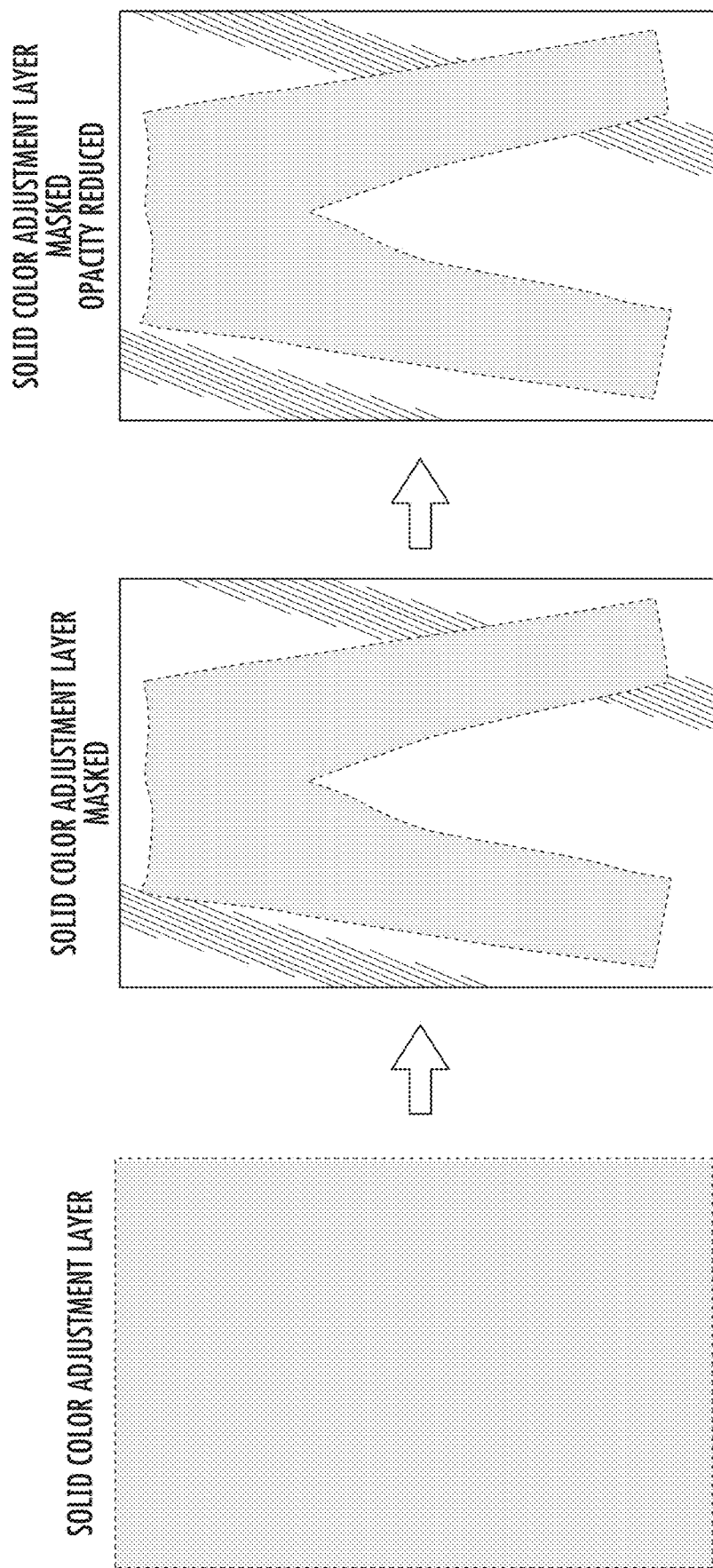
FIG. 22 shows a technique of creating a masked solid color adjustment layer.

FIG. 22 shows a technique of creating a masked solid color adjustment layer. The digital brief tool creates the solid color adjustment layer by creating a layer of a solid color, mask this layer based on the base image, and then create masked solid color adjustment layer. An opacity of the masked solid color adjustment layer can be reduced, so that when combined with the based image, the base image will pass through with some tinting contributed by the masked solid color adjustment layer.

In this figure, in a leftmost box labeled solid color adjustment layer has a solid color in the desired tint. The solid tint color can be, for example, yellow color, red color, brown color, black color, green color, purple color, pink color, or other colors or shades. In a middle box labeled solid color adjustment layer masked, the solid tint color has been masked by a mask of the garment. This layer has same solid color as in the leftmost box but has the same form or outline as the garment (e.g., pants), as indicated by the dotted lines. Further, in a rightmost box labeled solid color adjustment layer masked opacity reduced, an opacity of the previous layer (middle box) is reduced. The layer in the rightmost box can be used in the process to create the preview image.

FIGS. 23-24 show examples of two different adjustments or settings for a bright point operation. Adjusting bright point adjusts a rate of transition from middle gray to white on the layer mask.

Figure 25:
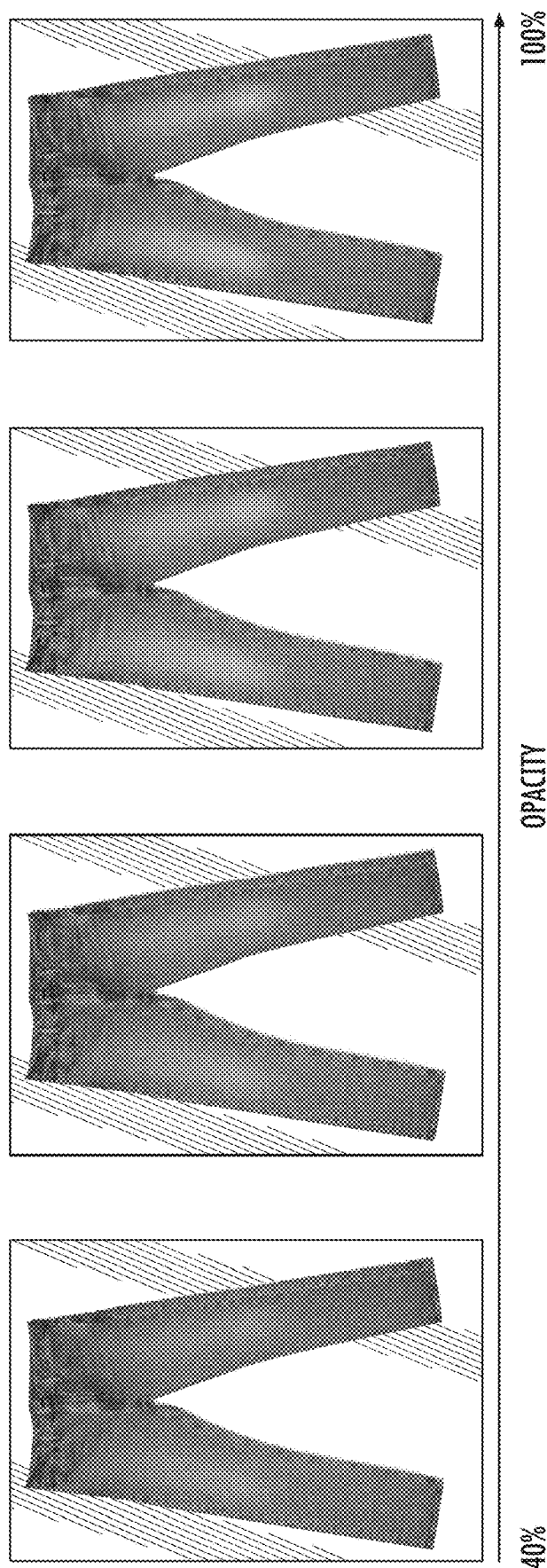
FIG. 25 shows adjustment of intensity.

FIG. 25 shows adjustment of intensity. The intensity adjustment adjusts an opacity (e.g., 40 percent to 100 percent) of an HSL adjustment layer. At 100 percent, the HSL adjustment layer will be fully opaque, and the wear pattern will be very prominent in the brief image or preview.

Figure 26:
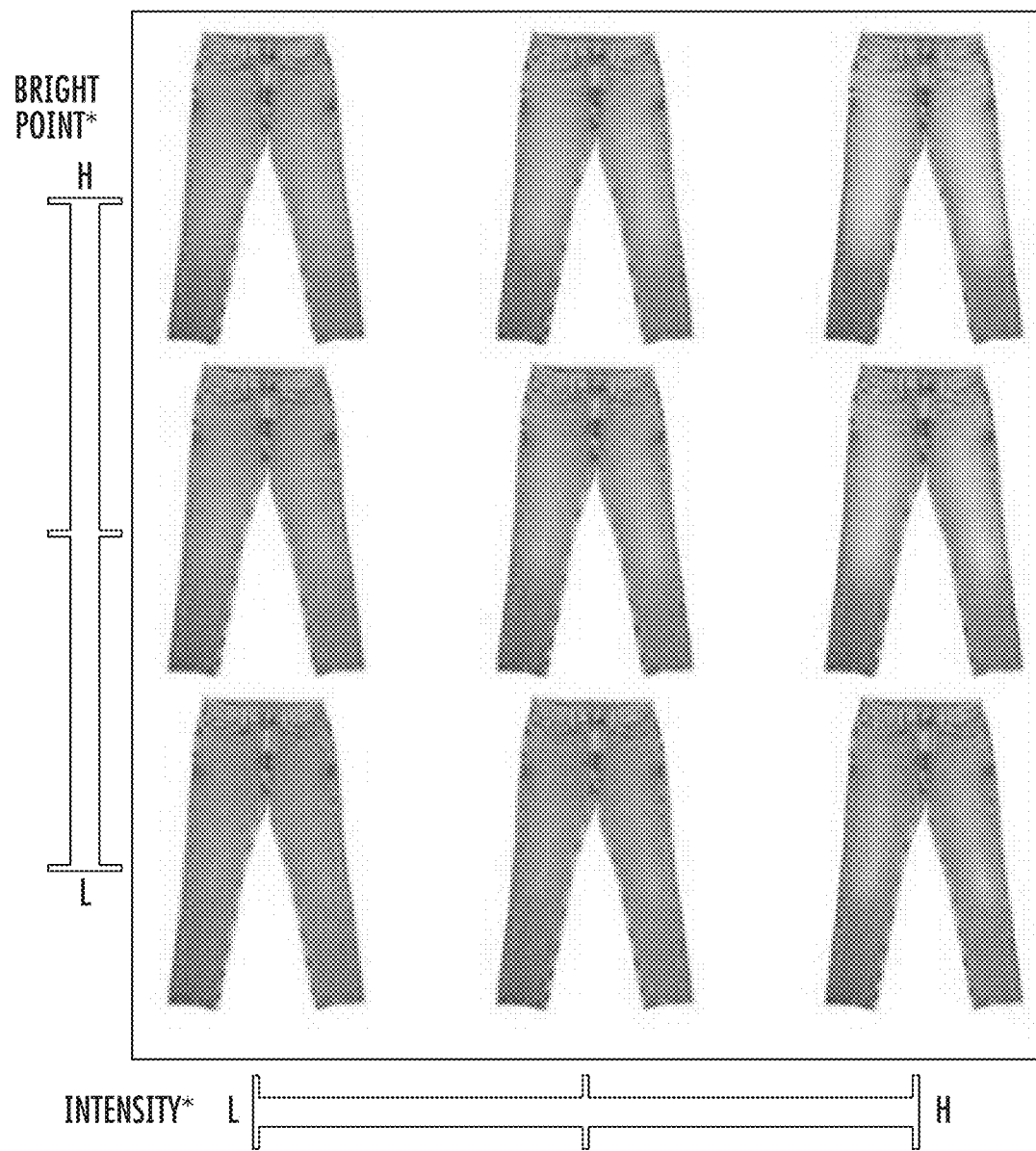
FIG. 26 shows an array of images showing the effects of adjustments in bright point and intensity.

FIG. 26 shows an array of images showing the effects of adjustments in bright point and intensity. Intensity changes are shown in the X or row direction, while bright point changes are shown in the Y or column direction.

For a first jeans in the first column (from a left of the array), third row (from a top of the array), the bright point and intensity are both L, indicating the least amount of bright point and intensity. A second jeans is in the second column, third row; this jeans has a bright point of L and an intensity between L and H. The wear pattern of the second jeans is more visible than that for the third jeans. A third jeans is in the third column, third row; this jeans has a bright point of L and an intensity of H, indicating the greatest amount of intensity. The wear pattern of the third jeans is more visible than that for the second jeans.

A fourth jeans is in the third column, second row; this jeans has a bright point between L and H, and an intensity of H. The size or area of the wear pattern of the fourth jeans is larger than that for the third jeans. A fifth jeans is in the third column, first row; this jeans has a bright point of H and an intensity of H. The size or area of the wear pattern of the fifth jeans is larger than that for the fourth jeans.

Digital Brief Tool Screens

FIG. 27-58 include screens of a digital brief tool, executing on Apple Inc.'s iPad Pro tablet computer device. Although the screens portray the digital brief tool as executing on an iPad Pro, other suitable electronic devices may execute the digital brief tool. For example, the digital brief tool may execute on a Windows device (e.g., Windows 10 tablet), an Android device, other iPad product family models (e.g., iPad or iPad mini), or many other devices.

The iPad Pro 12.9 is a tablet device with rectangular dimensions of 12 inches by 8.68 inch, and is 0.27 inches thick. The iPad Pro has a 12.9-inch screen, and has non-volatile memory storage of 64, 256, or 512 gigabytes. The iPad Pro has network connectivity via Wi-Fi and optionally cellular. The iPad Pro has an A10X Fusion chip with 64-bit architecture and an embedded M10 coprocessor. Some features of the digital brief tool can be accelerated by using specialized features available in the A10X Fusion chip or embedded M10 coprocessor, or both. An operating system of the iPad Pro is Apple iOS 11 (or greater when released). Further, the iPad Pro can be operated with a stylus, the Apple Pencil product. And in an implementation, the use can use the Apple Pencil with the digital brief tool.

The digital brief tool includes various features, allowing a designer to select, create, and visualize how an apparel item will look with certain characteristics, before the apparel item is produced. The digital brief tool may allow the designer, for one or more characteristics of a proposed apparel item, to assign one or more options to each of the characteristics. While assigning the options for characteristics, the digital brief tool allows the designer to see, based on currently assigned options, how the apparel item may appear when produced, in real time as changes are made.

Selecting gender, series, fit, fabric, or other characteristics in the digital brief tool may result in having only relevant options presented to the designer. For example, some characteristics or options may be specific to a particular gender. Upon selection of the particular gender, characteristics and options with the selected gender will appear for the designer to use for a proposed apparel item.

In an implementation, the digital brief tool is adapted for use with producing jeans. For example, the following figures may include various characteristics and options relevant to designing and stylizing of jeans. However, the digital brief tool may be adapted for use with other apparel items, such as shirts, jackets, pants, or socks.

Figure 27:
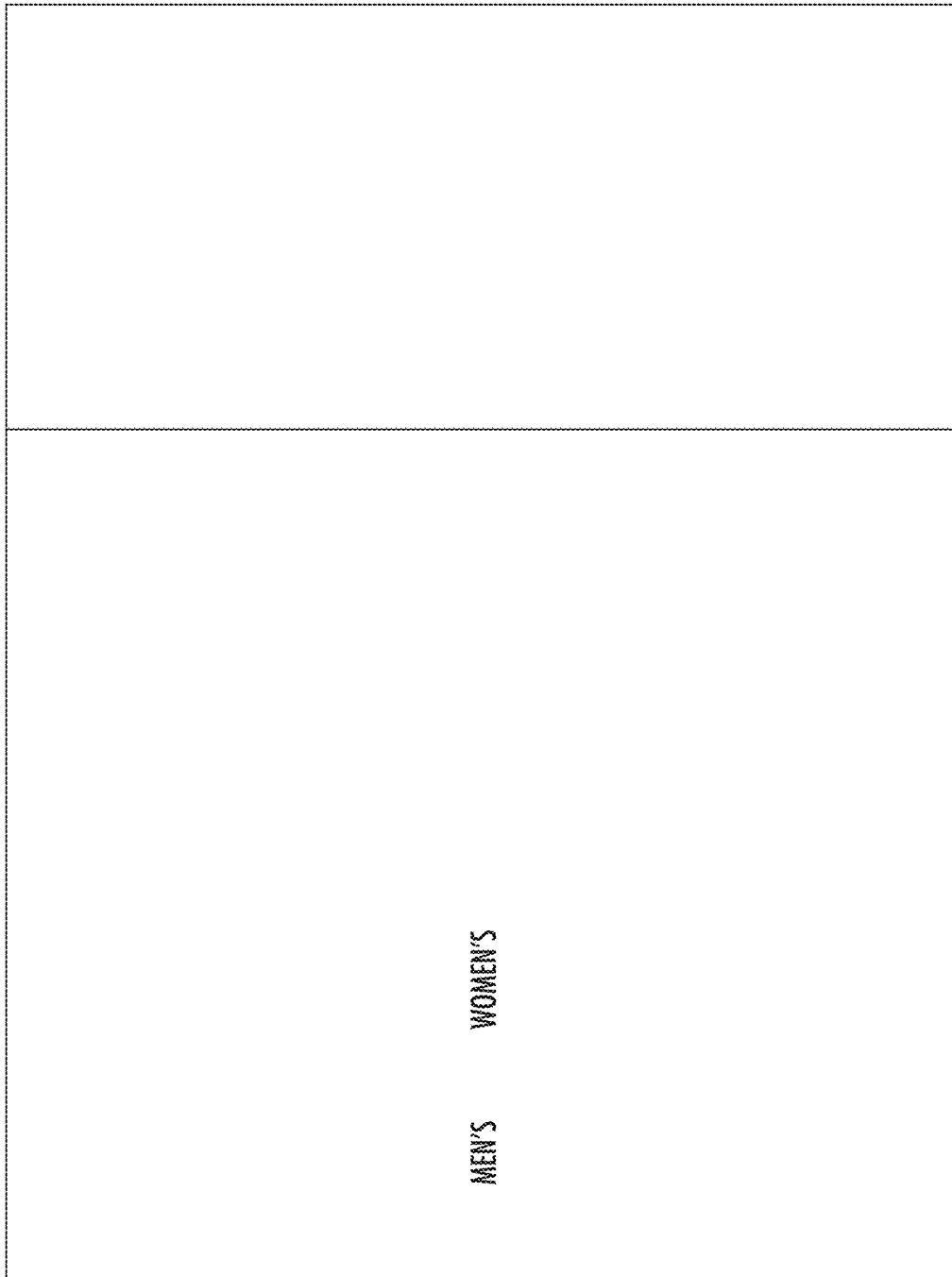
FIG. 27 shows a screen of a gender selection feature of the digital brief tool.

The figures in this appendix are screens from an iPad Pro version of the digital brief software. FIG. 27 shows a screen of a gender selection feature of the digital brief tool. The available genders shown on this screen include "Men's" and "Women's." Alternate implementations of the digital brief tool may provide options for various gender identities (e.g., unisex, children's, infant, or toddler products).

Figure 28:
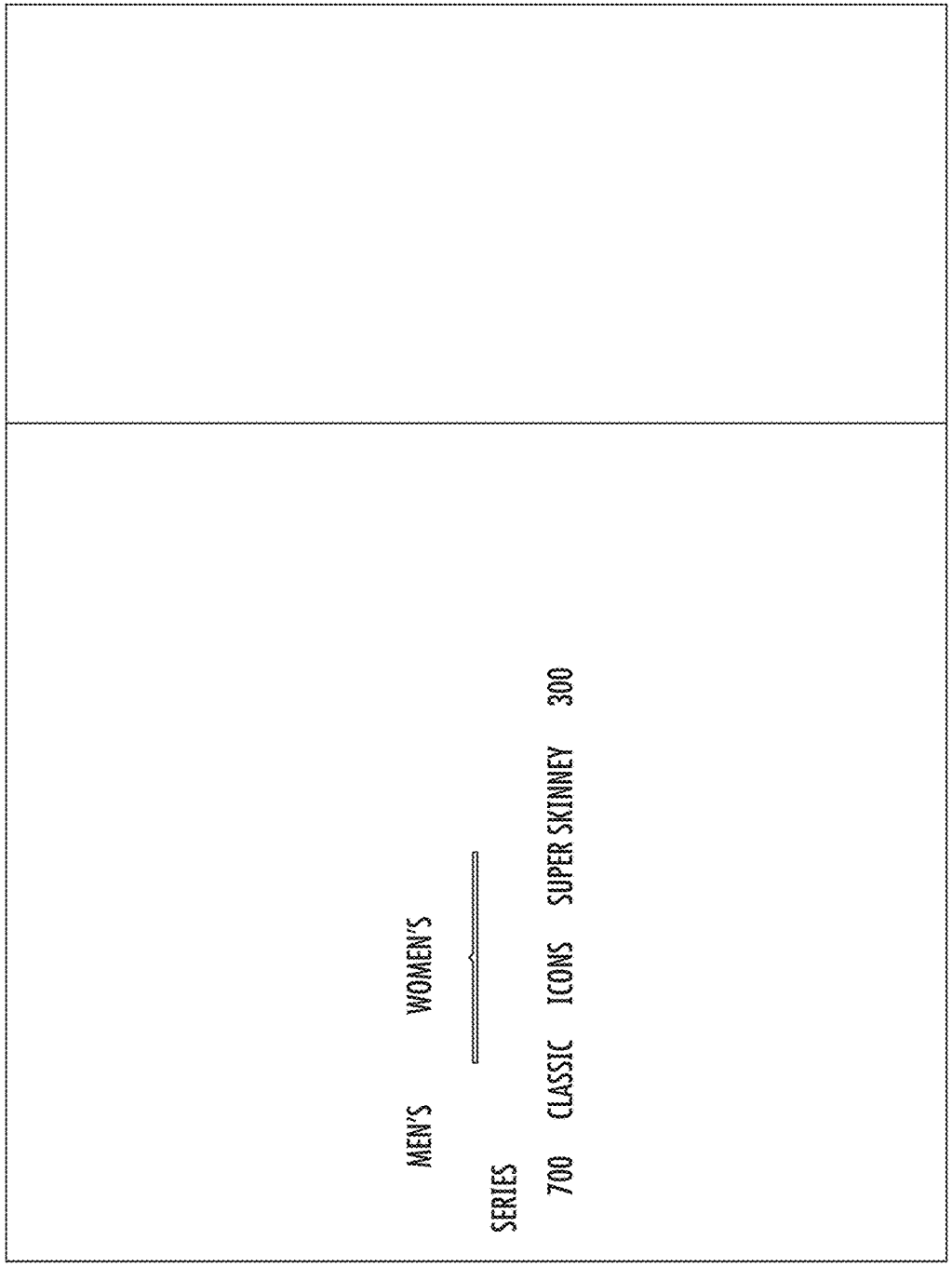
FIG. 28 shows a screen of a gender selection feature of the digital brief tool with the "Women's" option selected.

FIG. 28 shows a screen of a gender selection feature of the digital brief tool with the "Women's" option selected. The digital brief tool may retrieve various series, associated with the "Women's" option. For example, the series "700," "Classic," "Icons," or other series are presented.

Figure 29:
FIG. 29 shows a screen of a gender selection feature of the digital brief tool with the "Men's" option selected.

FIG. 29 shows a screen of a gender selection feature of the digital brief tool with the "Men's" option selected. The digital brief tool may retrieve various series, associated with the "Men's" option. For example, the series "500" is presented. The digital brief tool may include various series not shown when the "Men's" option is selected, such as the series "700," "Classic," or "Icons." These options are not presented unless the options are available to the designer (e.g., with the "Female's" option instead of the "Men's" option selected).

Figure 30:
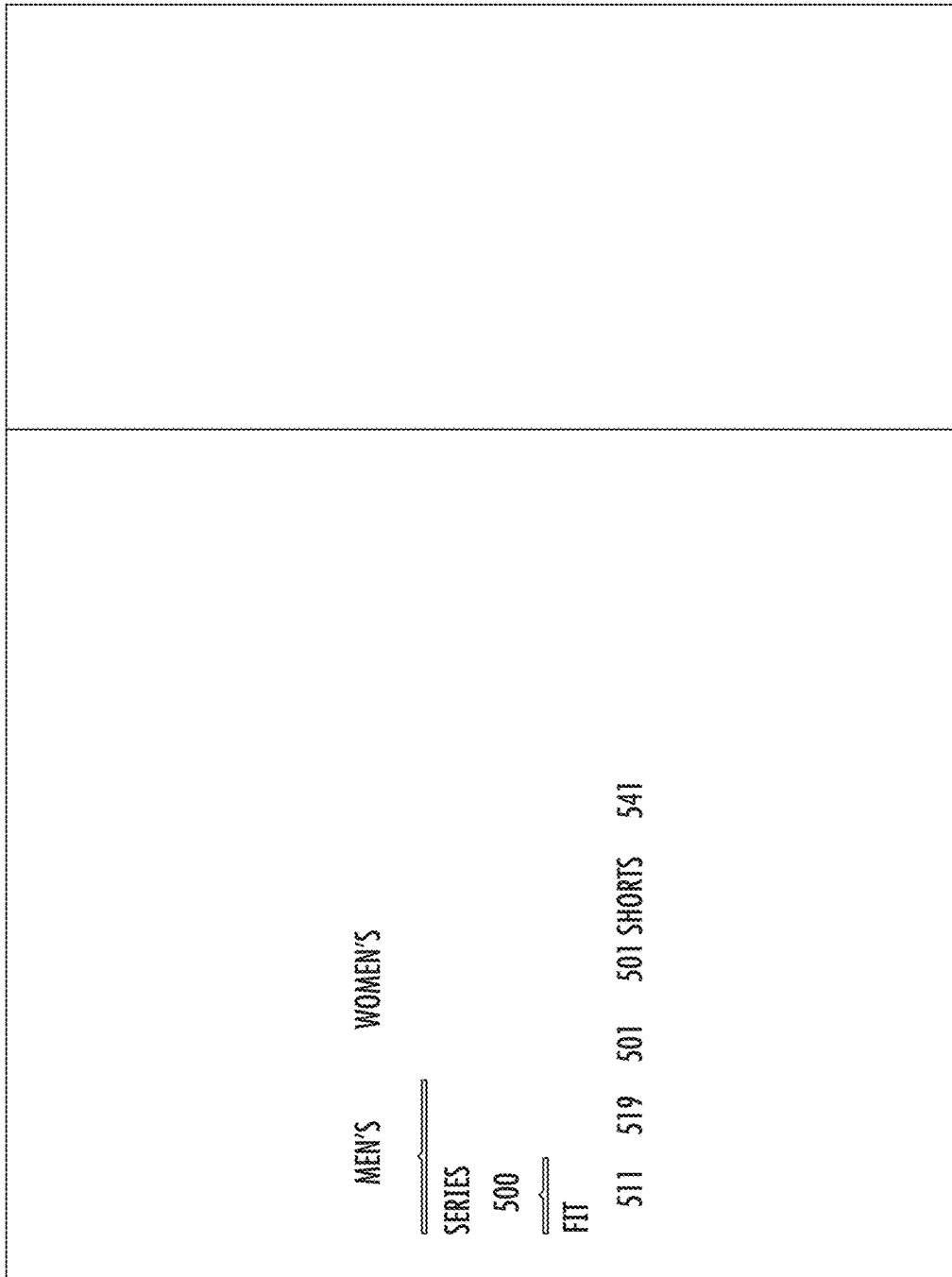
FIG. 30 shows a screen of a fit selection feature of the digital brief tool.

FIG. 30 shows a screen of a fit selection feature of the digital brief tool. The digital brief tool may retrieve various fits, associated with the "Men's" and the "500" series options. For example, the fit "511," "519," "501," "501 Shorts," and "541" fit options are presented.

FIG. 31 shows a screen of a series selection feature of the digital brief tool. The digital brief tool may retrieve various fabrics, associated with the "Men's," the "500" series, and the "511" fit options. For example, the fabrics may include "TD-D3S518," "Naveena-NDL-4190-01," or other fabric options. The fabric options may include "best fit and finish" combinations, that are predetermined combinations of fits and fabrics that have been preselected for their matching appearance or suitability for use with each other.

Figure 32:
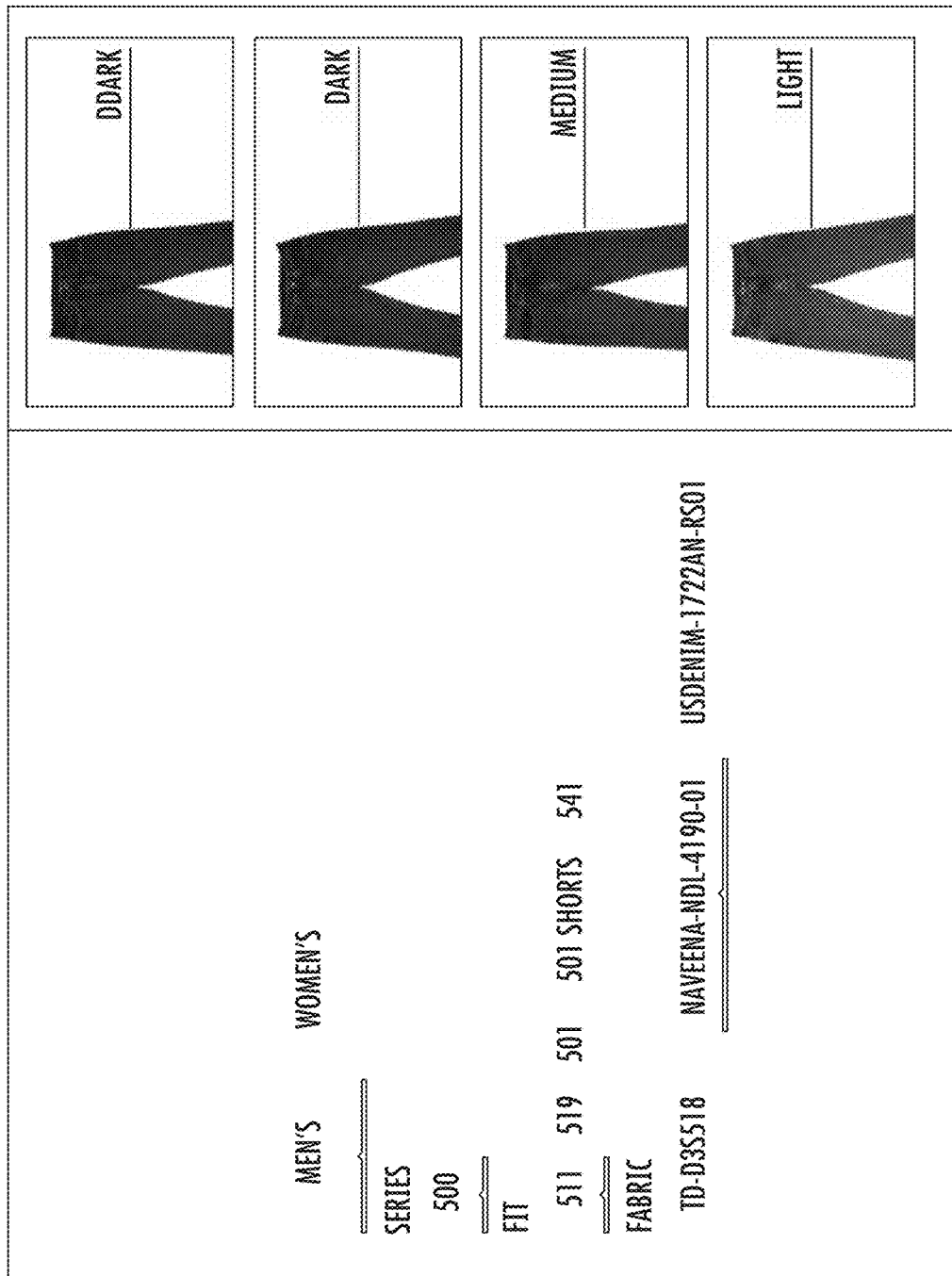
FIG. 32 shows a screen of a shade selection feature of the digital brief tool.

FIG. 32 shows a screen of a shade selection feature of the digital brief tool. The digital brief tool may retrieve various shades, associated with the "Men's," the "500" series, the "511" fit, and the "Naveena-NDL-4190-01" options. For example, the shades may include "DDark," Dark," "Medium," and "Light" shade options. A visual example of how the various shades would appear when used for the apparel is provided to assist the designer in proper shade selection.

Figure 33:
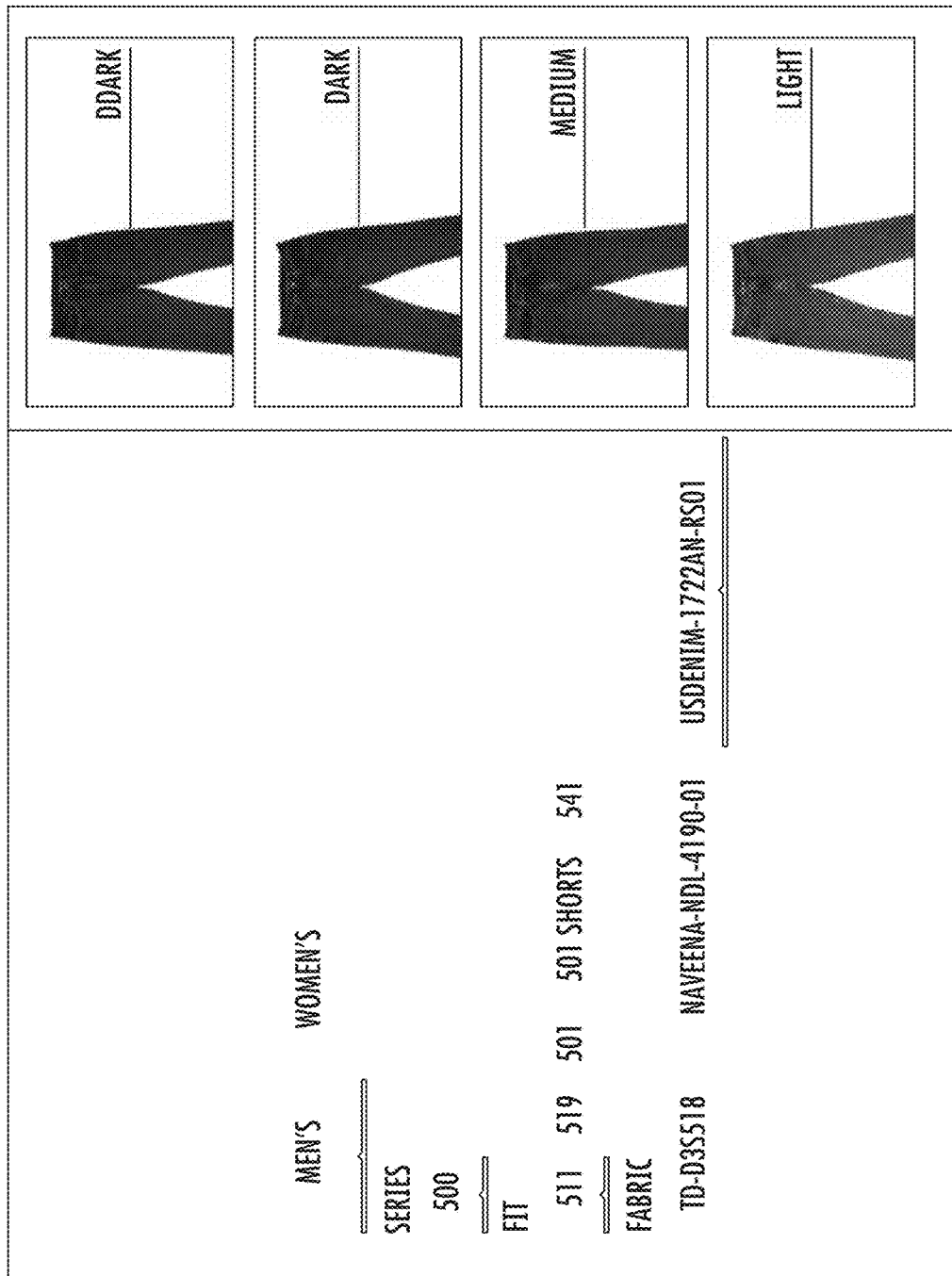
FIG. 33 shows a screen of a shade selection feature of the digital brief tool.

FIG. 33 shows a screen of a shade selection feature of the digital brief tool. The digital brief tool may retrieve various shades, associated with the "Men's," the "500" series, the "511" fit, and the "USDenim-1722AN-RS01" options. For example, the shades may include "DDark," Dark," "Medium," and "Light" options. A visual example of how the various shades would appear when used for the apparel is provided to assist the designer in proper shade selection.

Figure 34:
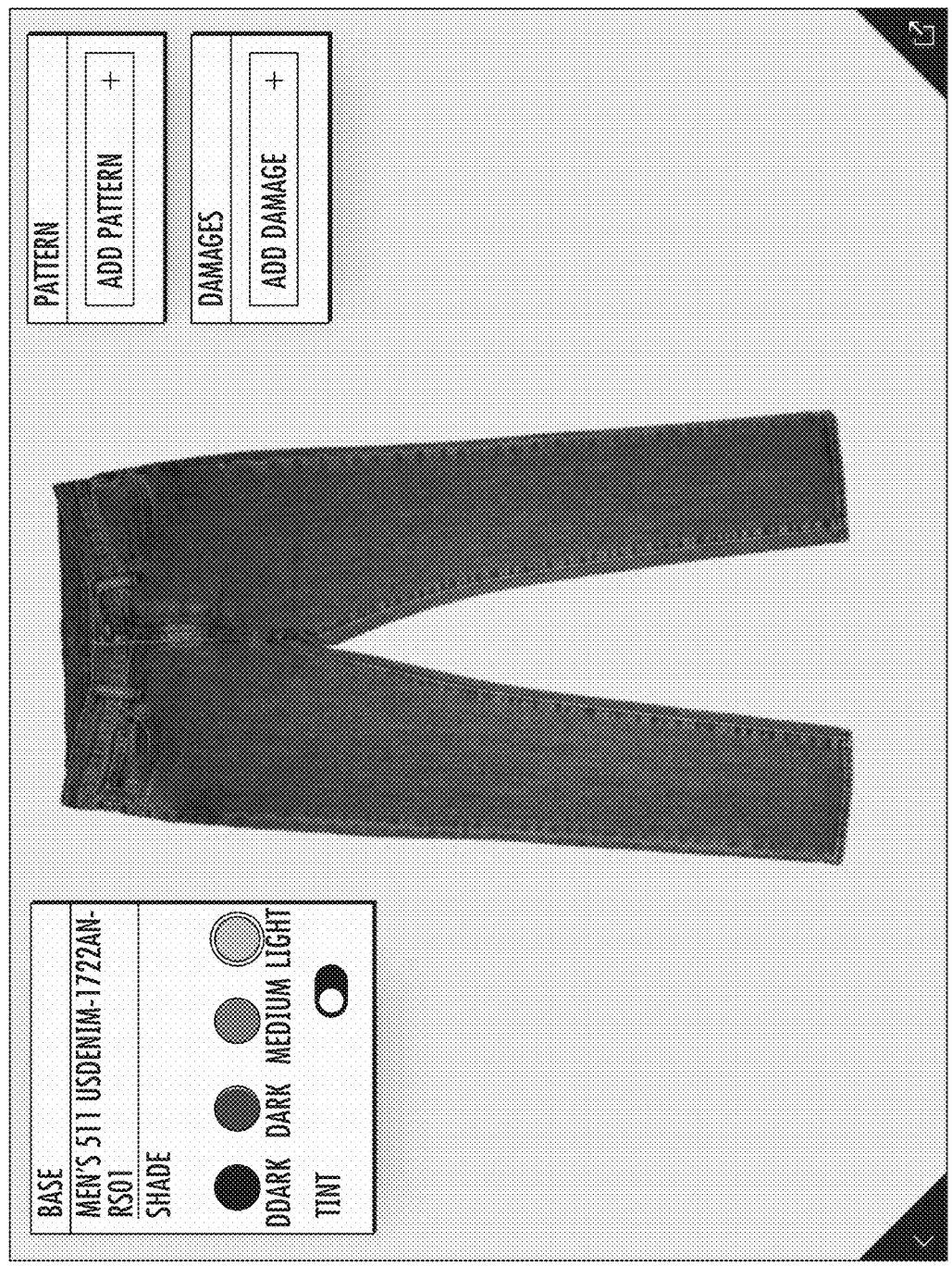
FIG. 34 shows a screen including a digital brief image of the digital brief tool.

FIG. 34 shows a screen including a digital brief image of the digital brief tool. The digital brief image reflects the currently selected options, such as "Men's," the "500" series, the "511" fit, and the "USDenim-1722AN-RS01" options. The screen includes various features used to modify characteristics that will change the digital brief image. For example, a tint feature, a pattern feature, and a damages feature are available. The designer may choose any of these features, to update the digital brief image with selected options. The designer may select one or more of these features, in any combination and order, to update the digital brief image.

Figure 35:
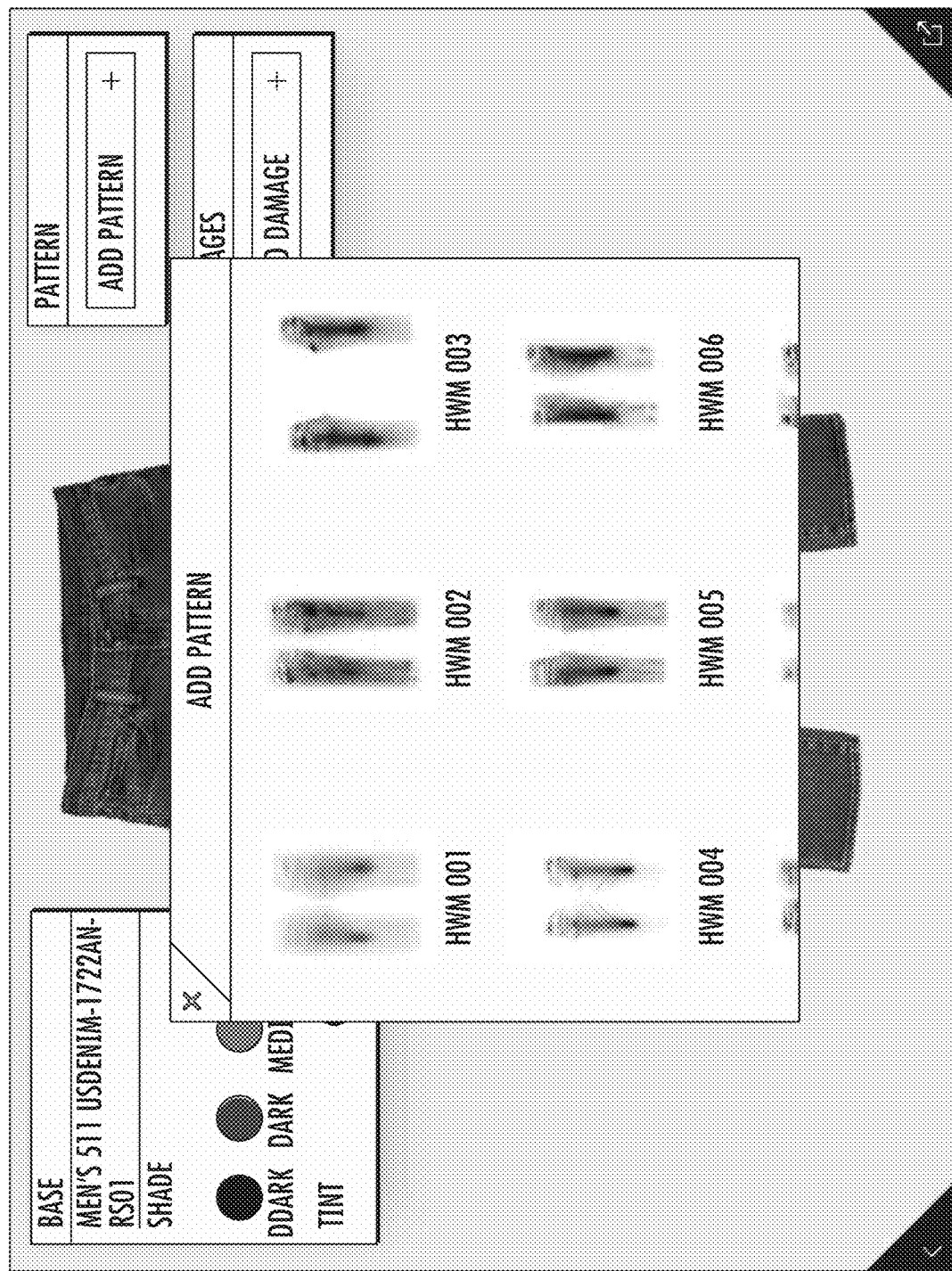
FIG. 35 shows a screen of a pattern or laser input file selection feature of the digital brief tool.

FIG. 35 shows a screen of a pattern or laser input file selection feature of the digital brief tool. For example, the digital brief tool may include various laser input files that correspond to one or more laser patterns that may be applied to a particular piece of apparel (e.g., jeans). One or more laser input files with their corresponding patterns may be visualized and presented to the designer. For example, "HWM 001" corresponds to a laser input file of the digital brief tool. The "HWM 001" laser input file includes a visualization of how the laser pattern, when applied to apparel, would appear. The visualization may include a black-and-white image to represent which areas of an apparel item will be affected when the laser pattern is applied. Alternate embodiments may include additional colors or different color schemes to present the same or similar information. For the "HWM 001" pattern, a dark area near a knee region of its accompanying visualization indicates that, when the "HWM 001" pattern is selected, the knee region will be modified more than other regions of the apparel, such as the leg opening region which lacks a dark area. The patterns may indicate where on the apparel the laser input file will modify, but not necessarily indicate intensity or a bright point of the patterns when applied to apparel.

Figure 36:
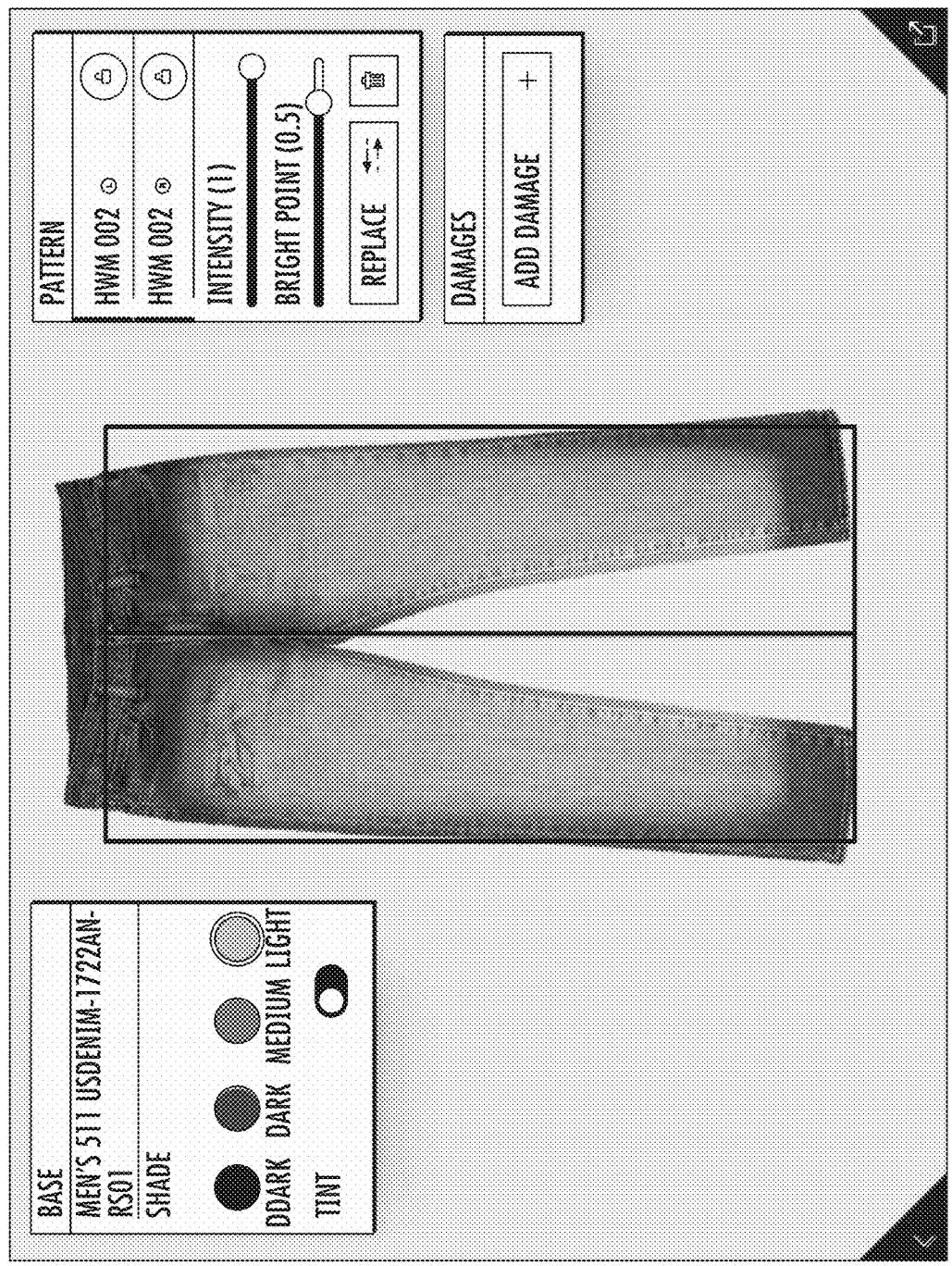
FIG. 36 shows a screen of a laser pattern customization feature of the digital brief tool.

FIG. 36 shows a screen of a laser pattern customization feature of the digital brief tool. For example, a digital brief image reflects the currently selected options, such as "Men's," the "500" series, the "511" fit, and the "USDenim-1722AN-RS01," and "HWM 002" pattern options. The laser patter customization feature may include additional customizations that may be applied to a selected pattern option. The digital brief image includes two rectangles overlaying the digital brief image, each corresponding to different areas of the apparel being designed. Here, the rectangles indicate a left and a right leg of the jeans. The rectangles may be moved or resized, depending on the requirements of the designer. For example, the selected "HWM 002" pattern may similarly include left and right leg areas. A default size and positioning of the rectangles are provided, and the digital brief tool shows how the digital brief image would be affected by the present size and positioning. Each rectangle may be resized or positioned to update the digital brief image. For example, when resizing the rectangle, the aspect ratio of the rectangle may be maintained, but a larger or smaller area of the digital brief image would be affected. The digital brief tool allows a designer to lock, or temporarily prevent modification, of the size or positioning of the rectangles, by selecting a lock image to selectively lock the right or left leg areas.

Figure 37:
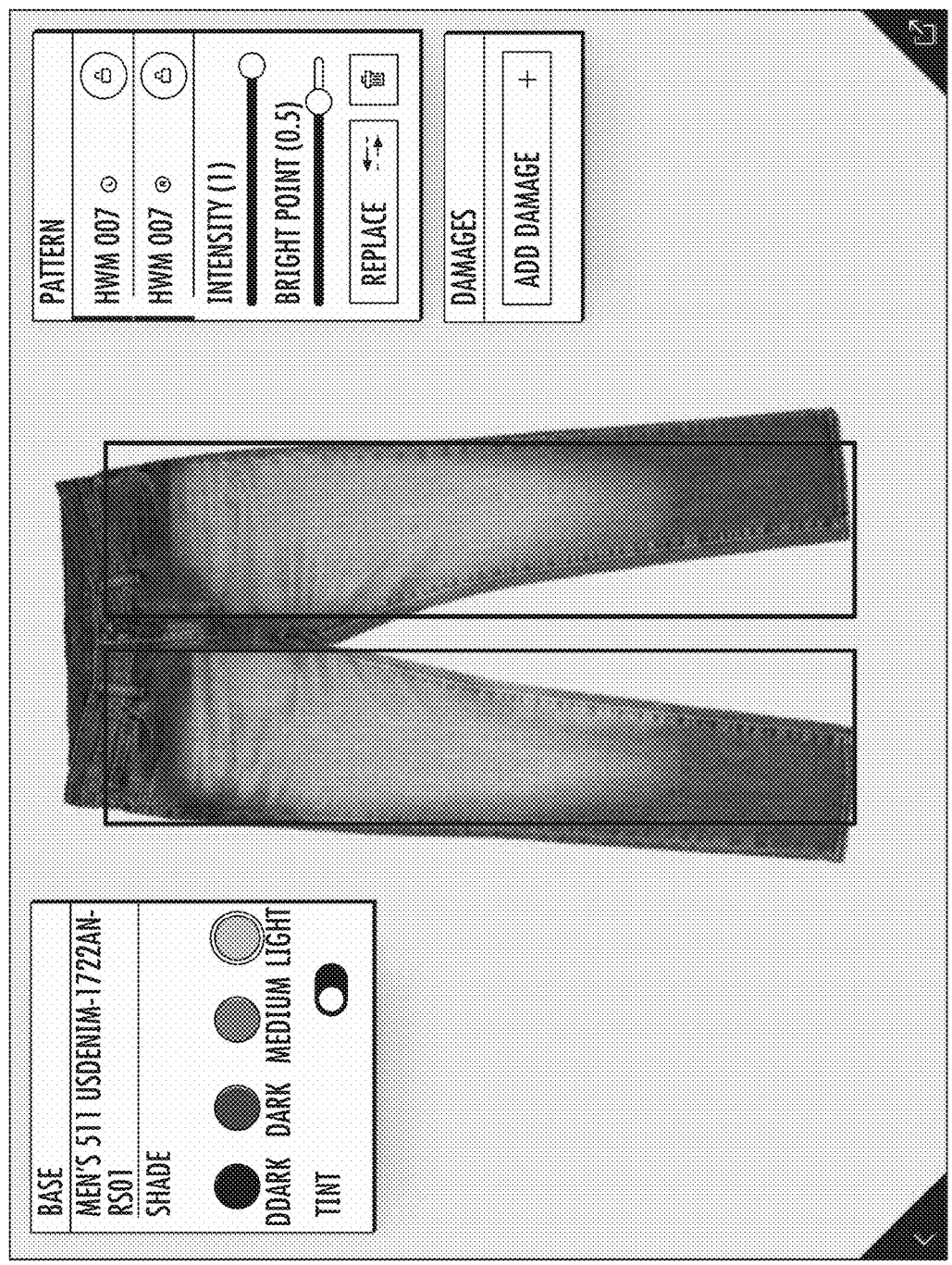
FIG. 37 shows another screen of a laser pattern customization feature of the digital brief tool.

FIG. 37 shows another screen of a laser pattern customization feature of the digital brief tool. For example, a digital brief image reflects the currently selected options, such as "Men's," the "500" series, the "511" fit, and the "USDenim-1722AN-RS01," and "HWM 007" pattern options.

Figure 38:
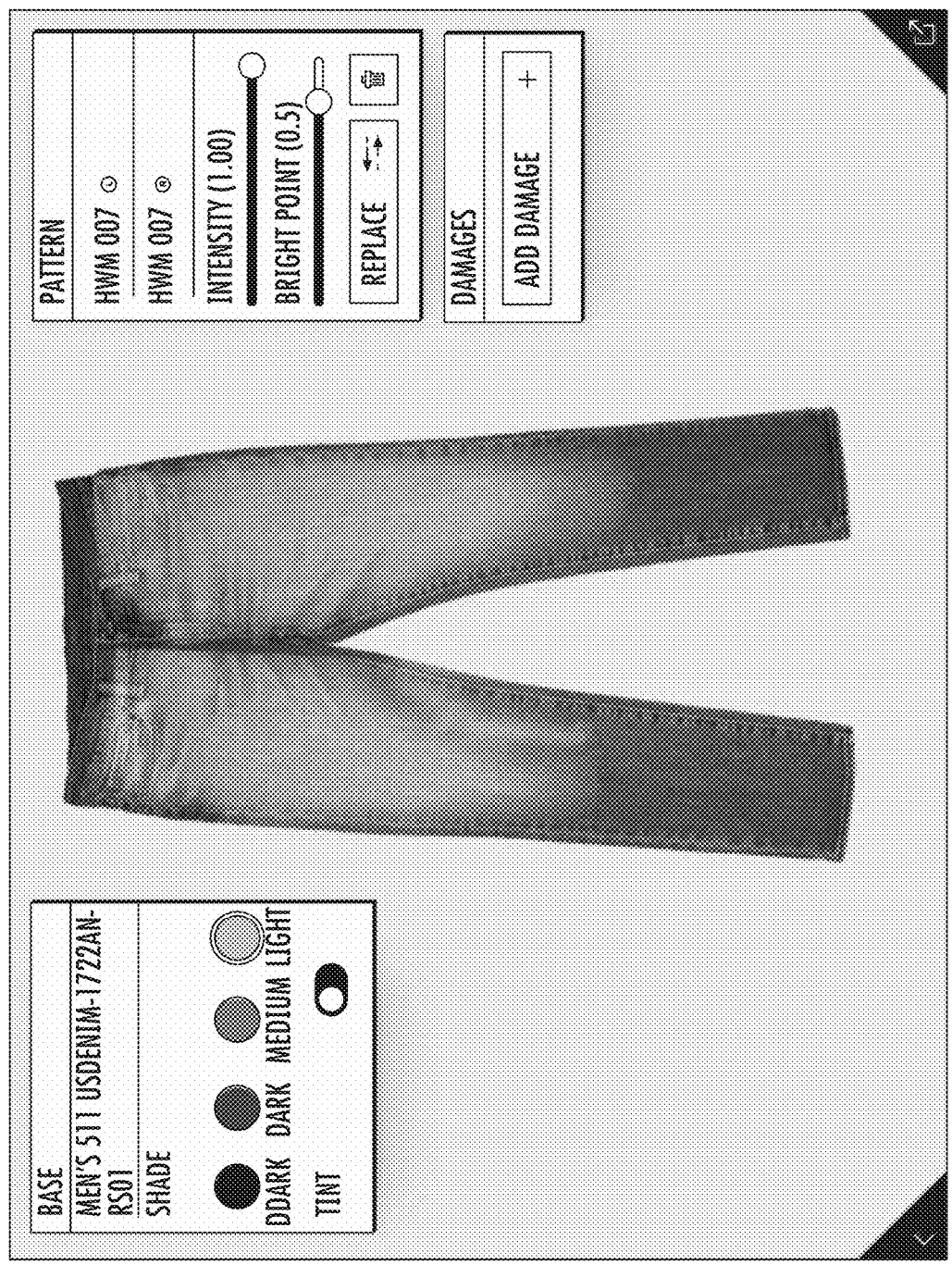
FIG. 38 shows a screen of a laser pattern customization adjustment feature of the digital brief tool.

FIG. 38 shows a screen of a laser pattern customization adjustment feature of the digital brief tool. For example, a digital brief image reflects the currently selected options, such as "Men's," the "500" series, the "511" fit, and the "USDenim-1722AN-RS01," and the "HWM 007" pattern options. In this screen, the size and positioning of the rectangles have been locked by the designer and the rectangles are hidden to prevent obstruction of the designer's view of the apparel. In an implementation, adjustments to the laser pattern customization are prevented until a size or positioning of the left or right leg areas are locked.

Figure 39:
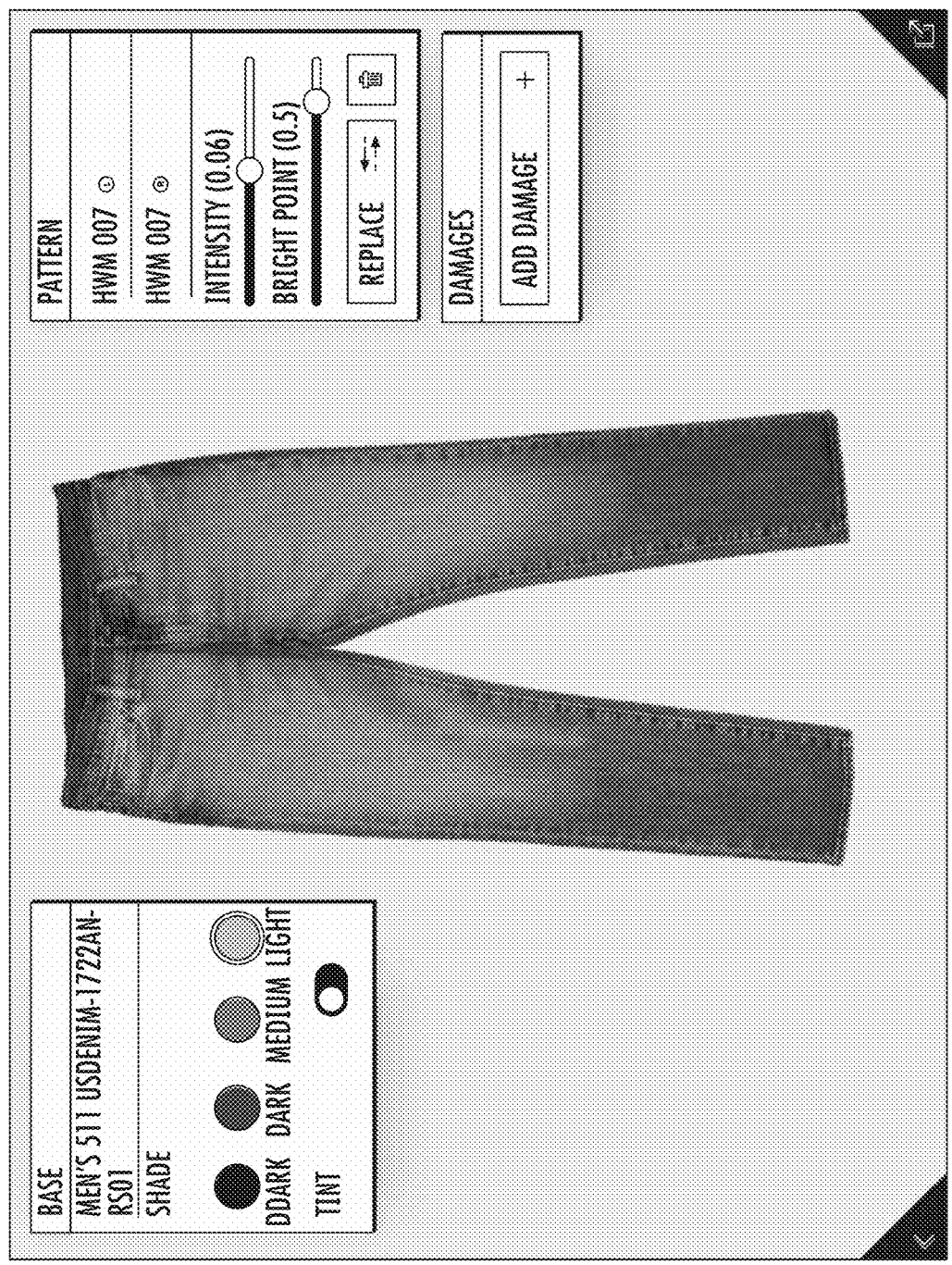
FIG. 39 shows a screen of a laser pattern customization intensity adjustment feature of the digital brief tool.

FIG. 39 shows a screen of a laser pattern customization intensity adjustment feature of the digital brief tool. For example, a digital brief image reflects the currently selected options, such as "Men's," the "500" series, the "511" fit, and the "USDenim-1722AN-RS01," and the "HWM 007" pattern options. In this screen, the intensity has been adjusted by a designer from the "1.0" option to the "0.06" option, using a sliding bar. Updates to the digital brief image are made, according to the updated intensity option. For example, the intensity may relate to opacity of the laser pattern applied to the apparel. A higher intensity produces a more pronounced effect of the laser pattern onto the apparel.

Figure 40:
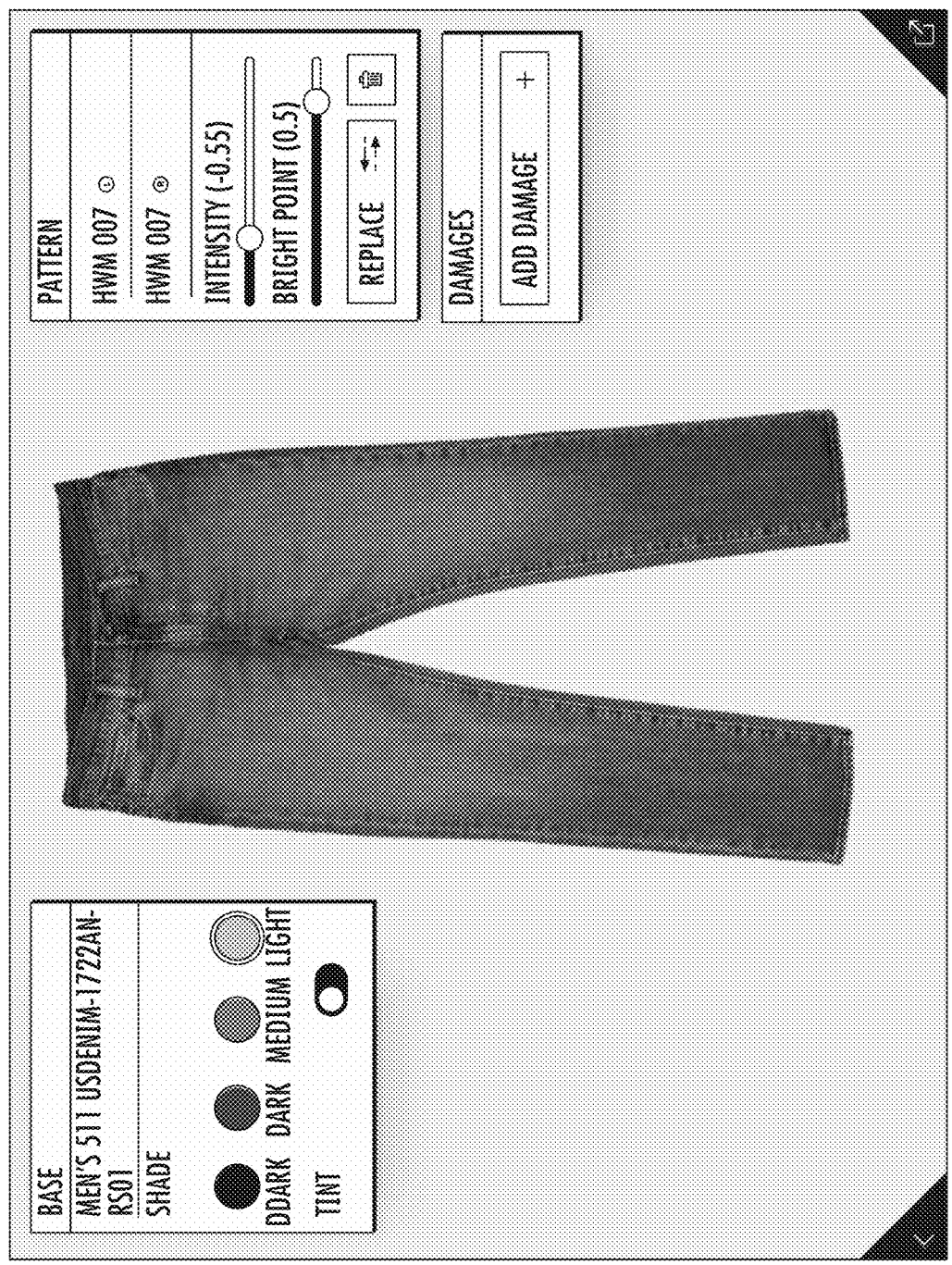
FIG. 40 shows another screen of a laser pattern customization intensity adjustment feature of the digital brief tool.

FIG. 40 shows another screen of a laser pattern customization intensity adjustment feature of the digital brief tool.

For example, a digital brief image reflects the currently selected options, such as "Men's," the "500" series, the "511" fit, and the "USDenim-1722AN-RS01," and the "HWM 007" pattern options. In this screen, the intensity has been adjusted by a designer from the "1.0" option to the "−0.55" option, using a sliding bar. Updates to the digital brief image are made, according to the updated intensity option.

Figure 41:
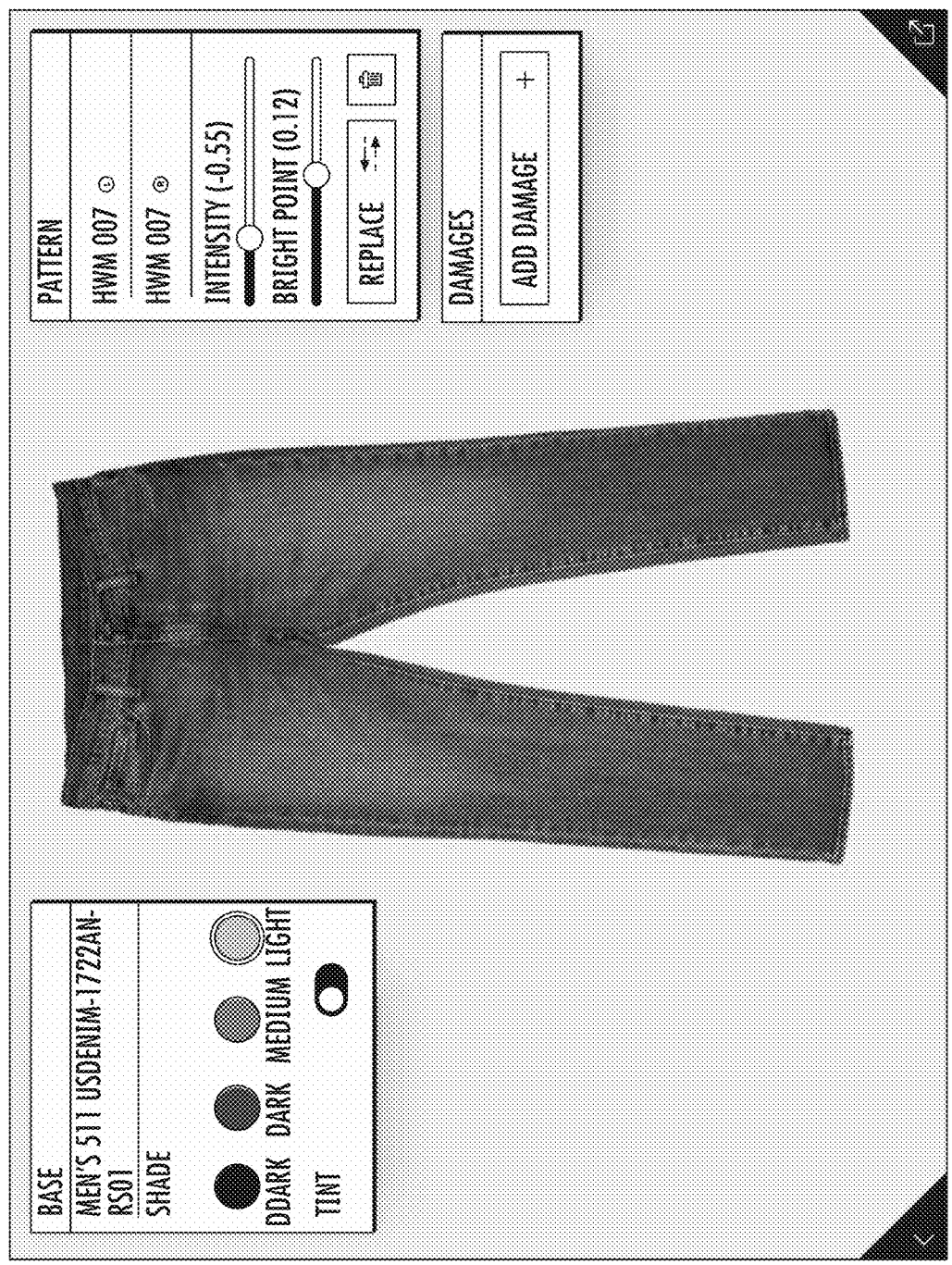
FIG. 41 shows a screen of a laser pattern customization bright point adjustment feature of the digital brief tool.

FIG. 41 shows a screen of a laser pattern customization bright point adjustment feature of the digital brief tool. For example, a digital brief image reflects the currently selected options, such as "Men's," the "500" series, the "511" fit, and the "USDenim-1722AN-RS01," and the "HWM 007" pattern options. In this screen, the bright point has been adjusted by the designer from the "0.5" option to the "0.12" option, using a sliding bar. Updates to the digital brief image are made, according to the updated bright point option. For example, the bright point may relate to how much of a laser pattern to apply to the apparel. Reducing a bright point results in apparel where less of the laser pattern is applied to the apparel.

Figure 42:
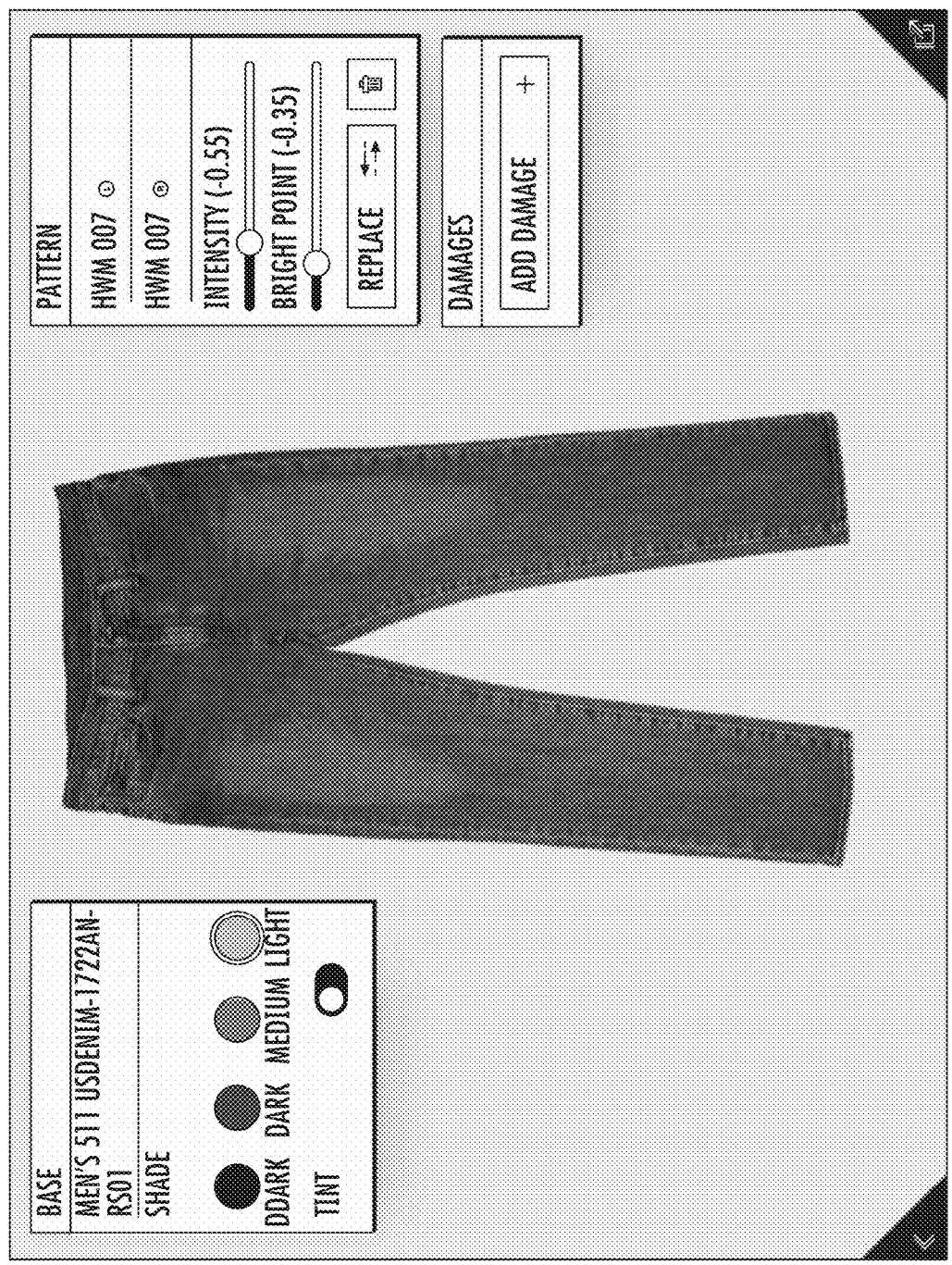
FIG. 42 shows another screen of a laser pattern customization bright point adjustment feature of the digital brief tool.

FIG. 42 shows another screen of a laser pattern customization bright point adjustment feature of the digital brief tool. For example, a digital brief image reflects the currently selected options, such as "Men's," the "500" series, the "511" fit, and the "USDenim-1722AN-RS01," and the "HWM 007" pattern options. In this screen, the bright point has been adjusted by the designer from the "0.5" option to the "−0.35" option, using a sliding bar. Updates to the digital brief image are made, according to the updated bright point option.

Figure 43:
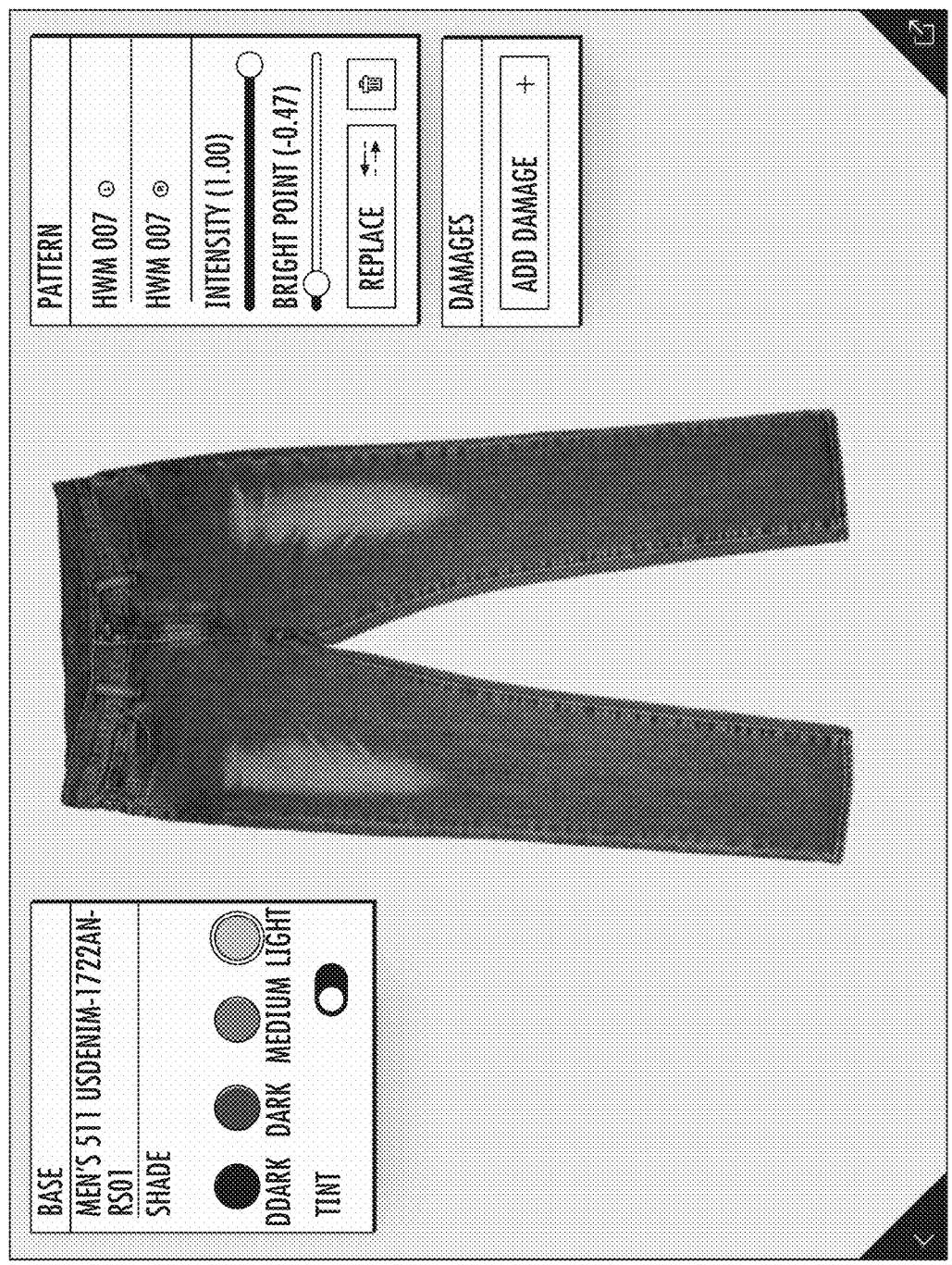
FIG. 43 shows a screen of a laser pattern customization intensity and bright point adjustment feature of the digital brief tool.

FIG. 43 shows a screen of a laser pattern customization intensity and bright point adjustment feature of the digital brief tool. For example, a digital brief image reflects the currently selected options, such as "Men's," the "500" series, the "511" fit, and the "USDenim-1722AN-RS01," and the "HWM 007" pattern options. In this screen, the bright point has been set to "1.0" and the bright point to "−0.47." Updates to the digital brief image are made, according to the updated bright point option.

Figure 44:
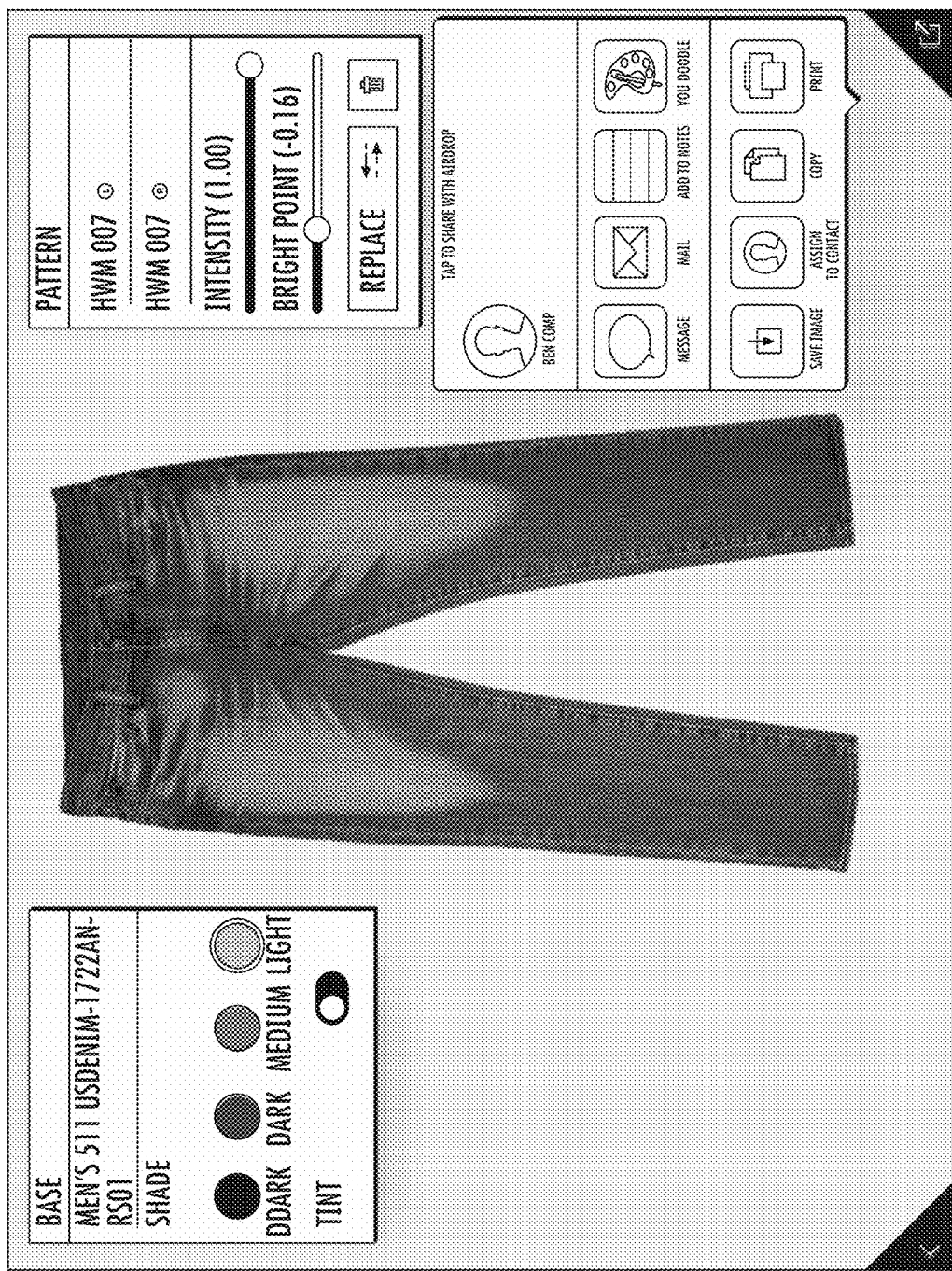
FIG. 44 shows a screen of a sharing feature of the digital brief tool. For example, a digital brief image reflects the currently selected options.

FIG. 44 shows a screen of a sharing feature of the digital brief tool. For example, a digital brief image reflects the currently selected options. The designer may choose to share their current changes to other designers or persons for feedback. This feature may leverage existing features of a device the digital brief tool, such as sharing features built into Apple Inc's IPAD PRO.

Figure 45:
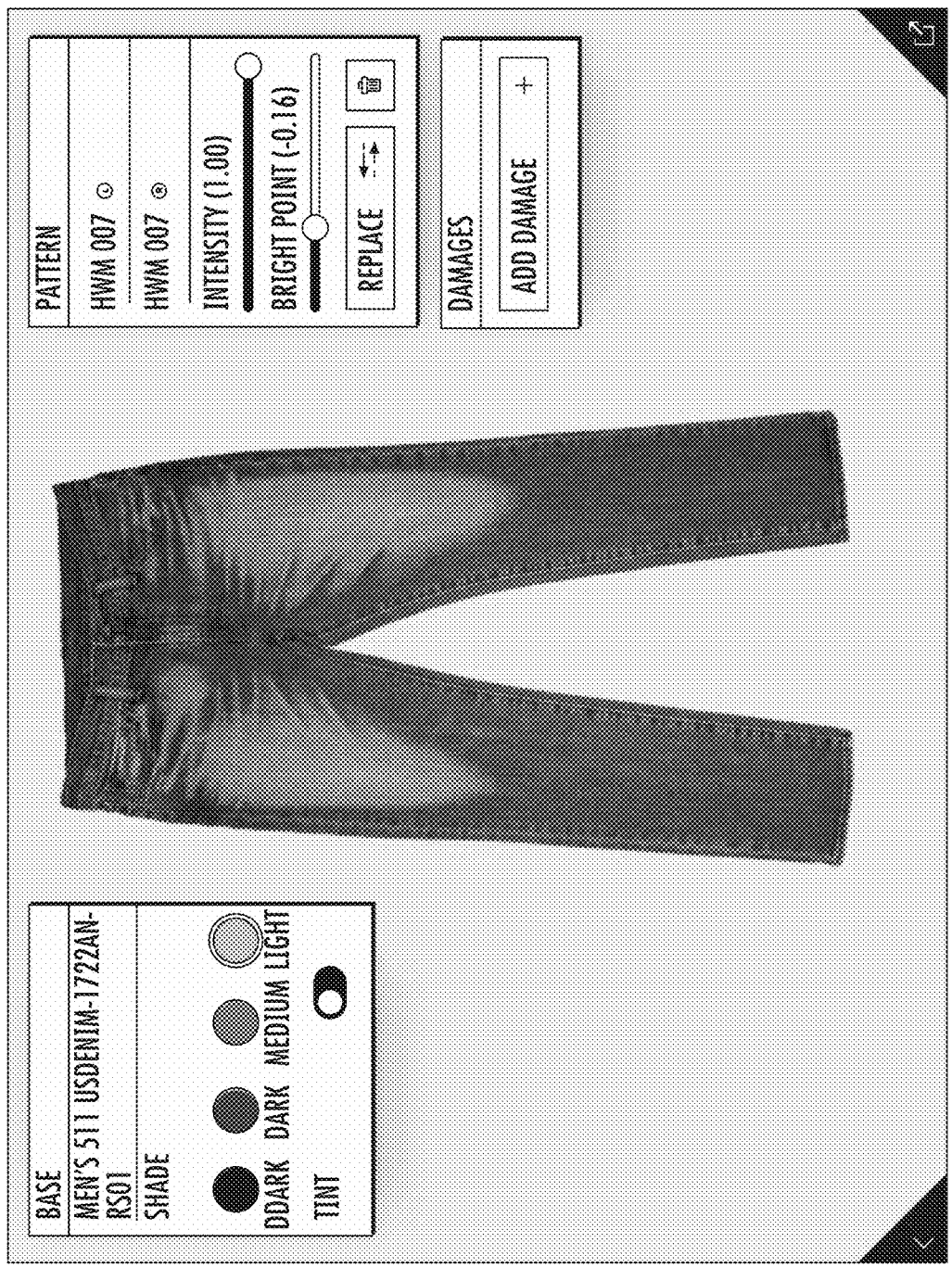
FIG. 45 shows a screen of a current progress feature of the digital brief tool.

FIG. 45 shows a screen of a current progress feature of the digital brief tool. For example, a digital brief image reflects the currently selected options.

Figure 46:
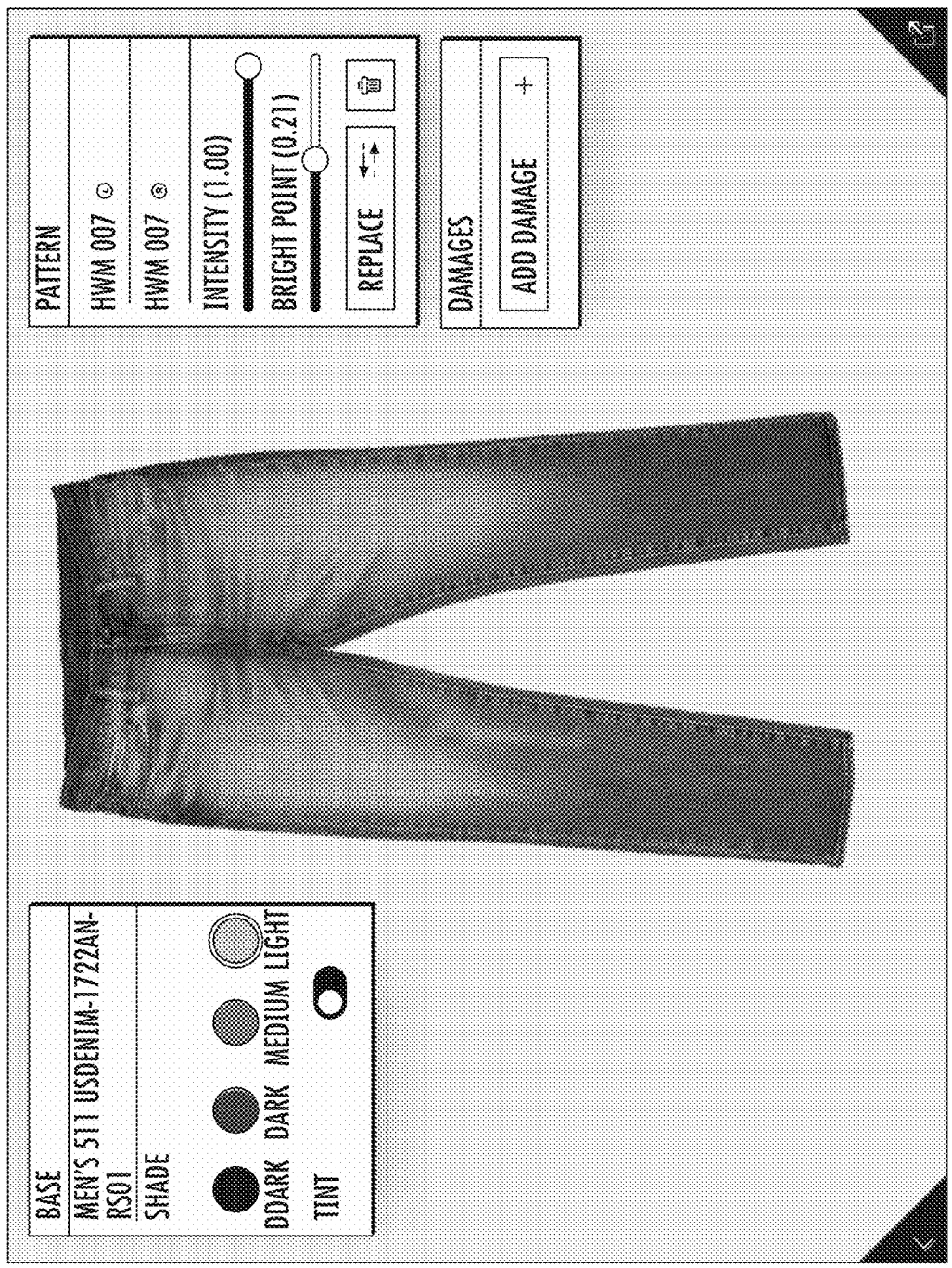
FIG. 46 shows a screen of a laser pattern customization intensity and bright point adjustment feature of the digital brief tool.

FIG. 46 shows a screen of a laser pattern customization intensity and bright point adjustment feature of the digital brief tool. For example, a digital brief image reflects the currently selected options, such as "Men's," the "500" series, the "511" fit, and the "USDenim-1722AN-RS01," and "HWM 007" pattern options. In this screen, the bright point has been set to "1.0" and the bright point to "0.21." Updates to the digital brief image are made, according to the updated options.

Figure 47:
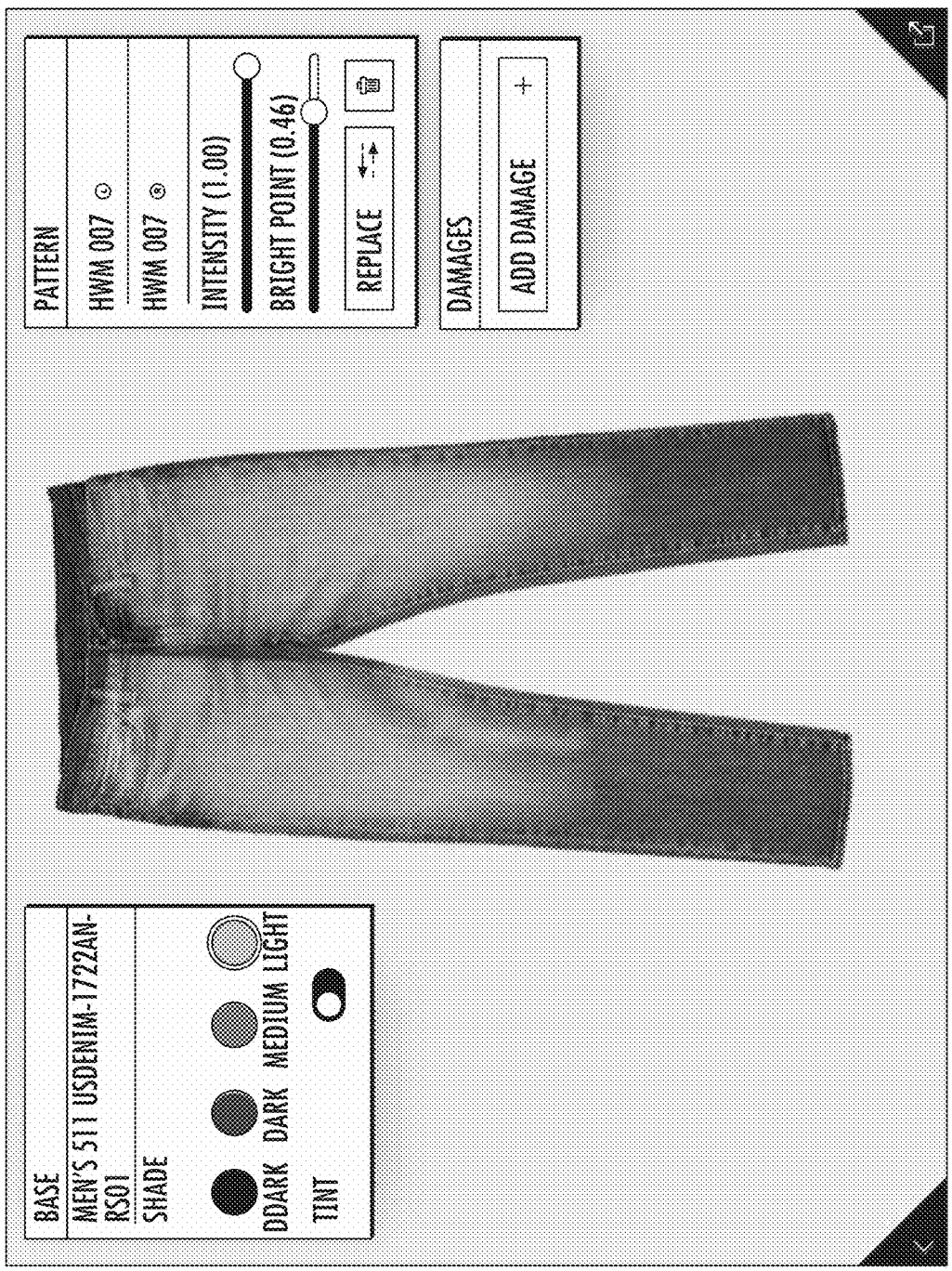
FIG. 47 shows a screen of a laser pattern customization intensity and bright point adjustment feature of the digital brief tool.

FIG. 47 shows a screen of a laser pattern customization intensity and bright point adjustment feature of the digital brief tool. For example, a digital brief image reflects the currently selected options, such as "Men's," the "500" series, the "511" fit, and the "USDenim-1722AN-RS01," and "HWM 007" pattern options. In this screen, the bright point has been set to "1.0" and the bright point to "0.46." Updates to the digital brief image are made, according to the updated options.

Figure 48:
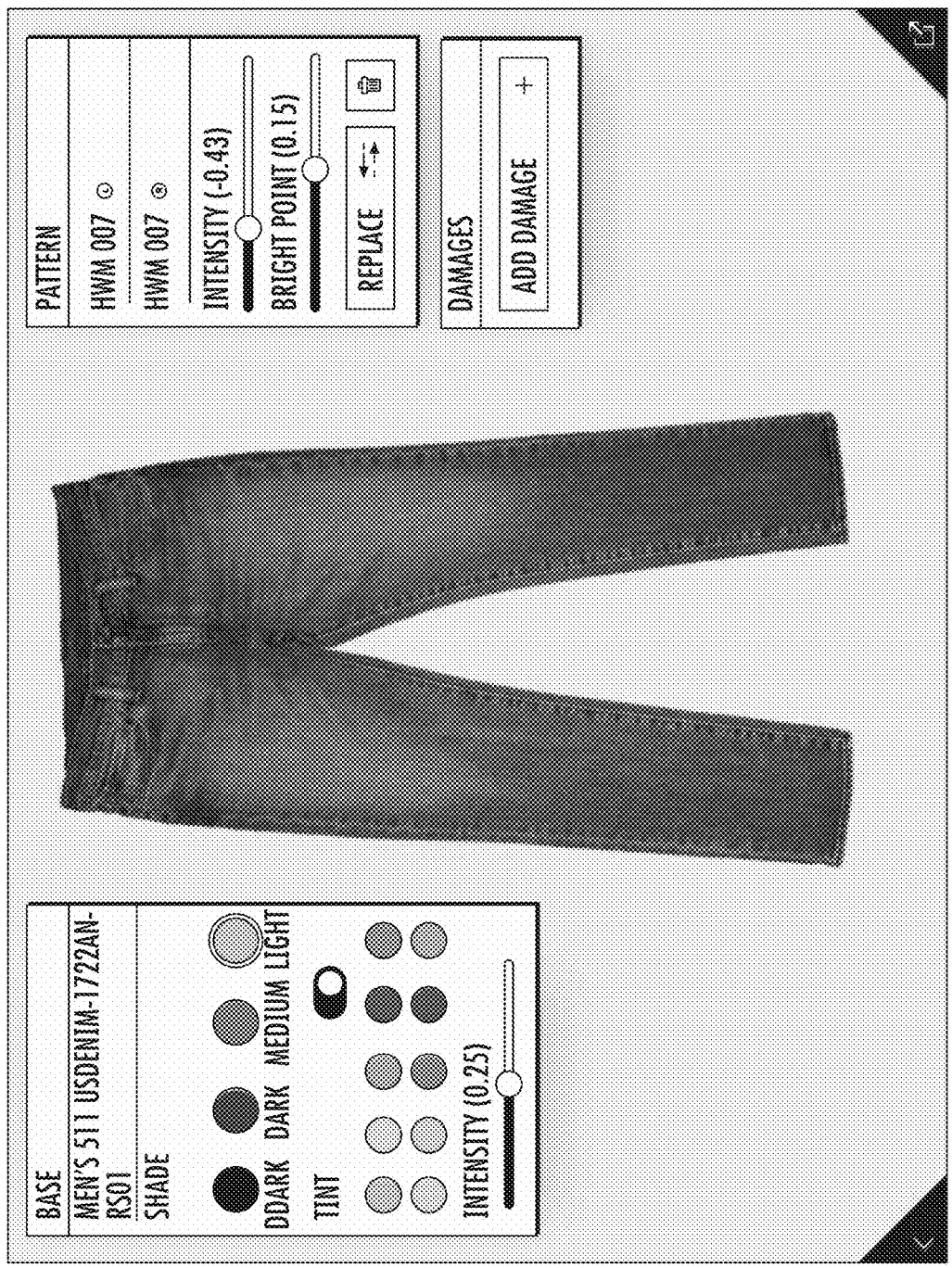
FIG. 48 shows a screen of a shade adjustment feature of the digital brief tool.

FIG. 48 shows a screen of a shade adjustment feature of the digital brief tool. For example, a digital brief image reflects the currently selected options, such as "Men's," the "500" series, the "511" fit, and the "USDenim-1722AN-RS01," and "HWM 007" pattern options. In this screen, a "light" shade has been selected. Updates to the digital brief image are made, according to the updated shade option.

Figure 49:
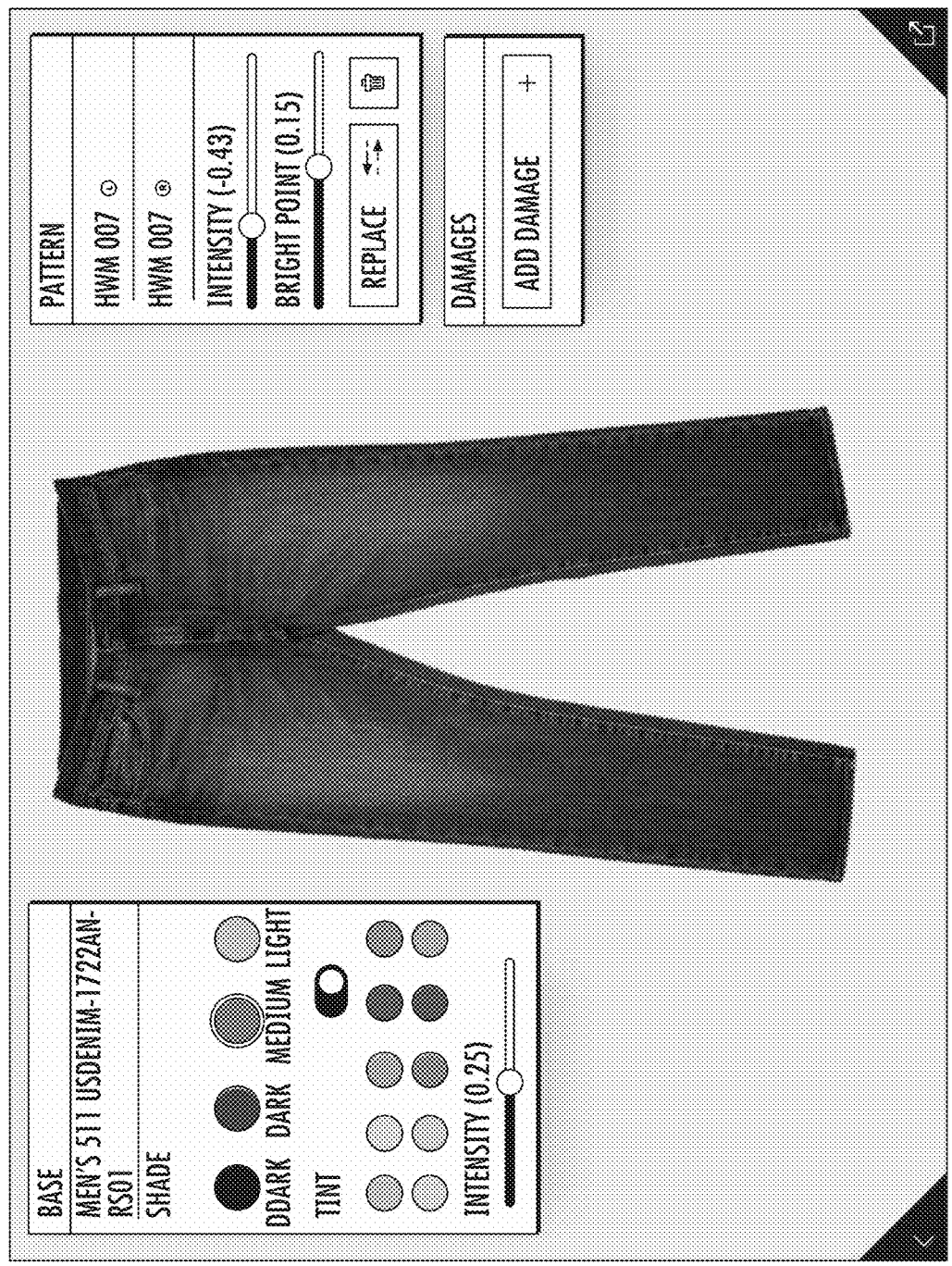
FIG. 49 shows another screen of a shade adjustment feature of the digital brief tool.

FIG. 49 shows another screen of a shade adjustment feature of the digital brief tool. For example, a digital brief image reflects the currently selected options, such as "Men's," the "500" series, the "511" fit, and the "USDenim-1722AN-RS01," and "HWM 007" pattern options. In this screen, a "medium" shade has been selected. Updates to the digital brief image are made, according to the updated shade option.

Figure 50:
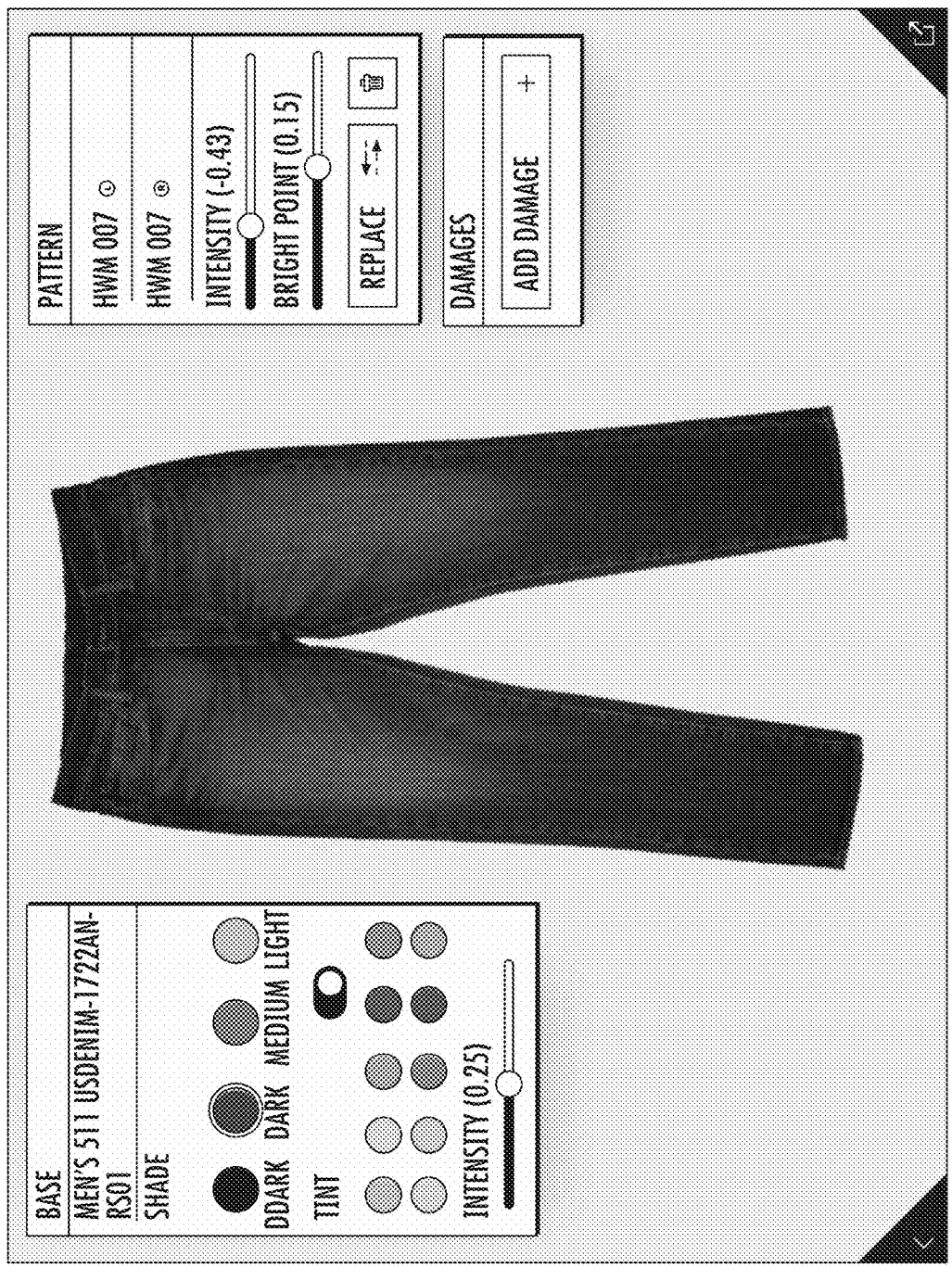
FIG. 50 shows another screen of a shade adjustment feature of the digital brief tool.

FIG. 50 shows another screen of a shade adjustment feature of the digital brief tool. For example, a digital brief image reflects the currently selected options, such as "Men's," the "500" series, the "511" fit, and the "USDenim-1722AN-RS01," and "HWM 007" pattern options. In this screen, a "dark" shade has been selected. Updates to the digital brief image are made, according to the updated shade option.

Figure 51:
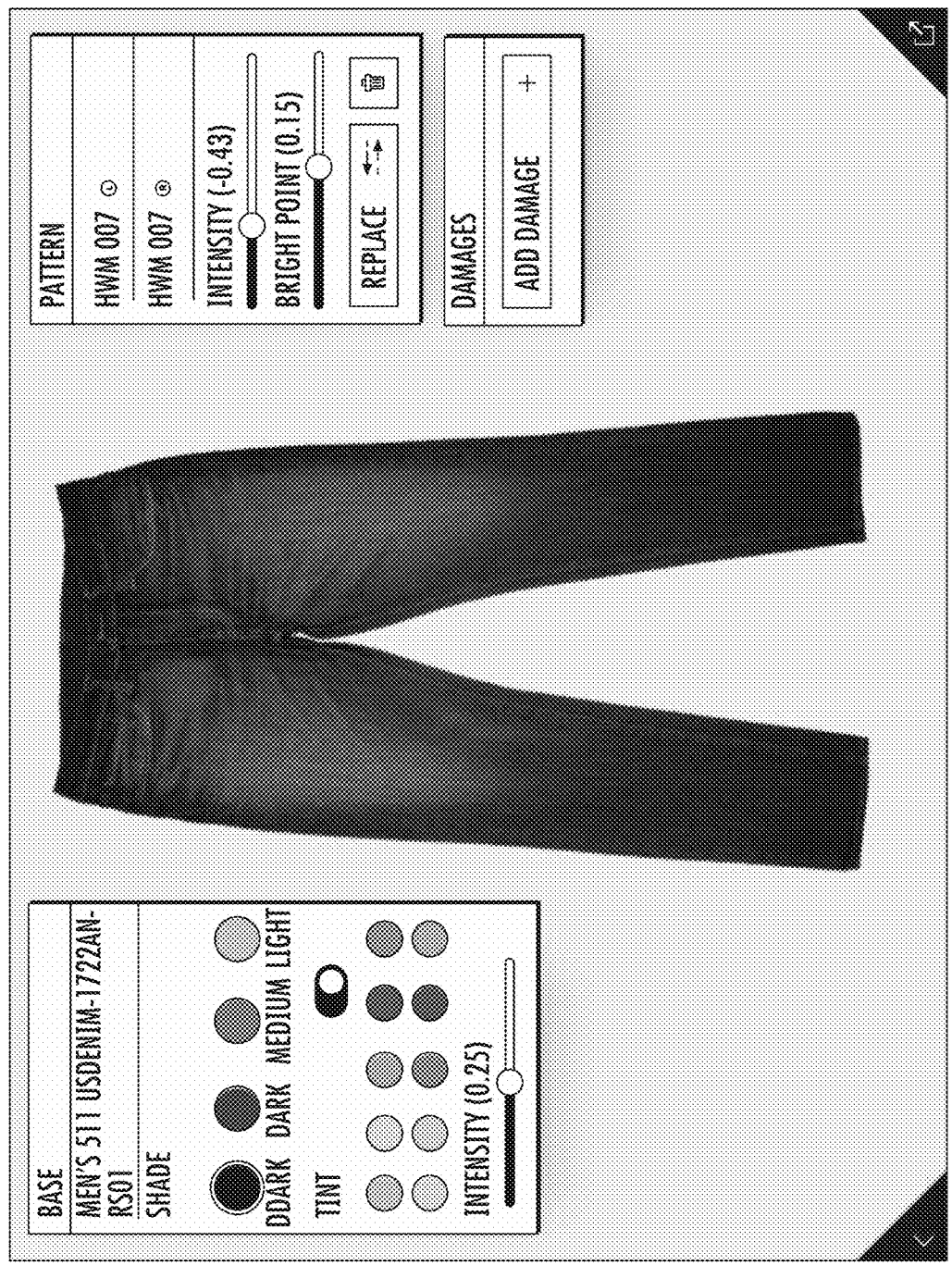
FIG. 51 shows another screen of a shade adjustment feature of the digital brief tool.

FIG. 51 shows another screen of a shade adjustment feature of the digital brief tool. For example, a digital brief image reflects the currently selected options, such as "Men's," the "500" series, the "511" fit, and the "USDenim-1722AN-RS01," and "HWM 007" pattern options. In this screen, a "ddark" shade has been selected. Updates to the digital brief image are made, according to the updated shade option.

Figure 52:
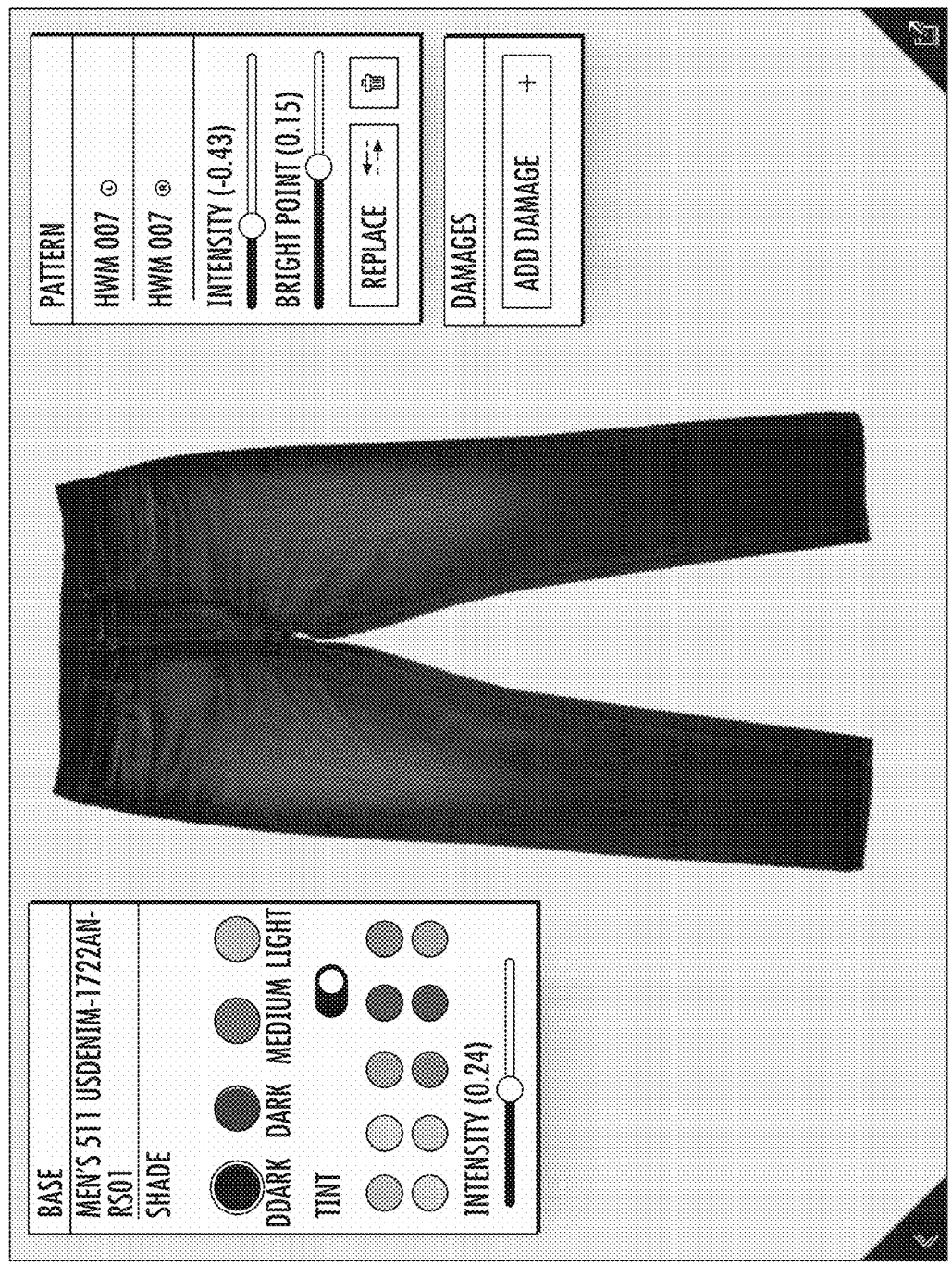
FIG. 52 shows a screen of a tint adjustment feature of the digital brief tool.

FIG. 52 shows a screen of a tint adjustment feature of the digital brief tool. For example, a digital brief image reflects the currently selected options, such as "Men's," the "500" series, the "511" fit, and the "USDenim-1722AN-RS01," and "HWM 007" pattern options. The digital brief tool may provide various tints to accent the apparel. The available tints are displayed using circle swatches. In this screen, a tint option been selected. Updates to the digital brief image are made, according to the tint option. In an implementation, the tint's intensity may be adjusted. A stronger intensity of tint may produce apparel where the selected tint option appears in the apparel more prominently.

Figure 53:
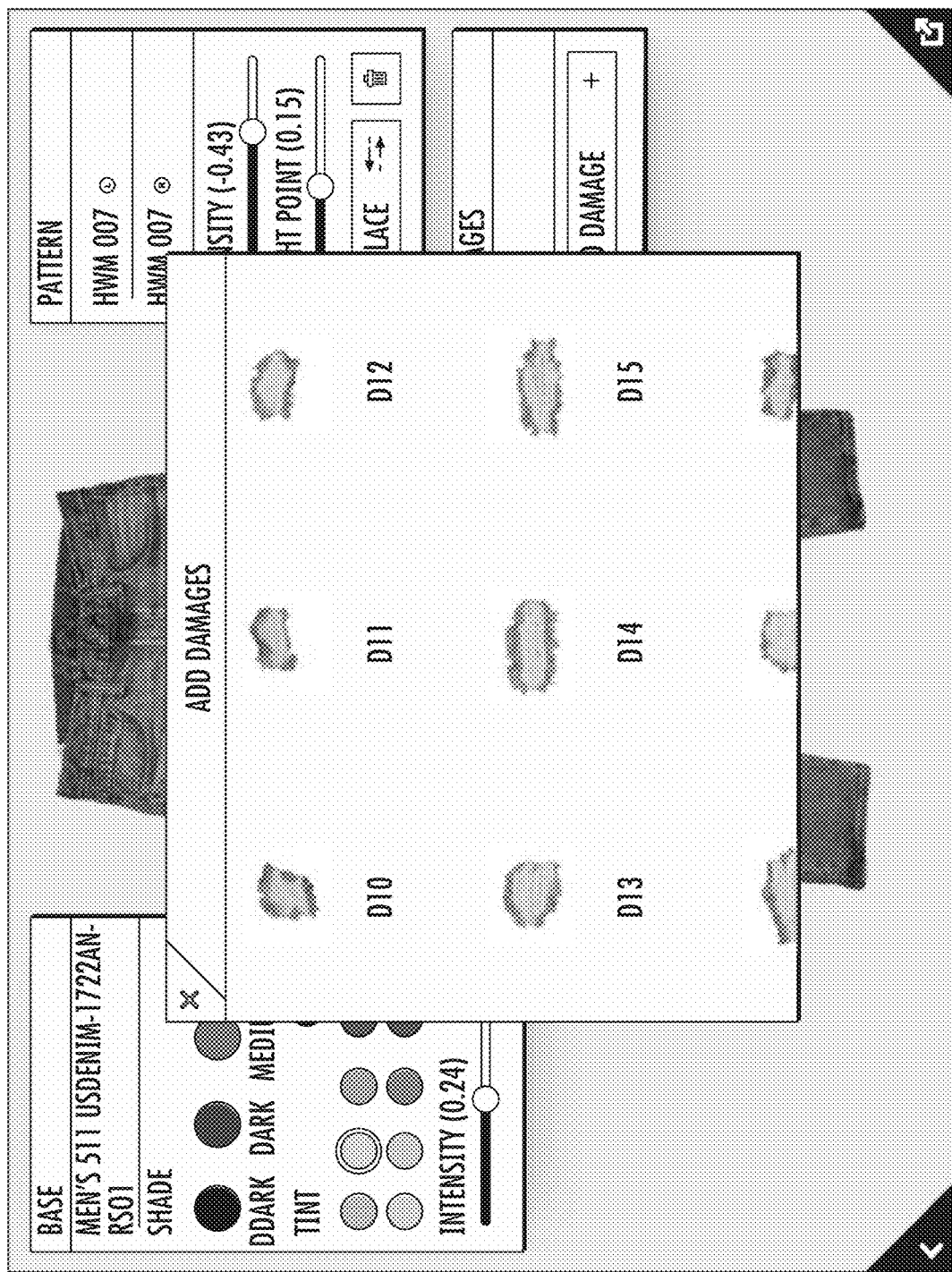
FIG. 53 shows a screen of a damage selection feature of the digital brief tool.

FIG. 53 shows a screen of a damage selection feature of the digital brief tool. A grid of different damage patterns are shown in a gird in the screen. For example, the digital brief tool may present this screen to allow a designer to visualize the different types of damage that may be applied onto apparel, with a name for the damage and an image showing how the damage may appear.

Figure 54:
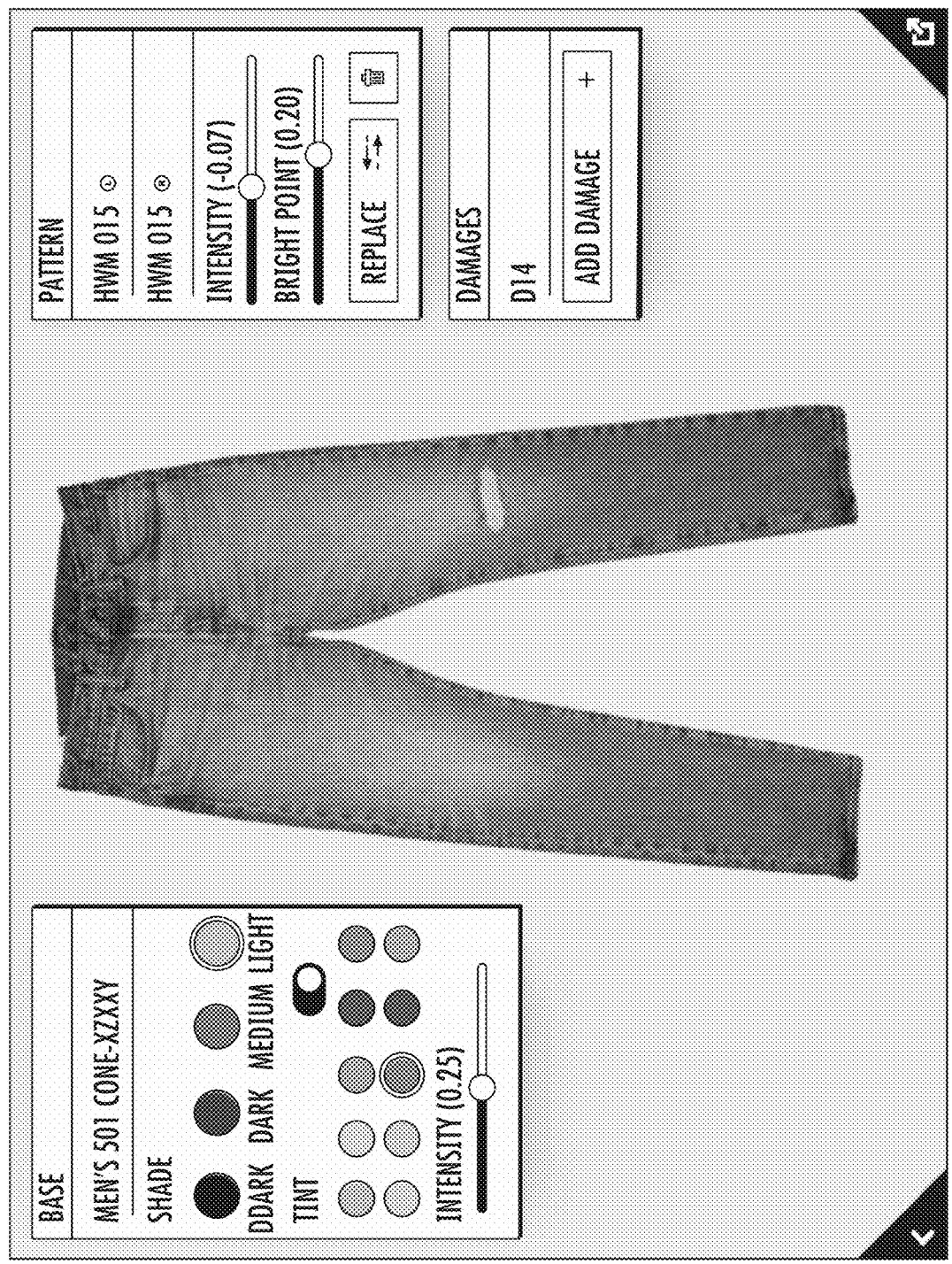
FIG. 54 shows a screen of a damage feature applied onto apparel of the digital brief tool.

FIG. 54 shows a screen of a damage feature applied onto apparel of the digital brief tool. For example, a digital brief image reflects the currently selected options, such as "Men's," the "500" series, the "501" fit, and the "Cone-XZXXY," tint and intensity, and the "HWM 015" pattern options. In this screen, a D14 damage option has been selected. The D14 damage option corresponds to a particular damage pattern or design in the digital brief tool. For example, the screen shows the selected D14 damage option on the left leg of the apparel.

Figure 55:
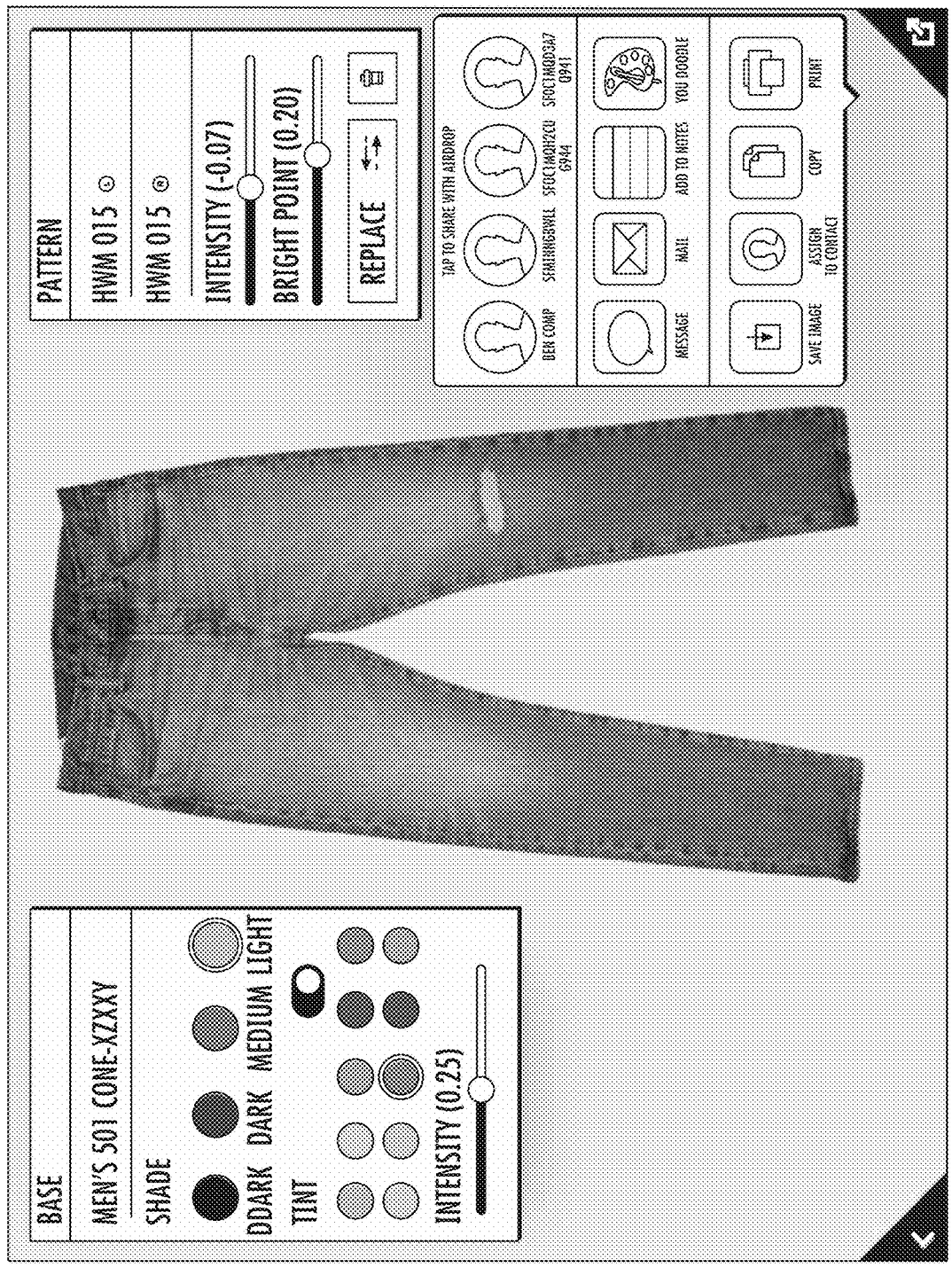
FIG. 55 shows another screen of a sharing feature of the digital brief tool.

FIG. 55 shows another screen of a sharing feature of the digital brief tool. For example, a digital brief image reflects the currently selected options. The designer may choose to share their current changes to other designers or persons for feedback.

Figure 56:
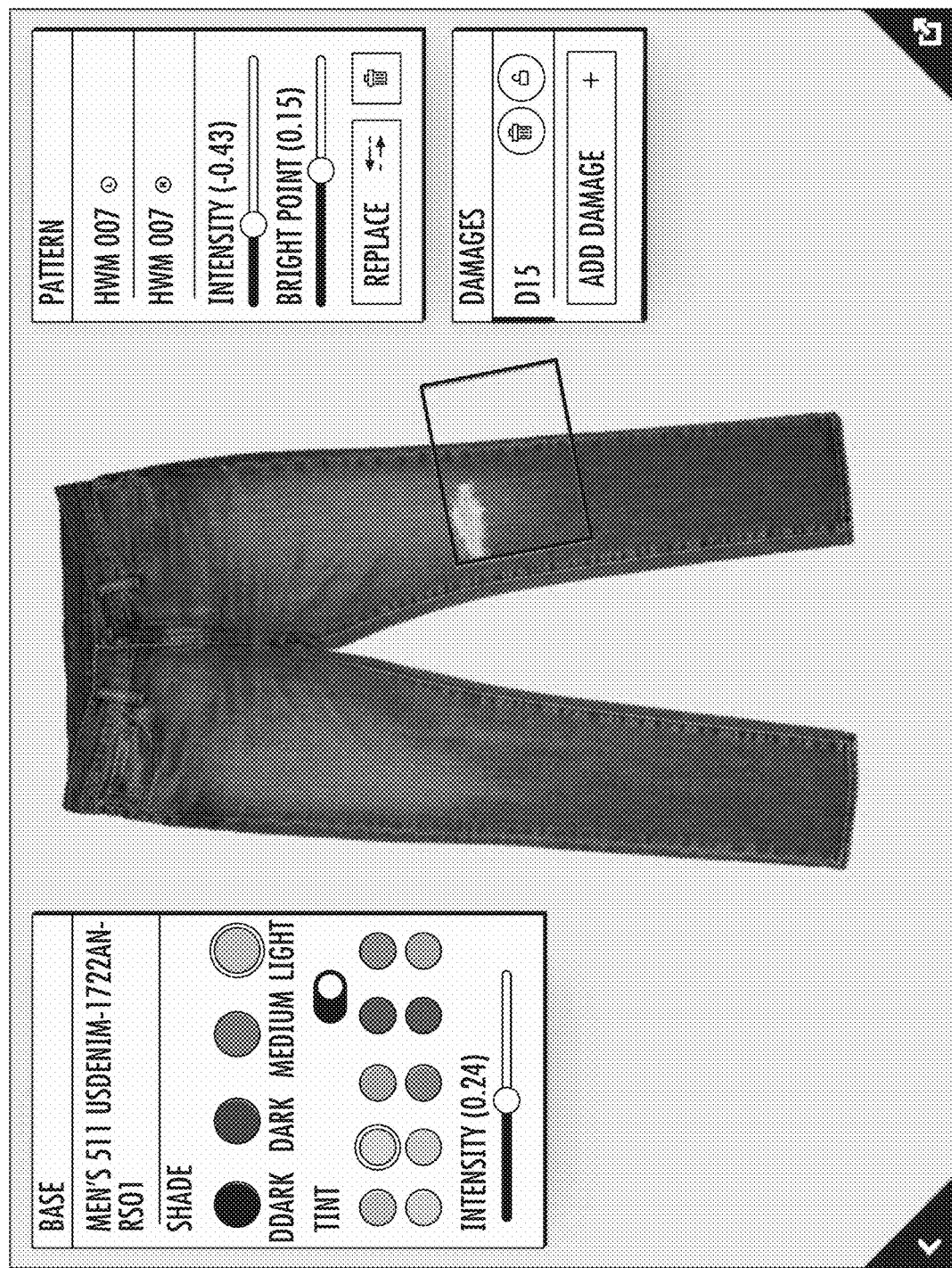
FIG. 56 shows another screen of a damage feature applied onto apparel of the digital brief tool.

FIG. 56 shows another screen of a damage feature applied onto apparel of the digital brief tool. For example, a digital brief image reflects the currently selected options, such as "Men's," the "500" series, the "511" fit, and the "USDenim-1722AN-RS01," tint and intensity, and the "HWM 007" pattern options. In this screen, a D15 damage option has been selected. The D15 damage option corresponds to a particular damage pattern or design in the digital brief tool. The particular damage pattern is overlaid onto the digital brief image. A rectangle is provided to allow the designer to make further adjustments to the damage pattern option. For example, the screen shows the selected D15 damage option on the left leg of the apparel.

Figure 57:
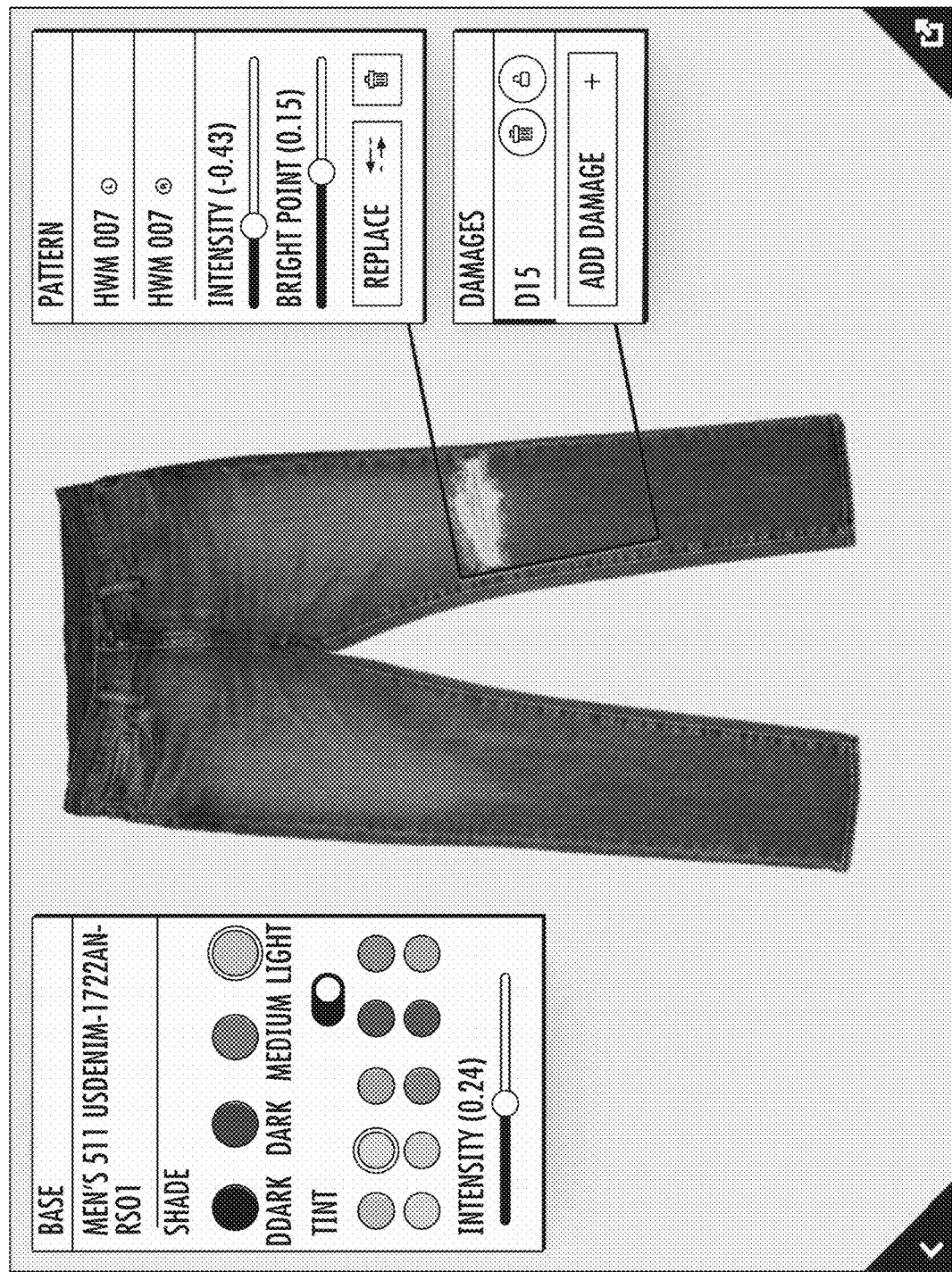
FIG. 57 shows a screen when modifying a damage feature applied onto apparel of the digital brief tool.

FIG. 57 shows a screen when modifying a damage feature applied onto apparel of the digital brief tool. For example, a digital brief image reflects the currently selected options, such as "Men's," the "500" series, the "511" fit, and the "USDenim-1722AN-RS01," tint and intensity, and the "HWM 007" pattern options. In this screen, a D15 damage option has been selected. The designer has modified the damage option by dragging the rectangle to make it larger. The damage pattern is enlarged correspondingly. For example, the aspect ratio of the damage pattern is maintained while expanding the damage pattern.

Figure 58:
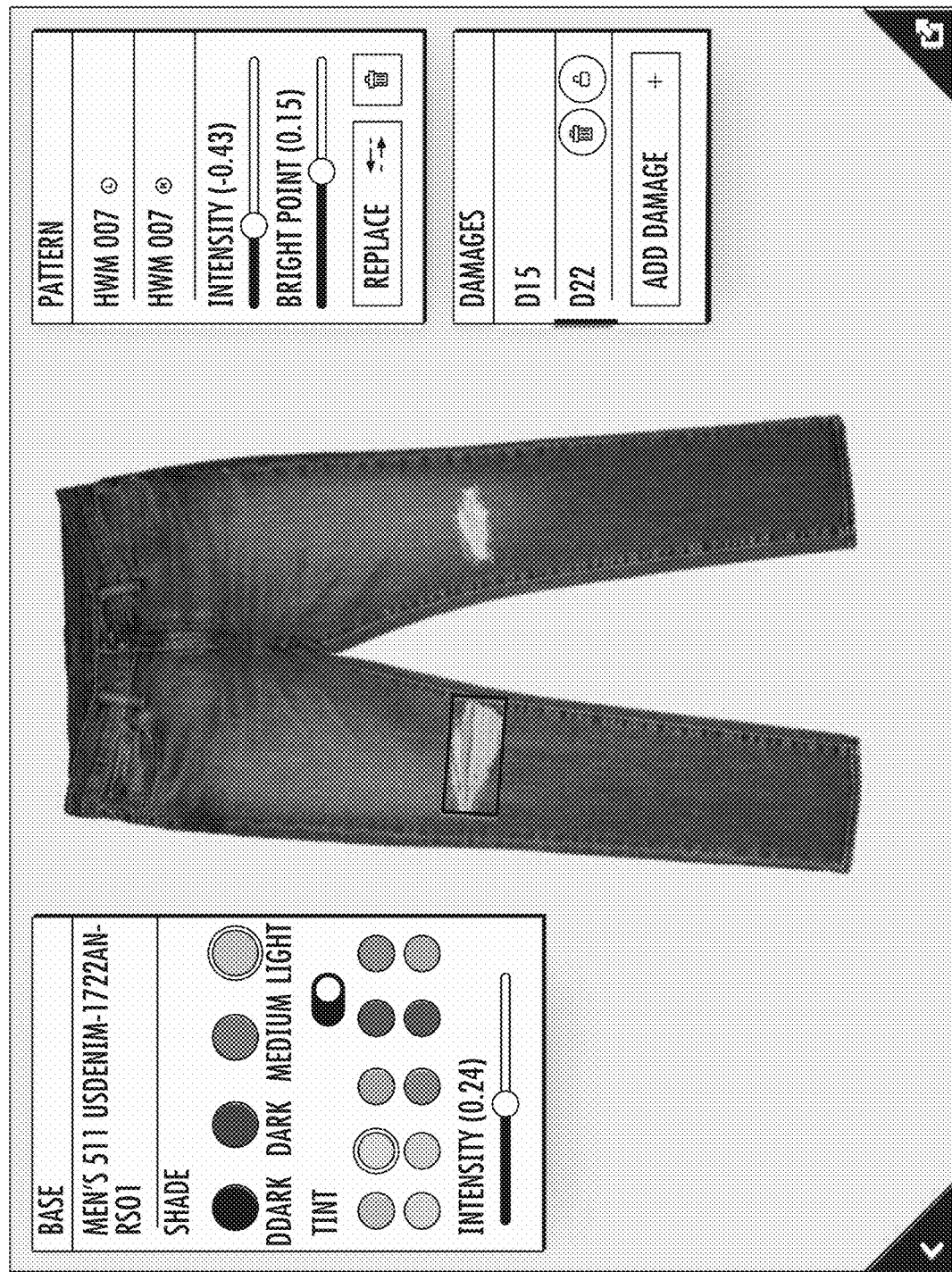
FIG. 58 shows a screen when adding more than one damage pattern with a damage feature of the digital brief tool.

FIG. 58 shows a screen when adding more than one damage pattern with a damage feature of the digital brief tool. For example, a digital brief image reflects the currently selected options, such as "Men's," the "500" series, the "511" fit, and the "USDenim-1722AN-RS01," tint and intensity, and the "HWM 007" pattern options. In this screen, a D15 and a D22 damage option has been selected. The digital brief tool allows the designer to adjust the D15 damage pattern on a left leg of the apparel and the D22 on the right leg of the apparel. A rectangle for the D22 damage pattern indicates that the size or positioning of the D22 damage pattern may be changed by the designer.

Digital Damage Assets

Figure 59:
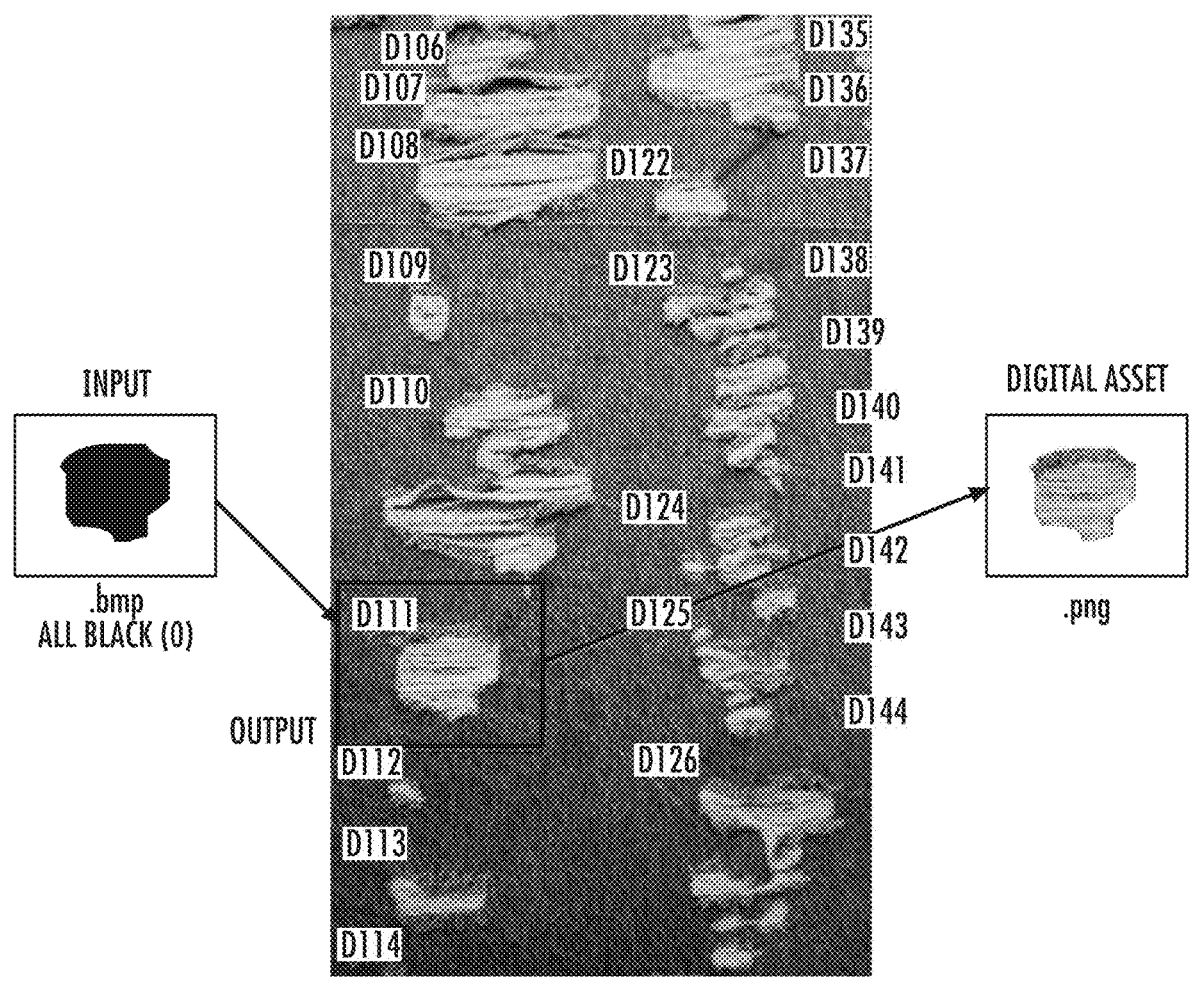
FIG. 59 shows a technique of creating damage digital assets.

FIG. 59 shows technique of creating damage digital assets. A type of damage are holes and rips in a garment. Holes, emerging holes, and rips have become part of jean design and styling and fashion. A jean can have any number of holes, emerging holes, or rips and in different positions, left pant leg, right pant leg, back, or front. A pant leg may have more than one hole, emerging hole, or rip. A hole, emerging hole, or rip in a jean is representative of damage that occurs from wear and use (which can be found in vintage jean patterns).

A laser can be used to create holes or rips in denim material by exposing a region to laser energy for a period of time. The denim material will be thinned and weakened completely through or almost completely through, forming the desired damage hole or rip. The lasered garment is washed in a postlaser wash, which washes away the laser ash reveals the hole or rip further. The resulting damage hole or rip may not be completely through because denim may appear be shredded where the hole damage occurred.

Referring to FIG. 59, to create a damage digital asset, a starting input image is created using an image editing tool. This starting input image is burned by the laser into denim fabric and a hole or rip (resulting from the starting input image) is formed. The fabric is washed. Then the damage hole or rip resulting from the starting input in the fabric is captured as a digital asset image.

This digital asset is added to the brief builder tools library of damage digital assets, where it can be called up by the user. The user can select this damage asset, move and position the damage where desired on the garment, rotate the damage as desired, scale the damage as desired, and warp the damage as desired. For scaling, the aspect ratio can be locked or unlocked, or both.

For the user in the brief builder tool, an appearance of the damage digital asset will be as the damage appears on denim material. For example, the damage digital asset can be stored in a PNG image file.

The starting input image will be a black object, which the laser will burn into the material. In an implementation, the starting input image is stored in a BMP image file. A black object in a laser input file will cause the laser to create a white object on the garment. With sufficient laser power and time, the black object will cause a hole or rip be created in the garment.

When the user selects a particular damage digital asset in the brief builder tool, the starting input image can also be similarly manipulated and stored into a laser input file. Then the laser input file will include the starting input image. So when the laser input file is used, the garment will have damage that appears similar to that selected by the user in the brief builder tool.

Damage can come in many different shapes and sizes. To provide a variety of shapes and sizes for the user to select from, a variety of shapes and sizes of starting images are generated, such as the input shape shown in FIG. 59 (e.g., BMP image). Multiple, generated starting inputs are included into a single laser file that will be burned onto denim material (e.g., a denim blanket) at one time. The laser file can also have unique identifiers for identifier each starting input, and this unique identifier can be burned into the material as well. For example, in FIG. 59, see the D106, D109, D110, and other identifiers that can be burned into the material.

Then after burning, the denim material will have the unique identifier and the damage, and it will be easier to identify which starting image cause which damage. An image of each damage item on the material is captured, so that it can be converted into a digital asset (see PNG image in FIG. 59) for the brief builder tool.

The operations in the preview tool described above for displaying laser patterns on a base image also apply to damage assets. For example, in a preview, damage assets can be displayed, moved or repositioned, rotated, scaled, or warped, or any combination of these. The damage asset can be displayed along with the background (e.g., laser pattern and base image). A photo or image of damage asset with edge blending can overlay the other preview layers. With edge blending, towards edges of the damage asset image, opacity is turned down so the image blends with the background image better.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:

in a jeans design tool, generating a preview image on a computer screen of a jeans garment as customized by a user with a finishing pattern to be created by a laser, wherein the jeans design tool comprises providing a first option for the user to select a jeans garment base and upon the user's selection, showing a first garment preview image on the computer screen comprising a jeans base image for the selected garment base, providing a second option for the user to select a finishing pattern from a menu of finishing patterns, wherein each finishing pattern is associated with a laser input file to be used by a laser to produce that finishing pattern onto a jeans garment, after the finishing pattern is selected, showing a second garment preview image on the computer screen comprising the selected finishing pattern in combination with the jeans base image, wherein the second garment preview image replaces the first garment preview image, wherein the second garment preview image is generated comprising generating an adjusted base image from the jeans base image without the selected finishing pattern, generating a pattern mask based on the laser input file associated with the selected finishing pattern, for a pixel at a pixel location of the second preview image, obtaining a first contribution by combining a first value associated with a pixel of the pattern mask at a pattern mask pixel location that corresponds to the pixel location of the second preview image and a value of a pixel of the base image at a base image pixel location that corresponds to the pixel location of the second preview image, for the pixel at the pixel location of the second preview image, obtaining a second contribution by combining a second value associated with the pixel of the pattern mask at the pattern mask pixel location that corresponds to the pixel location of the second preview image and a value of a pixel of the adjusted base image at an adjusted base image pixel location that corresponds to the pixel location of the second preview image, combining the first contribution and second contribution to obtain a combined value for the pixel at the pixel location of the second preview image, and displaying the pixel of the second preview image as a color on the computer screen, wherein the color of the pixel corresponds to the combined value.

2. The method of claim 1 wherein the user selects the finishing pattern by way of a touch screen interface of the computer screen showing the second garment preview image.

3. The method of claim 1 comprising:

in the second garment preview image, allowing the user to select the finishing pattern and modify a sizing of the finishing pattern relative to the jeans base image, wherein as the user makes changes, the modified sizing of the finishing pattern is displayed to the user.

4. The method of claim 3 comprising:

showing a third garment preview image on the computer screen comprising the jeans base image and selected finishing pattern with the modified sizing.

5. The method of claim 1 comprising:

in the second garment preview image, allowing the user to select the finishing pattern and modify a position of the finishing pattern relative to the jeans base image, wherein as the user makes changes, the modified positioning of the finishing pattern is displayed to the user.

6. The method of claim 5 comprising:

showing a third garment preview image on the computer screen comprising the jeans base image and selected finishing pattern with the modified positioning.

7. A method comprising:

in a garment design tool, generating a preview image on a computer screen of a garment with a finishing pattern to be created by a laser using a laser input file, wherein the generating comprises providing a base image of a garment without the finishing pattern, generating an adjusted base image from the base image of the garment without the finishing pattern, generating a pattern mask based on the laser input file, for a pixel at a pixel location of the preview image, obtaining a first contribution by combining a first value associated with a pixel of the pattern mask at a pattern mask pixel location that corresponds to the pixel location of the preview image and a value of a pixel of the base image at a base image pixel location that corresponds to the pixel location of the preview image, for the pixel at the pixel location of the preview image, obtaining a second contribution by combining a second value associated with the pixel of the pattern mask at the pattern mask pixel location that corresponds to the pixel location of the preview image and a value of a pixel of the adjusted base image at an adjusted base image pixel location that corresponds to the pixel location of the preview image, combining the first contribution and second contribution to obtain a combined value for the pixel at the pixel location for the preview image, and displaying the generated preview image with the pixel on the computer screen, wherein the pixel is displayed as a color corresponding to the combined value for the pixel at the pixel location.

8. The method of claim 7 wherein the generating a pattern mask based on the laser input file comprises:

generating an inverse image of the laser input file.

9. The method of claim 7 wherein the first contribution comprises a first percentage of the base image that passes to the preview image, and the second contribution comprises a second percentage of the base image that passes to the preview image.

10. The method of claim 7 wherein for the first contribution, the combining comprises a multiply operation of the first value and the value of the pixel of the base image at the base image pixel location.

11. The method of claim 10 wherein for the second contribution, the combining comprises a multiply operation of the second value and the value of the pixel of the adjusted base image at the adjusted base image pixel location.

12. The method of claim 7 wherein the combining the first contribution and second contribution comprises an addition operation.

13. The method of claim 7 comprising:

using a laser to create a finishing pattern on an outer surface of the garment that is represented by the preview image.

14. The method of claim 13 wherein based on the laser input file associated with the generated preview image, the laser removes selected amounts of material from the surface of the first material at different pixel locations of the garment, and for lighter pixel locations of the finishing pattern, a greater amount of a dyed cotton warp yarn is removed, while for darker pixel locations of the finishing pattern, a lesser amount of the dyed cotton warp yarn is removed.

15. The method of claim 7 wherein the garment comprises a pair of jeans.

16. The method of claim 7 wherein the garment comprises a pair of pants.

17. The method of claim 7 wherein the garment comprises a pair of shorts.

18. The method of claim 7 wherein the garment comprises a shirt.

19. A method comprising:

in a garment design tool, generating a preview image on a computer screen of a garment with a finishing pattern to be created by a laser using a laser input file, wherein the generating comprises providing a base image of a garment without the finishing pattern, generating an adjusted base image from the base image of the garment without the finishing pattern, generating a pattern mask based on the laser input file, providing a solid color tint image, for a pixel at a pixel location of the preview image, obtaining a first contribution by combining a first value associated with a pixel of the pattern mask at a pattern mask pixel location that corresponds to the pixel location of the preview image and a value of a pixel of the base image at a base image pixel location that corresponds to the pixel location of the preview image, for the pixel at the pixel location of the preview image, obtaining a second contribution by combining a second value associated with the pixel of the pattern mask at the pattern mask pixel location that corresponds to the pixel location of the preview image and a value of a pixel of the adjusted base image at an adjusted base image pixel location that corresponds to the pixel location of the preview image, combining the first contribution and second contribution and a tint value corresponding to a color of the solid color tint image to obtain a combined value for the pixel at the pixel location for the preview image, and displaying the generated preview image with the pixel on the computer screen, wherein the pixel is displayed as a color corresponding to the combined value for the pixel at the pixel location.

20. The method of claim 19 wherein the tint value corresponding to a color of the solid color tint image is modified by an opacity parameter.

21. The method of claim 19 wherein the solid color tint image comprises a yellow color.

22. The method of claim 19 wherein the solid color tint image comprises a green color.

23. The method of claim 19 wherein the garment comprises a pair of jeans.

24. The method of claim 19 wherein the garment comprises a pair of pants.

25. The method of claim 19 wherein the garment comprises a pair of shorts.

26. The method of claim 19 wherein the garment comprises a shirt.

27. The method of claim 19 wherein the first contribution comprises a first percentage of the base image that passes to the preview image, and the second contribution comprises a second percentage of the base image that passes to the preview image.

28. The method of claim 19 wherein for the first contribution, the combining comprises a multiply operation of the first value and the value of the pixel of the base image at the base image pixel location.

29. The method of claim 28 wherein for the second contribution, the combining comprises a multiply operation of the second value and the value of the pixel of the adjusted base image at the new base image pixel location.

30. The method of claim 19 wherein the combining the first contribution and second contribution comprises an addition operation.

31. The method of claim 19 comprising:

using a laser to create a finishing pattern on an outer surface of the garment that is represented by the preview image.

32. The method of claim 31 wherein based on the laser input file associated with the generated preview image, the laser removes selected amounts of material from the surface of the first material at different pixel locations of the garment, and for lighter pixel locations of the finishing pattern, a greater amount of a yarn is removed, while for darker pixel locations of the finishing pattern, a lesser amount of the yarn is removed.

\* \* \* \* \*